(12) United States Patent
Hong et al.

(10) Patent No.: US 11,223,497 B2
(45) Date of Patent: Jan. 11, 2022

(54) METHOD AND APPARATUS FOR PROVIDING NOTIFICATION BY INTERWORKING PLURALITY OF ELECTRONIC DEVICES

(71) Applicant: Samsung Electronics Co., Ltd., Suwon-si (KR)

(72) Inventors: Yeseul Hong, Suwon-si (KR); Yongho Kim, Suwon-si (KR); Sunah Kim, Suwon-si (KR); Boram Lee, Suwon-si (KR); Taeksoo Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/578,753

(22) Filed: Sep. 23, 2019

(65) Prior Publication Data
US 2020/0099545 A1   Mar. 26, 2020

(51) Int. Cl.
*H04L 12/28* (2006.01)
(52) U.S. Cl.
CPC .................. *H04L 12/2827* (2013.01)
(58) Field of Classification Search
CPC .................................... H04L 12/2827
USPC ........................................ 709/206
See application file for complete search history.

(56) References Cited

U.S. PATENT DOCUMENTS

| 8,700,071 | B2* | 4/2014 | Tims ...................... H04L 51/38 |
| | | | 455/466 |
| 8,838,505 | B2* | 9/2014 | Jang .................. G06Q 10/06311 |
| | | | 706/12 |
| 9,001,190 | B2* | 4/2015 | Olivier, III .............. G01S 17/89 |
| | | | 348/46 |
| 9,069,356 | B2* | 6/2015 | Papaefstathiou .......................... |
| | | | G08B 13/19682 |

(Continued)

FOREIGN PATENT DOCUMENTS

| EP | 2 288 122 A1 | 2/2011 |
| EP | 2 753 021 A1 | 7/2014 |

(Continued)

OTHER PUBLICATIONS

Doo-Heon Kyon et al., "Analysis of sound around life that affect acoustic psychology", The Institute of Electronics Engineers of Korea Conference, Nov. 2000, 291-292 (2 pages), http://www.dbpia.co.kr/Article/NODE01593301.

(Continued)

*Primary Examiner* — David P Zarka
(74) *Attorney, Agent, or Firm* — Jefferson IP Law, LLP

(57) ABSTRACT

A method and apparatus capable of forwarding notification or information related to a function, generated from a given device, to a user through a device near (or in proximity to) the user by interworking a plurality of electronic devices, are provided. An electronic device includes a communication interface and a processor. The processor is configured to obtain a first message related to notification from an external device, identify a target electronic device for notification (Continued)

output based on the location of a user and notification output performance of each of a plurality of electronic devices capable of communication with the electronic device, and transmit a second message related to the notification to the target electronic device so that the identified target electronic device outputs the notification.

14 Claims, 31 Drawing Sheets

(56) References Cited

U.S. PATENT DOCUMENTS

| | | | | |
|---|---|---|---|---|
| 9,227,595 | B2* | 1/2016 | Yang | G07C 9/29 |
| 9,466,188 | B2* | 10/2016 | Hamam | G06F 3/03545 |
| 9,801,009 | B2 | 10/2017 | Shim et al. | |
| 9,812,128 | B2 | 11/2017 | Mixter et al. | |
| 9,983,592 | B2* | 5/2018 | Hong | G05D 1/0044 |
| 10,104,501 | B2* | 10/2018 | Strutt | H04W 4/60 |
| 10,137,567 | B2* | 11/2018 | Chen | B25J 9/0003 |
| 10,270,548 | B2* | 4/2019 | Fujita | H04L 63/105 |
| 10,471,611 | B2* | 11/2019 | Dooley | H04N 5/23206 |
| 10,532,003 | B2* | 1/2020 | Yu | G09B 21/006 |
| 10,575,699 | B2* | 3/2020 | Bassa | G05D 1/0246 |
| 10,852,741 | B2* | 12/2020 | Bae | B60W 30/06 |
| 10,854,058 | B2* | 12/2020 | Davies | G08B 13/19669 |
| 10,860,015 | B2* | 12/2020 | Ferguson | B60R 19/18 |
| 2006/0190974 | A1 | 8/2006 | Lee | |
| 2011/0045809 | A1 | 2/2011 | Yu et al. | |
| 2012/0316984 | A1 | 12/2012 | Glassman | |
| 2014/0188485 | A1 | 7/2014 | Kim et al. | |
| 2015/0067080 | A1 | 3/2015 | Cho et al. | |
| 2016/0226676 | A1 | 8/2016 | Shin et al. | |
| 2017/0105190 | A1* | 4/2017 | Logan | H04W 4/14 |
| 2017/0289770 | A1* | 10/2017 | Kan | H04W 4/029 |
| 2017/0361468 | A1* | 12/2017 | Cheuvront | G06F 16/00 |
| 2018/0040322 | A1 | 2/2018 | Mixter et al. | |
| 2018/0206083 | A1* | 7/2018 | Kumar | H04W 4/021 |
| 2019/0015993 | A1* | 1/2019 | Kunitake | B25J 5/007 |
| 2019/0099681 | A1* | 4/2019 | Rico | B25J 15/10 |
| 2019/0155360 | A1* | 5/2019 | Anders | H04L 12/283 |
| 2019/0334733 | A1* | 10/2019 | Jaiswal | H04L 51/24 |
| 2020/0039080 | A1* | 2/2020 | Oyaizu | G10L 25/63 |
| 2020/0094397 | A1* | 3/2020 | Young | G05B 15/02 |
| 2020/0130197 | A1* | 4/2020 | Roh | B25J 9/161 |

FOREIGN PATENT DOCUMENTS

| | | |
|---|---|---|
| EP | 3 047 583 A1 | 7/2016 |
| JP | 2007-034449 A | 2/2007 |
| KR | 10-2016-0143136 A | 12/2016 |
| WO | 2015/037963 A1 | 3/2015 |
| WO | 2016/088597 A1 | 6/2016 |

OTHER PUBLICATIONS

International Search Report dated Mar. 30, 2020, issued in International Application No. PCT/KR2019/012356.

European Search Report dated Aug. 9, 2021; European Appl. No. 19861538.7-1216 / 3821417 PCT/KR2019012356.

* cited by examiner

METHOD AND APPARATUS FOR PROVIDING NOTIFICATION BY INTERWORKING PLURALITY OF ELECTRONIC DEVICES

CROSS-REFERENCE TO RELATED APPLICATION(S)

This application is based on and claims priority under 35 U.S.C. § 119(a) of a Korean patent application number 10-2018-0114106, filed on Sep. 21, 2018, in the Korean Intellectual Property Office, the disclosure of which is incorporated by reference herein in its entirety.

BACKGROUND

1. Field

The disclosure relates to a method and apparatus capable of forwarding notification, generated from a given device, to a user through a device near (or in proximity to) the user by interworking a plurality of electronic devices.

2. Description of Related Art

With the development of digital technology, various types of electronic devices, such as a mobile communication terminal, a smart phone, a tablet personal computer (PC), a notebook, a personal digital assistant (PDA), a wearable device, a digital camera, a smart speaker, or various home appliances (e.g., TV, a refrigerator, the washer, a cleaner, a microwave range, or an air purifier), are widely used.

The electronic device may include a speaker for sound output, and may output at least one notification related to a function of the electronic device through the speaker. A first electronic device (e.g., smartphone) may output the notification (e.g., ringtone) of call reception. A second electronic device (e.g., washer) may output the notification (e.g., washing has been completed) of washing completion. A third electronic device (e.g., air purifier) may output the notification (e.g., air purification will start) of the start of a function (e.g., air purification).

However, the electronic device outputs notifications regardless of whether a user is located in the vicinity of the corresponding electronic device when the electronic device outputs notification related to a function. Furthermore, if a plurality of electronic devices is present in a given space (e.g., within a home) and electronic devices have notification, each of the electronic devices may individually provide notification or they may provide pieces of notification at the same time. Furthermore, when an electronic device provides notification, if a user is not located in the vicinity of the electronic device, the user may miss or listen to the notification.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method of providing the notification of any one electronic device by interworking a plurality of electronic devices within a given space and an electronic device therefor.

Another aspect of the disclosure is to provide a method of interworking a plurality of electronic devices and providing notification generated from an electronic device using at least one electronic device in the vicinity of a user and an apparatus for.

Another aspect of the disclosure is to provide a method of detecting a user (i.e., user detection) through at least one sensing by a plurality of electronic devices and providing the notification of any one electronic device through an electronic device near the user based on the user detection and an electronic device therefor.

Another aspect of the disclosure is to provide a method of determining a target user based on user detection and user situation detection by a plurality of electronic devices and providing the notification of an electronic device related to the target user through an electronic device in the vicinity of the determined target user and an electronic device therefor.

Another aspect of the disclosure is to provide a method capable of providing notification or information based on an electronic device most close to the current location of a user or capable of forwarding the notification or information most easily based on a sound which may occur naturally during the life of the user, such as a surrounding sound of the user and/or a given sound, and an electronic device therefor.

Another aspect of the disclosure is to provide a method and apparatus for detecting a user by interworking a plurality of electronic devices based on a sound and providing the notification of any one electronic device through an electronic device in the vicinity of the user.

Another aspect of the disclosure is to provide a method of collecting various surrounding sounds (e.g., person's or user's sound (e.g., voice)) or a surrounding sound (e.g., footstep, a sound output through TV, a keyboard sound or a cooking sound) through a plurality of electronic devices, detecting the location of a user in the collected sounds, and providing the notification of any one electronic device through an electronic device corresponding to the user location and an electronic device therefor.

Additional aspects will be set forth in part in the description which follows and, in part, will be apparent from the description, or may be learned by practice of the presented embodiments.

In accordance with an aspect of the disclosure, an electronic device is provided. The electronic device includes a communication interface and a processor. The processor is configured to obtain a first message related to notification from an external device, identify a target electronic device for notification output based on the location of a user and notification output performance of each of a plurality of electronic devices capable of communication with the electronic device, and transmit a second message related to the notification to the target electronic device so that the identified target electronic device outputs the notification.

In accordance with another aspect of the disclosure, an electronic device is provided. The electronic device includes at least one situation collection interface configured to collect situation information related to user detection, a communication interface configured to communicate with at least one other electronic device, and a processor. The processor is configured to detect notification related to at least one function, collect situation information related to a user based on a plurality of electronic devices in response to the detection of the notification, identify a target electronic device for outputting the notification among the plurality of electronic devices based on the situation information, and provide notification information to the target electronic device so that the target electronic device outputs the notification to a user.

In accordance with another aspect of the disclosure, an operating method of an electronic device is provided. The method includes receiving a first message related to notification from an external device, identifying a target electronic device for notification output based on the location of a user and notification output performance of each of a plurality of electronic devices capable of communication with the electronic device, and transmitting a second message related to the notification to the target electronic device so that the identified target electronic device outputs the notification.

In accordance with another aspect of the disclosure, an operating method of an electronic device is provided. The method includes detecting notification related to at least one function, collecting situation information related to a user based on a plurality of electronic devices in response to the detection of the notification, identifying a target electronic device for outputting the notification in the plurality of electronic devices based on the situation information, and outputting the notification to the user by the target electronic device by providing notification information to the target electronic device.

According to various embodiments of the disclosure may include a computer-readable recording medium in which a program for executing the method in at least one processor is written.

In accordance with the electronic device and the operating method thereof according to various embodiments, when any one electronic device has notification in the environment in which a plurality of electronic devices is present in a given space, the notification of any one electronic device can be output through an electronic device (hereinafter referred to as a "peripheral electronic device") in the vicinity of a user (or in proximity to the user or being used by the user), and can be forwarded to the user more accurately.

According to various embodiments of the disclosure, a user can be detected based on various types of sensing by a plurality of electronic devices, an electronic device (e.g., user peripheral electronic device) at a location expected as the recognition range (e.g., audible range) of the user can be determined, and notification related to the user can be provided through the corresponding electronic device. A user can be detected by interworking a plurality of electronic devices based on a sound, and notification of any one electronic device can be forwarded to the user more clearly and precisely through an electronic device in the vicinity of the user.

According to various embodiments of the disclosure, notification or information can be provided more accurately through an electronic device most close to the current location of a user or capable of forwarding the notification or information most easily based on a sound which may naturally occur during the life of the user, such as a surrounding sound of the user and/or a given sound, without given setting of the user. When an electronic device has notification, it does not generate the notification if there is no user nearby, and may forward the notification to another electronic device in the vicinity of the user. Accordingly, although an electronic device distant from a user has notification, the user can recognize the notification of the electronic device distant from the user and/or the type of notification through a different electronic device in the vicinity of (or in proximity to) the user. The usability, ease, accessibility, reliability, or competitiveness of an electronic device for the notification recognition of a user can be improved.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
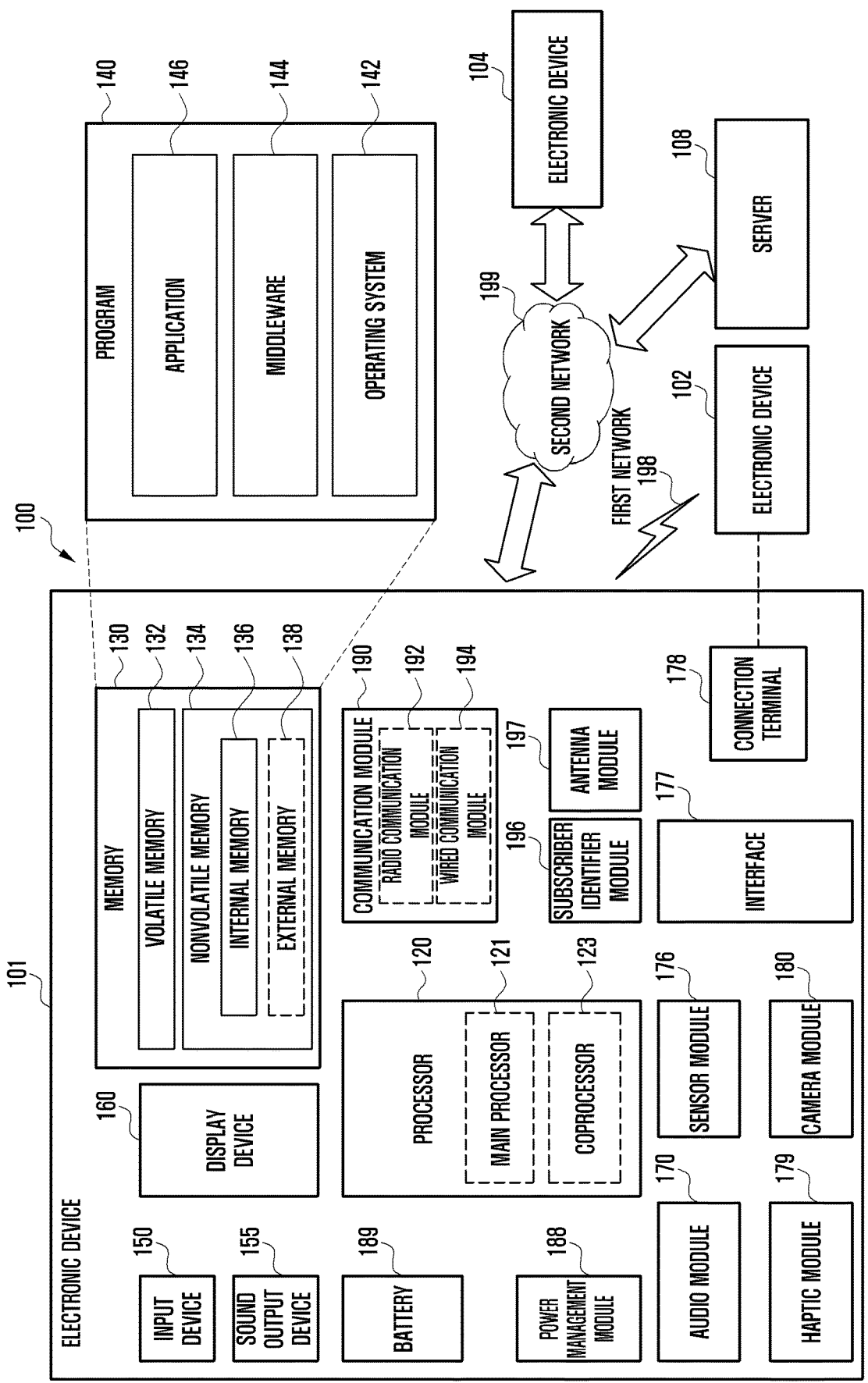
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. At least one (e.g., the display device 160 or the camera module 180) of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other components (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of an external electronic device (e.g., an electronic device 102) directly (e.g., over wires) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., over wires) or wirelessly. The interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). The connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a PCB). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
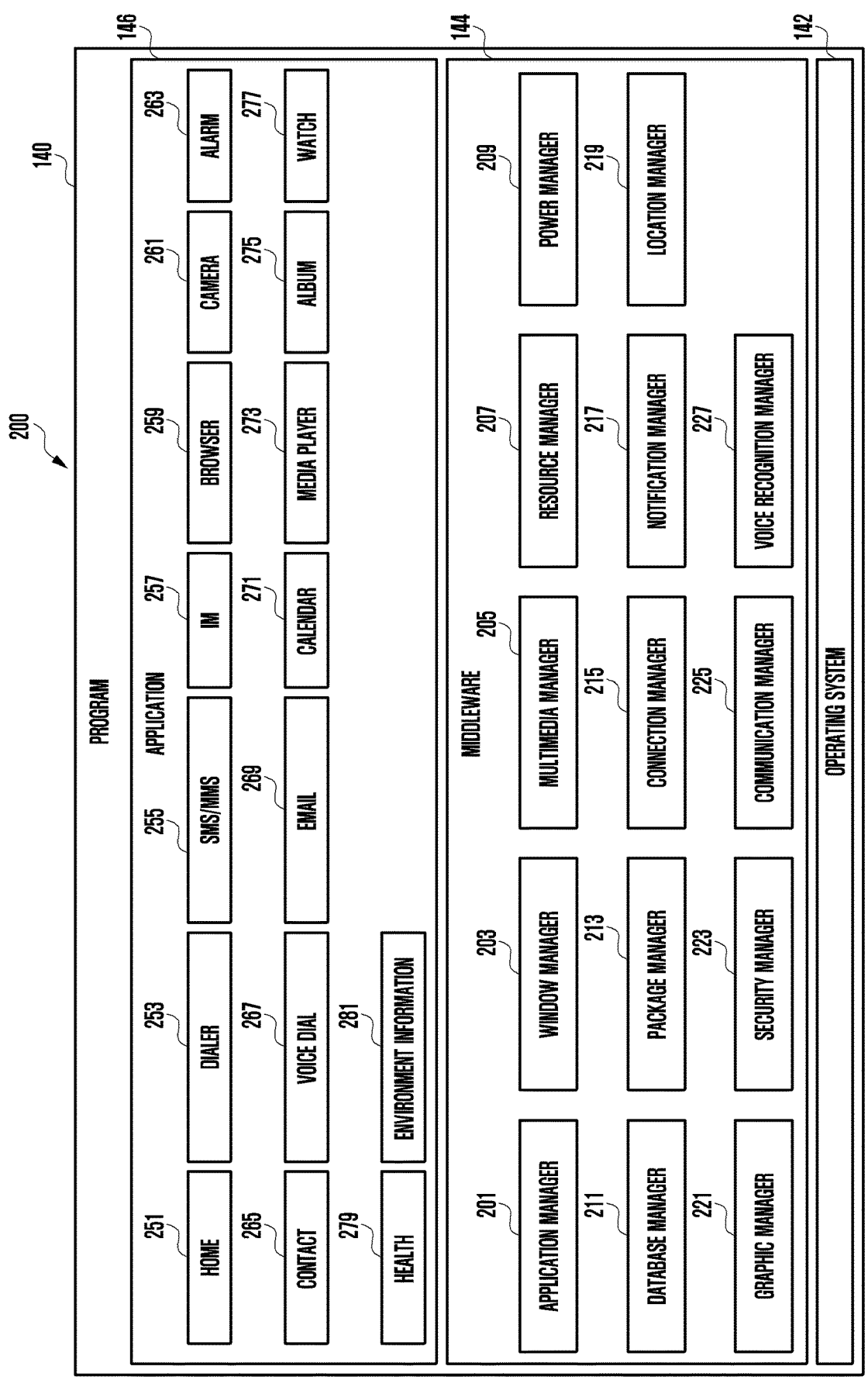
FIG. 2 is a block diagram of a program according to an embodiment of the disclosure.

FIG. 2 is a block diagram 200 illustrating the program 140 according to an embodiment of the disclosure.

Referring to FIG. 2, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a communication manager 225, or a voice recognition manager 227.

The application manager 201 may manage the life cycle of the application 146. The window manager 203 may manage one or more graphical user interface (GUI) resources that are used on a screen. The multimedia manager 205 may identify one or more formats to be used to play media files, and may encode or decode a corresponding one of the media files using a codec appropriate for a corresponding format selected from the one or more formats. The resource manager 207 may manage the source code of the application 146 or a memory space of the memory 130. The power manager 209 may manage the capacity, temperature, or power of the battery 189, and determine or provide related information to be used for the operation of the electronic device 101 based at least in part on corresponding information of the capacity, temperature, or power of the battery 189. The power manager 209 may interwork with a basic input/output system (BIOS) (not shown) of the electronic device 101.

The database manager 211 may generate, search, or change a database to be used by the application 146. The package manager 213 may manage installation or update of an application that is distributed in the form of a package file. The connectivity manager 215 may manage a wireless connection or a direct connection between the electronic device 101 and the external electronic device. The notification manager 217 may provide a function to notify a user of an occurrence of a specified event (e.g., an incoming call, message, or alert). The location manager 219 may manage locational information on the electronic device 101. The graphic manager 221 may manage one or more graphic effects to be offered to a user or a user interface related to the one or more graphic effects.

The security manager 223 may provide system security or user authentication. The communication manager 225 may manage a voice call function or a video call function provided by the electronic device 101. The voice recognition manager 227 may transmit a user's voice data to the server 108, and receive, from the server 108, a command corresponding to a function to be executed on the electronic device 101 based at least in part on the voice data, or text data converted based at least in part on the voice data. The middleware 244 may dynamically delete some existing components or add new components. At least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. The application 146 may further include an information exchanging application (not shown) that is capable of supporting information exchange between the electronic device 101 and the external electronic device.

The information exchange application may include a notification relay application adapted to transfer designated information (e.g., a call, message, or alert) to the external electronic device or a device management application adapted to manage the external electronic device.

The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

The electronic device 101 according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., over wires), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 3:
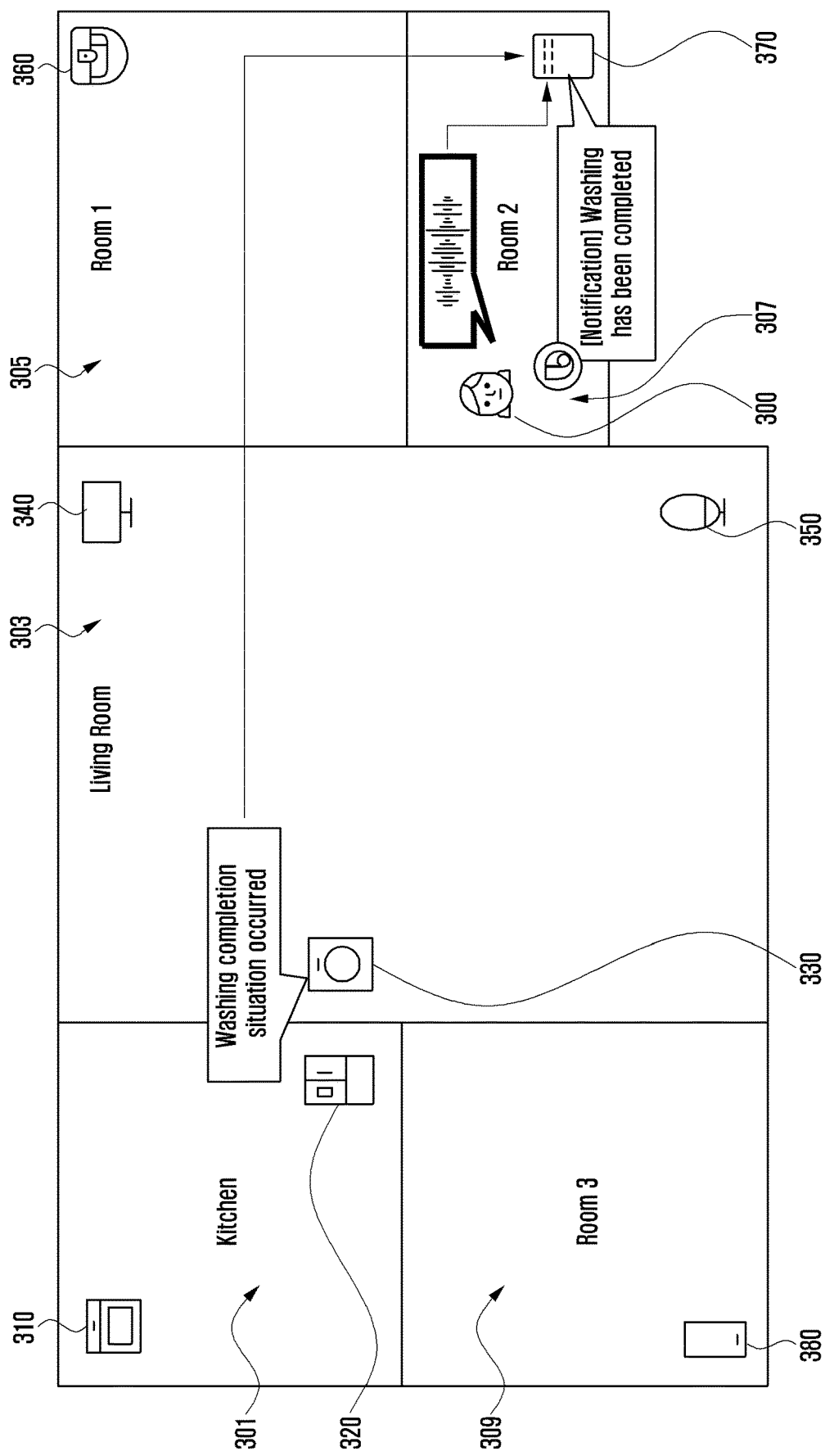
FIG. 3 is a diagram for illustrating a network environment for providing notification according to an embodiment of the disclosure.

FIG. 3 is a diagram for illustrating a network environment for providing notification according to an embodiment of the disclosure.

FIG. 3 illustrates a floor plan within a home (or the inside structure of the home) for convenience of description, and shows an example in which various types of electronic devices are present at various places (or positions) in a given space within a home. FIG. 3 shows an example in which a first electronic device 310 (e.g., microwave range) and a second electronic device 320 (e.g., refrigerator) are present in a kitchen 301, a third electronic device 330 (e.g., washer (or washer machine)), a fourth electronic device 340 (e.g., TV), and a fifth electronic device 350 (e.g., smart speaker) are present in a living room 303, a sixth electronic device 360 (e.g., robotic vacuum cleaner) is present in a room 1 305, a seventh electronic device 370 (e.g., air purifier (or air cleaner)) is present in a room 2 307, and an eighth electronic device 380 (e.g., smartphone) is present in a room 3 309.

In the environment in which a plurality of electronic devices is present in a given space as in FIG. 3, a given situation related to notification may occur (e.g., the occurrence of a washing completion situation or the reception of a call from the outside) in at least any one electronic device (e.g., third electronic device 330), and a user 300 may be present in a second place (e.g., room 2 307) different from the first place (e.g., living room 303) where the third electronic device 330 is present. The notification may include a notification generated within the electronic device 101 (or itself) due to the execution of a function (e.g., the start or completion of the execution of a function) or notification generated based on the reception of a trigger (e.g., the reception of a call or the reception of a message) related to the occurrence of the notification from an external device (or source device) (e.g., external different electronic device or server). The notification may include a notification or information related to the internal execution of a function of an electronic device or related to a function obtained from the outside. For example, the notification may be used as a meaning, including a notification (e.g., notification related to any function) occurring based on the start or completion of any function inside or outside an electronic device or information related to any function.

If a given electronic device (e.g., third electronic device 330) (hereinafter referred to as a "source electronic device") has notification, the source electronic device may detect the user 300 before the source electronic device outputs the notification, may identify an electronic device (e.g., seventh electronic device 370) (hereinafter referred to as a "target electronic device") positioned in the vicinity of the user 300 and capable of easily forwarding the notification to the user 300, and may provide the user 300 with the notification through the target electronic device.

When the occurrence of the notification is detected (e.g., when the third electronic device 330 detects washing completion), the source electronic device may collect (or gather) various information (e.g., sensing information or sound information), related to the detection of the user 300, from peripheral electronic devices before the source electronic device outputs the notification. Each of the electronic devices (e.g., first electronic device 310 to seventh electronic device 370) may perform sensing (e.g., based on situation recognition or based on a sound) on the surrounding situation of each electronic device using various methods. The electronic devices 310 to 370 may provide unspecified other electronic devices with situation information (or detection information) according to situation sensing.

A sensing operation may include an operation for each of the electronic devices 310 to 370 to perform situation recognition for detection (or measuring) various situations occurring in an electronic device or in the vicinity of the electronic device in real time. A sensing operation may include an operation of recognizing or identifying a situation using various types of sensing techniques, such as the collection (or reception) of a surrounding sound, the collection (or photographing) of a surrounding image, identifying whether an object (or user) is proximate, identifying whether an object has been sensed, identifying whether there is a change in the environment (e.g., surrounding temperature, body temperature, illuminance or humidity), identifying the use state of an electronic device, identifying the type of notification, or identifying the on or off state of an electronic device. The sensing techniques may include a voice recognition technique, sensor techniques based on various sensors (e.g., sound sensor, image sensor (e.g., camera), proximity sensor, temperature sensor, humidity sensor, ultrasonic sensor, pressure sensor, gas sensor, acceleration sensor or illuminance sensor), a machine learning technique (e.g., artificial intelligence (AI) technique), or a data collection technique based on an electronic tag (radio frequency identification (RFID) and Internet of things (IoT) technique).

Situation information (or detection information) may include collection information obtained (or collected or measured) through a sensing operation in each electronic device. For example, the situation information may include at least one of various types of sensing information, such as first sensing information (e.g., sound (e.g., voice) information), second sensing information (e.g., photographing information), third sensing information (e.g., proximity information), fourth sensing information (e.g., object sensing information), fifth sensing information (e.g., environment sensing information), sixth sensing information (e.g., state information related to device use), seventh sensing information (e.g., type information related to the type of notification), or eighth sensing information (e.g., state information related to the on or off of an electronic device). Situation information according to is not limited to the first sensing information to the eighth sensing information, and may further include different sensing information based on various types of sensing techniques (or situation recognition techniques).

The electronic devices 310 to 370 may be interconnected using various methods. For example, the electronic devices 310 to 370 may be interconnected based on an Internet protocol (IP) (IP-based), based on Wi-Fi, or based on a unique identifier (ID).

The electronic devices 310 to 370 may be interconnected based on at least one communication channel of a direct (e.g., wired) communication channel or a radio communication channel, and may provide situation information through a connected communication channel. The electronic devices 310 to 370 may transmit situation information (or detection information) through a connected communication channel using a broadcasting or multicasting method. The electronic devices 310 to 370 may transmit situation information using a unicasting method through a communication channel connected to at least one electronic device. The unicasting method may include a method in which a source electronic device having notification requests peripheral electronic devices to transmit situation information and the peripheral electronic devices that have obtained the request transmit the situation information to the source electronic device. When the occurrence of a notification is detected, the electronic devices 310 to 370 may play the role of central control equipment, a hub, an artificial intelligence device (e.g., AI speaker), or a central server (or integration server) capable of collecting and processing situation information from peripheral electronic devices.

The electronic devices 310 to 370 may be connected to a server (e.g., internal server or external server). For example, each of the electronic devices may operate as a centralized control system in which all processing processes (or a flow of data) related to the provision of notification to a user is controlled by a given server. The given server may include an internal server positioned in the same space as the electronic devices 310 to 370 or an external server positioned outside the space of the electronic devices. For example, the internal server may use separate central control equipment or any one electronic device as a central server, for example. For example, the external server is a server anywhere of the outside (e.g., on the Internet), and may include a cloud server, an account server, a service server or a web server, for example.

The server may be connected to the electronic devices 310 to 370 based on at least one of a direct (e.g., wired) communication channel or a radio communication channel. The server may process the connection, collection and analysis of data, or control of a flow of data of the electronic devices 310 to 370, which are related to identifying a source electronic device in which notification occurs, collecting situation information from the electronic devices 310 to 370, identify a target electronic device for providing a user with the notification of a source electronic device based on collected situation information, and providing the notification of a source electronic device to a user by outputting the notification through an identified target electronic device. The role of the server may be implemented to perform the role using any one of the electronic devices 310 to 370 within the same space or may be implemented to perform the role of a source electronic device in which notification occurs.

Figure 4:
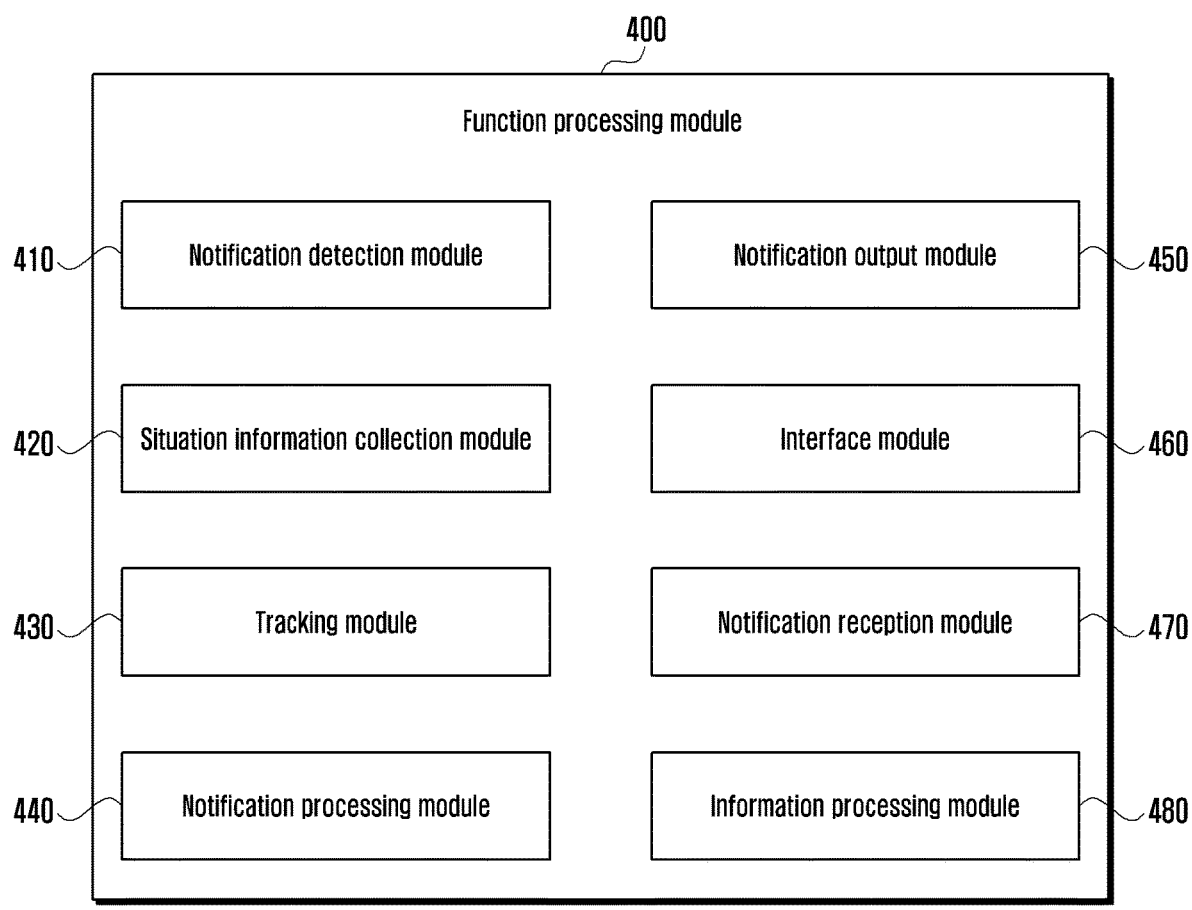
FIG. 4 is a diagram showing an example of a function processing module in an electronic device according to an embodiment of the disclosure.

FIG. 4 is a diagram showing an example of a function processing module in an electronic device according to an embodiment of the disclosure.

Referring to FIG. 4, an example of a module (e.g., function processing module 400) for executing functions related to detecting a user based on situation information of a plurality of electronic devices and providing the user with the notification of a source electronic device using a target electronic device in the vicinity of the user if the source electronic device has notification in a network environment is shown. For example, FIG. 4 shows an example of the function processing module 400, related to forwarding, to a user, notification occurred in a given one of a plurality of interworked electronic devices through an electronic device in proximity to (or in the vicinity of) the user more clearly. The function processing module 400 may be included as a hardware module or a software module in a processor (e.g., the processor 120 of FIG. 1), including processing circuitry of the electronic device 101 or a server.

Referring to FIG. 4, the function processing module 400 may include a notification detection module 410, a situation information collection module 420, a tracking module 430, a notification processing module 440, a notification output module 450, an interface module 460, a notification reception module 470 or an information processing module 480.

The notification detection module 410 may detect notification, related to at least one function, in the electronic device 101. The notification detection module 410 may detect notification occurring based on the execution of a function (e.g., the start or completion of the execution of a function) within the electronic device 101 based on at least a characteristic (or type) of the electronic device 101 or notification obtained from the outside (e.g., external different electronic device or server). For example, if the electronic device 101 is a washer, the electronic device 101 may perform a washing operation. The notification detection module 410 may detect notification (e.g., the occurrence of a washing completion situation) based on the completion of the washing operation of the electronic device 101. The notification detection module 410 may forward, to the situation information collection module 420, a trigger based on the occurrence of notification in response to the detection of the notification.

The situation information collection module 420 may collect situation information based on the electronic device 101 and situation information based on a least one peripheral external electronic device (hereinafter referred to as a "peripheral electronic device"). The situation information collection module 420 may collect situation information using various sensors (e.g., the sensor module 176 of FIG. 1, the camera module 180 of FIG. 1 or the input device 150 of FIG. 1 (e.g., microphone)) of the electronic device 101. The situation information collection module 420 may obtain situation information from a peripheral electronic device. When notification occurs in the electronic device 101, the situation information collection module 420 may transmit (or broadcast) a message to request a peripheral electronic device to transmit situation information through the interface module 480, and may obtain the situation information from the peripheral electronic device as a response thereto. The situation information may include at least one of various types of sensing information, such as first sensing information (e.g., sound information), second sensing information (e.g., photographing information), third sensing information (e.g., proximity information), fourth sensing information (e.g., object sensing information), fifth sensing information (e.g., environment sensing information), sixth sensing information (e.g., state information related to device use), seventh sensing information (e.g., type information related to type of notification), or eighth sensing information (e.g., state information related to the on or off of an electronic device). Situation information is not limited to the first sensing information to the eighth sensing information, and may further include different sensing information based on various types of sensing techniques (or situation recognition techniques).

If the electronic device 101 is not a source electronic device in which notification occurs, but an electronic device (or plays the role of the electronic device) that receives notification from the source electronic device, when the situation information collection module 420 receives a request from the source electronic device, it may obtain (or collect) surrounding situation information of the electronic device 101 periodically or aperiodically. When the electronic device 101 receives a message (e.g., request message) to request the transmission of situation information from an external peripheral device (e.g., source electronic device), the situation information collection module 420 may obtain (or collect) surrounding situation information of the electronic device 101 in response thereto.

The tracking module 430 may analyze collected situation information, and may identify a target electronic device that will output the notification of the electronic device 101 based on a result of the analysis. The tracking module 430 may identify at least one of the electronic device 101 or peripheral electronic devices as a target electronic device. The tracking module 430 may identify (or analyze) situation information, belonging to collected situation information and including information related to user detection, by analyzing the situation information. For example, the information related to user detection may include sound information including the voice of a person (e.g., user), image information (or photographing information) including a shape of a subject for photographing (e.g., user), state information indicating that a device is used, environment information based on body temperature, or proximity information indicating that a user is proximate. The tracking module 430 may identify an electronic device that has provided identified situation information as a target electronic device. The electronic device 101 and a peripheral electronic device may together provide situation information and unique ID information capable of device identification. The ID information may include a device ID (or object ID) (e.g., serial number), identification code, address information (e.g., IP address or MAC address), or information on the place (or location) where a corresponding electronic device is installed (or positioned) within a space (e.g., house). According to an embodiment, the tracking module 430 may identify (or recognize) a target electronic device based on at least ID information.

An example of a message provided by the electronic device 101 and a peripheral electronic device may be shown as in Table 1.

TABLE 1

| TYPE | ID INFORMATION | DATA |
| --- | --- | --- |
| Context | ID | First format, second format, third format, . . . , or Null |

As illustrated in Table 1, the format of messages (or packets) exchanged between electronic devices may include the type field of data (or message), an ID information field related to an electronic device, or a data field related to data collected in the electronic device, for example. The type field may include information indicating that a transmitted message is related to situation information. The ID information field may include information by which an electronic device that has transmitted (or generated) data can be identified. The data field may include data corresponding to the data format of transmitted situation information. The data field may include data related to a collected situation, such as a first format (e.g., sound), a second format (e.g., image), or a third format (e.g., voice (or voice recognition file)). If there is no data related to situation information in any one electronic device, a message is not transmitted or null data (or '0' or empty) may be included in the data field of the message and provided.

The notification processing module 440 may process the internal output or external output of notification detected by the notification detection module 410. The notification processing module 440 may identify (or distinguish) a target electronic device identified by the tracking module 430. For example, the notification processing module 440 may identify whether an electronic device identified by the tracking module 430 is its own electronic device 101 or a different electronic device. If a target electronic device is the electronic device 101 itself, the notification processing module 440 may enable notification to be output (e.g., internal output) through the electronic device 101 based on the notification output module 470. If a target electronic device is a different electronic device (e.g., one of peripheral electronic devices), the notification processing module 440 may enable notification to be output (e.g., external output) through the different electronic device based on the interface module 480.

The notification output module 450 may output notification delivered through the notification processing module 440. According to an embodiment, the notification output module 450 may control the internal output of notification through at least one output device (e.g., the display device 160 of FIG. 1, the sound output device 155 of FIG. 1 or the haptic module 179 of FIG. 1) of the electronic device 101 based on at least the attribute of the notification. If the attribute of notification is a display attribute, the notification output module 450 may output (e.g., display a message) the notification through the display device 160. If the attribute of notification is a sound (or audio) attribute, the notification output module 450 may output (e.g., voice output or sound output) the notification through the sound output device 155. If the attribute of notification is a vibration attribute, the notification output module 450 may output (e.g., vibration output) the notification the haptic module 179. If the attribute of notification is a lighting (or light source) attribute, the notification output module 450 may output (e.g., lighting output) the notification through a lighting device (e.g., light-emitting diode (LED) or display) included in the electronic device 101. If the attribute of notification includes at least two attributes, the notification output module 450 may output (e.g., notification message display and notification audio output) the notification complexly in accordance with the corresponding attributes.

The interface module 460 may transmit, to a target electronic device, notification delivered through the notification processing module 440 based on a communication interface (e.g., the interface 177 of FIG. 1 or the communication module 190 of FIG. 1) connected (or formed with) to the target electronic device. The interface module 460 may include a function (or role) for connecting with a peripheral electronic device through at least one communication channel (e.g., direct (e.g., wired) communication channel or a radio communication channel) for the exchange of information with the peripheral electronic device. The interface module 460 may transmit notification (or data and/or instruction related to notification) to a target electronic device through at least one communication channel connected to the target electronic device.

If the electronic device 101 is not a source electronic device in which notification occurs, but an electronic device (or device playing the role of the electronic device) that receives notification from the source electronic device, the interface module 460 may obtain a request message to request the transmission of situation information based on a communication channel connected to the source electronic device. If the electronic device 101 is a target electronic device (or playing the role thereof), the interface module 460 may obtain notification through a communication channel connected to a source electronic device.

The electronic device 101 may operate as a target electronic device (or play the role thereof) that receives notification from a source electronic device. The notification reception module 470 may detect the reception of notification through the interface module 460, and may forward a trigger based on the reception of the notification to the notification processing module 440 or the information processing module 480 in response to the detection of the reception of the notification. The notification reception module 470 may forward notification (or data (or source data) related to the notification) to the notification processing module 440 or the information processing module 480 based on at least the attribute of the obtained notification and the type of electronic device 101. If the obtained notification (or source data) is a form that may be output by the electronic device 101 (or the attribute of notification supportable by the electronic device 101), the notification reception module 470 may forward the notification to the notification processing module 440. If obtained notification (or source data) is a form that cannot be output by the electronic device 101, the notification reception module 470 may forward the notification to the information processing module 480. For example, if the electronic device 101 is a smart speaker and obtained notification is a sound attribute, the notification reception module 470 may forward the notification to the notification processing module 440 so that the notification is processed. For example, if the electronic device 101 is a smart speaker and obtained notification is a display attribute, the notification reception module 470 may forward the notification to the information processing module 480 so that a form (or format) of the notification is changed into a form that may be output by the electronic device 101.

The information processing module 480 may change (or process) notification (or source data related to the notification), obtained from a source electronic device, into a form that may be output by the electronic device 101. If the electronic device 101 is a smart speaker capable of sound output and obtained notification is a display attribute, the information processing module 480 may change a form (or format) of the notification into a sound format that may be output by the electronic device 101, and may forward the changed notification to the notification processing module 440. If the electronic device 101 operates as a source electronic device, the information processing module 480 may further include an operation of changing (or processing) notification, transmitted to a target electronic device, into the attribute of the notification corresponding to the type (or attribute) of target electronic device and forwarding the changed notification to the interface module 460.

As described above, the electronic device 101 according to various embodiments of the disclosure includes a communication interface and the processor 120. The processor 120 may enable a first message related to notification to be obtained from an external device, may enable a target electronic device that will output the notification to be identified based on the location of a user and notification output performance of each of plurality of electronic devices capable of communication with the electronic device 101, and may enable a second message related to the notification to be transmitted to a target device so that the identified target electronic device outputs the notification.

According to various embodiments of the disclosure, the processor 120 includes notification output performance capable of notification output, and may enable an electronic device in proximity to the user to be identified as the target electronic device that will output the notification.

According to various embodiments of the disclosure, the processor 120 may enable first notification output performance related to the notification and second notification output performance of each of the plurality of electronic devices to be identified, may enable an electronic device that belongs to the plurality of electronic devices and that includes the second notification output performance corresponding to the first notification output performance to be identified, and may enable an electronic device that belongs to the identified electronic devices and that is in proximity to the user to be identified as the target electronic device.

According to various embodiments of the disclosure, if an electronic device that belongs to the plurality of electronic devices and that includes the second notification output performance corresponding to the first notification output performance is not present, the processor 120 may enable an electronic device that belongs to the plurality of electronic devices and that is in proximity to the user to be identified as the target electronic device.

According to various embodiments of the disclosure, the processor 120 is configured to identify the attribute of the target electronic device, configure a third message of a format corresponding to the attribute of the target electronic device, and output the third message to the target electronic device. The third message may include the summary of the notification.

According to various embodiments of the disclosure, the processor 120 may identify a candidate electronic device capable of notification output based on the notification output performance, and may identify whether the candidate electronic device is in proximity to the user. If the candidate electronic device is not proximate to the user and is a movable electronic device, the processor may identify the candidate electronic device as the target electronic device and control a movement of the target electronic device to the location of the user.

According to various embodiments of the disclosure, if the target electronic device is capable of a hands-off function, the processor 120 may enable a function related to notification by the hands-off to be performed by the target electronic device.

As described above, the electronic device 101 according to various embodiments of the disclosure includes at least one situation collection interface for collecting situation information related to user detection, a communication interface for communication with at least one different electronic device, and the processor 120. The processor 120 may enable notification related to at least one function to be detected, may enable situation information related to a user to be collected based on a plurality of electronic devices in response to the detection of the notification, may enable a target electronic device that belongs to the plurality of electronic devices and that will output the notification to be identified based on the situation information, and may enable the target electronic device to output the notification to the user by providing the notification information to the target electronic device.

According to various embodiments of the disclosure, the processor 120 may enable notification occurring based on the execution of a function of an electronic device based on at least a characteristic of the electronic device or notification obtained from the outside to be detected.

According to various embodiments of the disclosure, the processor 120 is configured to identify at least one of the type of notification or the sub-classification of the notification in response to the detection of the notification. The type of notification may include general notification of an attribute which may be provided to a user unidirectionally or feedback notification of an attribute that requires the feedback of a user or an interaction with the user. The sub-classification may include personal notification, common notification, or emergency notification.

According to various embodiments of the disclosure, the processor 120 searches the plurality of electronic devices for an association electronic device associated with the notification. If an association electronic device is not retrieved, the processor may collect situation information based on the plurality of electronic devices. If an association electronic device is retrieved, the processor may enable the situation information to be collected based on the association electronic device.

According to various embodiments of the disclosure, the processor 120 may identify the target electronic device based on situation information, including information related to a user, from the situation information, and may identify the space of the target electronic device. The processor may enable the notification to be output based on an electronic device if the space of the target electronic device is the same as the space of the electronic device, and may enable the notification to be output based on the target electronic device if the space of the target electronic device is different from the space of the electronic device.

According to various embodiments of the disclosure, the processor 120 may select a target electronic device for outputting notification based on the attribute of the notification.

According to various embodiments of the disclosure, if the attribute of the notification is the notification of a given attribute that requires a given element, the processor 120 may identify whether the notification of the given attribute may be output by identifying the attribute of each of the plurality of electronic devices, and may identify the target electronic device by prioritizing an electronic device supporting the notification of the given attribute.

According to various embodiments of the disclosure, the processor 120 may enable a movable target electronic device to move to the space where a user is present so that the movable target electronic device outputs the notification.

According to various embodiments of the disclosure, the electronic device 101 includes an element capable of situation recognition. The processor 120 may obtain an instruction that enables situation recognition to be performed after a movement to the space of a destination related to the situation notification, may enable situation recognition to be performed on a user after a movement to the space of the destination in response to the instruction, and may enable result information based on the results of the execution of the situation recognition to be transmitted to a given target electronic device.

According to various embodiments of the disclosure, the processor 120 may enable a message to request the plurality of electronic devices to transmit situation information to be transmitted through a communication interface in response to the detection of notification, and may enable the situation information to be collected from the plurality of electronic devices in response to the transmission of the message.

According to various embodiments of the disclosure, the electronic device 101 may include a source electronic device, central control equipment, a hub, an artificial intelligence (AI) device or a cloud server.

Figure 5:
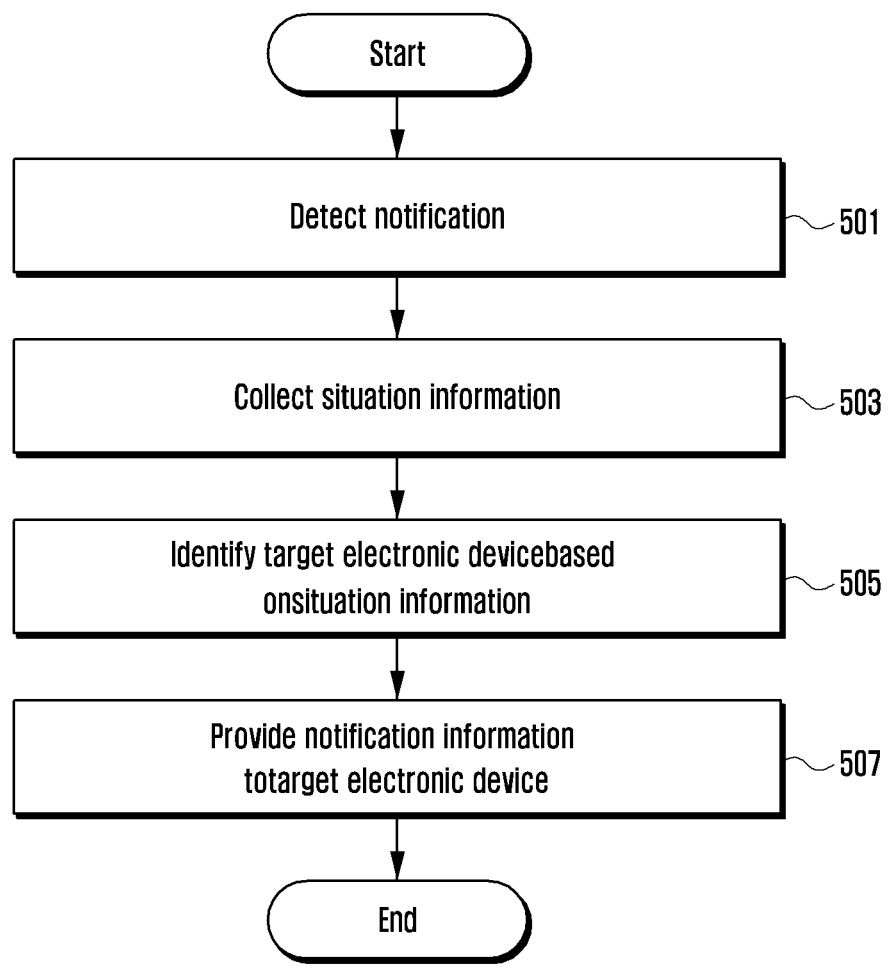
FIG. 5 is a flowchart showing an operating method of an electronic device according to an embodiment of the disclosure.

FIG. 5 is a flowchart showing an operating method of an electronic device according to an embodiment of the disclosure.

For example, FIG. 5 shows an example where the electronic device 101 operates as a source electronic device in which notification occurs.

Referring to FIG. 5, at operation 501, the processor 120 (e.g., at least one processor including processing circuitry or the function processing module 400 of FIG. 4) of the electronic device 101 may detect notification related to at least one function of the electronic device 101. The processor 120 may identify the type of notification corresponding to detected notification in response to the detection of the notification. The processor 120 may detect notification internally occurred based on the execution of a function (e.g., the start or completion of the execution of the function) or notification obtained from the outside (e.g., external different electronic device or server) (e.g., notification related to the reception of a call connection request or the reception of a message using the electronic device 101 as a destination (or recipient)) based on at least a characteristic (or type) of the electronic device 101.

At operation 503, the processor 120 may collect situation information. The processor 120 may collect situation information based on the electronic device 101 and situation information based on at least one peripheral electronic device. The processor 120 may collect situation information based on various sensors (e.g., the sensor module 176 of FIG. 1, the camera module 180 of FIG. 1 or the input device 150 (e.g., microphone) of FIG. 1) of the electronic device 101. The processor 120 may obtain situation information, collected by a peripheral electronic device, from the peripheral electronic device. If the notification occurs in the electronic device 101, the processor 120 may transmit (or broadcast) a message to request the transmission of situation information from a peripheral electronic device through the interface module 480, and may obtain the situation information from the peripheral electronic device as a response thereto.

At operation 505, the processor 120 may identify a target electronic device based on the situation information. The processor 120 may analyze collected situation information, and may identify a target electronic device that will output the notification of the electronic device 101 based on a result of the analysis. The processor 120 may identify the electronic device 101 or at least one of peripheral electronic devices as a target electronic device. The processor 120 may identify (or analyze) situation information, belonging to collected situation information and including information related to user detection, by analyzing the situation information. When a target electronic device is identified, the processor 120 may identify the target electronic device based on the type of notification. An operation of identifying a target electronic device based on at least the type of notification or situation information is described later.

At operation 507, the processor 120 may provide notification information to the target electronic device. The processor 120 may transmit, to the target electronic device, notification information (e.g., data related to a notification message, notification voice or notification sound) related to the notification through a communication interface (e.g., the interface 177 of FIG. 1 or the communication module 190 of FIG. 1) connected to the target electronic device so that the notification occurred in the electronic device 101 is output by the target electronic device. If the electronic device 101 is identified as a target electronic device, the processor 120 may enable the notification to be output based on the electronic device 101.

Figure 6:
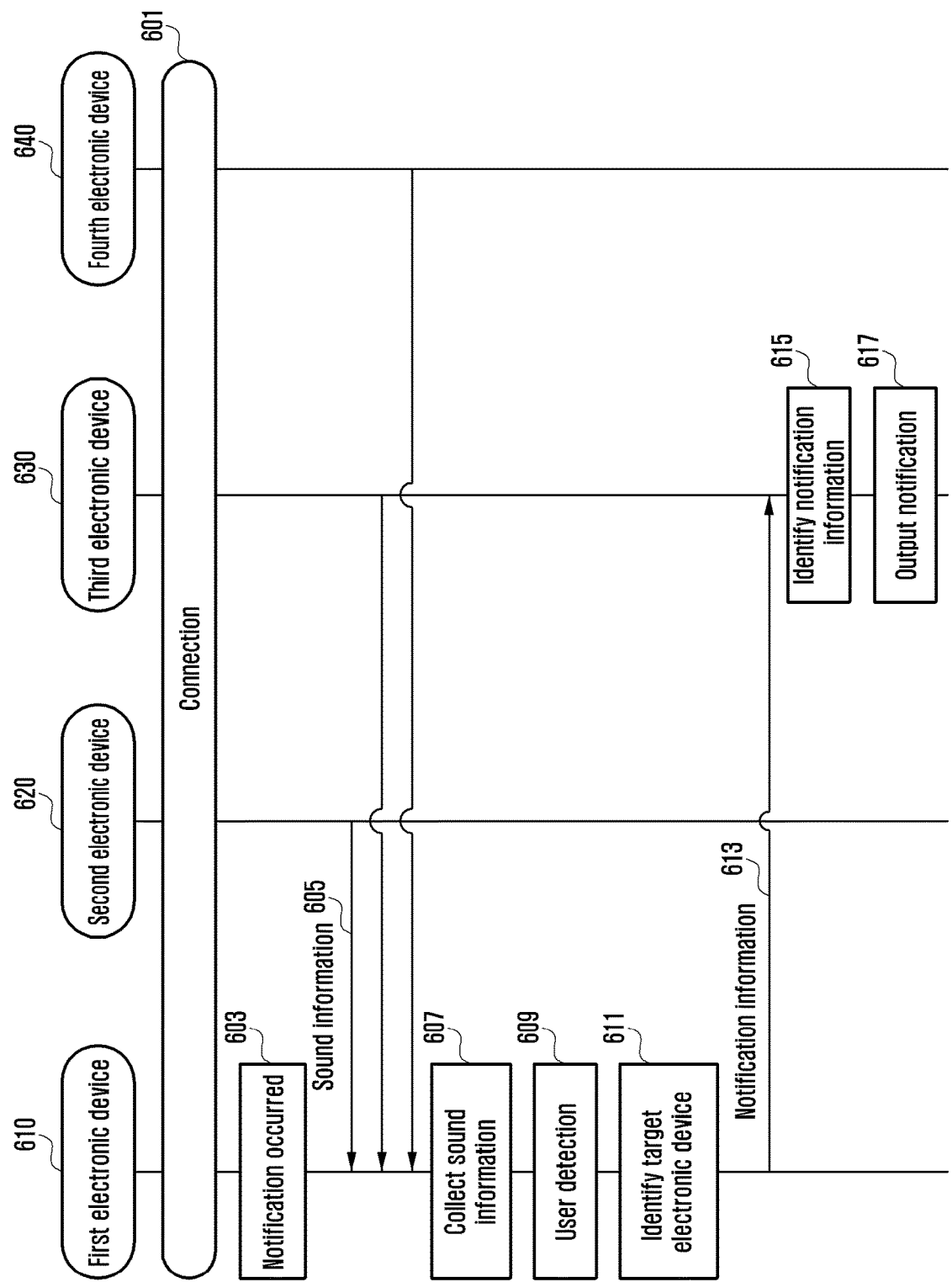
FIG. 6 is a diagram for illustrating an example in which notification is provided by interworking electronic devices in a network environment according to an embodiment of the disclosure.

FIG. 6 is a diagram for illustrating an example in which notification is provided by interworking electronic devices in a network environment according to an embodiment of the disclosure.

Referring to FIG. 6, an example is shown in which a first electronic device 610 is a source electronic device and a second electronic device 620, third electronic device 630 and fourth electronic device 640 are peripheral electronic devices disposed at different places in the same space as that of the first electronic device 610. In FIG. 6, an example in which the electronic devices 610 to 640 provide or collect situation information based on a sound is described, but various embodiments of the disclosure are not limited thereto. Situation information (or detection information) may include collection information obtained (or collected or measured) by the sensing operation of each of the electronic devices 610 to 640. For example, the situation information may include at least one of various types of sensing information, such as first sensing information (e.g., sound (e.g., voice, music, TV sound or other life sound) information), second sensing information (e.g., photographing information), third sensing information (e.g., proximity information), fourth sensing information (e.g., object sensing information), fifth sensing information (e.g., environment sensing information), sixth sensing information (e.g., state information related to device use), seventh sensing information (e.g., type information related to type of notification), or eighth sensing information (e.g., state information related to the on or off of an electronic device). Situation information according to various embodiments of the disclosure are not limited to the first sensing information to the eighth sensing information, and may further include different sensing information based on various types of sensing techniques (or situation recognition techniques).

Referring to FIG. 6, at operation 601, the first electronic device 610, the second electronic device 620, the third electronic device 630, and the fourth electronic device 640 may be interconnected. The electronic devices 610 to 640 may support the establishment of a direct (or wired) communication channel or a radio communication channel therebetween and the execution of communication through an established communication channel. The electronic devices 610 to 640 may be interconnected through a server (e.g., central control equipment) located in the same space, a given electronic device located in the same space to play the role of a server, or a server (e.g., central server, integration server, account server or cloud server) that is located outside. The electronic devices 610 to 640 may be interconnected over a home network. According to an embodiment, the electronic devices 610 to 640 may be interconnected based on a user account through an account server. FIG. 6 shows an example in which the electronic devices 610 to 640 are directly connected without the intervention of a medium, such as a server.

At operation 603, the first electronic device 610 (e.g., source electronic device) may detect the occurrence of a notification. The first electronic device 610 may detect the occurrence of notification related to at least one function.

At operation 605, when the occurrence of notification is detected, the first electronic device 610 may collect situation information related to the first electronic device 610 and peripheral electronic devices (e.g., second electronic device 620, the third electronic device 630 and the fourth electronic device 640) before it directly outputs the corresponding notification. The first electronic device 610 may obtain (or collect) sound information from the peripheral electronic devices 620, 630, and 640 through a communication interface, and may obtain a sound in the vicinity of the first electronic device 610 through the microphone of the first electronic device 610. The peripheral electronic devices 620 to 640 may measure (or sense) a sound periodically, and may broadcast sound information, including the measured sound, to peripheral electronic devices including the first electronic device 610. The peripheral electronic devices 620 to 640 may measure (or sense) a sound based on a given event (e.g., the reception of a sound information request from the first electronic device 610), and may transmit sound information, including the measured sound, to the first electronic device 610 (e.g., broadcast method). FIG. 6 shows an example in which sound information is used as situation information, but the disclosure is not limited thereto.

At operation 607, the first electronic device 610 may analyze the collected sound information. The first electronic device 610 may identify (or analyze) sound information that belongs to the collected sound information and that includes information related to user detection. For example, the first electronic device 610 may identify sound information that belongs to sound information obtained through the microphone of the first electronic device 610 and sound information obtained from the peripheral electronic devices 620 to 640 and that includes a sound. The first electronic device 610 may obtain a sound from the identified sound information and analyze the sound (e.g., waveform, size or frequency of the sound).

At operation 609, the first electronic device 610 may detect a user based on a result of the analysis. The first electronic device 610 may detect a user in information (e.g., given sound) related to user detection among the collected sound information. The information related to user detection may include a sound including a person (e.g., user)'s voice or a surrounding sound (e.g., stamping sound, footstep sound, door-striking sound, applause sound, desk-striking sound, keyboard-typing sound or TV sound). If information (or sound) related to user detection is included in the collected sound information, the first electronic device 610 may identify that a user is present in the vicinity of an electronic device that provides the corresponding sound.

At operation 611, the first electronic device 610 may identify a target electronic device. The first electronic device 610 may identify an electronic device that has provided information (or sound) that belongs to the collected sound information and that is related to user detection as a target electronic device. The first electronic device 610 may identify (or recognize) a target electronic device based on at least ID information of the peripheral electronic devices 620 to 640. In FIG. 6, an example in which the third electronic device 630 is a target electronic device is described. In various embodiments, identifying a target electronic device by analyzing situation information (e.g., sound) is described with reference to drawings to be described later.

At operation 613, the first electronic device 610 may transmit, to the third electronic device 630, notification information (or notification data) related to the notification based on a communication interface (e.g., the interface 177 of FIG. 1 or the communication module 190 of FIG. 1) connected to (or formed with) the third electronic device 630.

At operation 615, the third electronic device 630 (e.g., target electronic device) may obtain the notification information from the first electronic device 610 through the communication interface and identify the obtained notification information. The third electronic device 630 may further include an operation of identifying the attribute of the notification information and converting (or processing) notification to be output based on at least the attribute of the notification information.

At operation 617, the third electronic device 630 may output notification corresponding to the notification information using at least one method. The third electronic device 630 may provide the user with the notification, generated by the first electronic device 610, by outputting the notification on behalf of the first electronic device 610. The third electronic device 630 may output the notification based on at least one of a visual, auditory or tactile element. The first electronic device 610 may output the notification generated by the first electronic device 610 in a parallel manner that the third electronic device 630 outputs the notification (or after the first electronic device 610 transmits the notification information for notification output to the third electronic device 630).

Figure 7:
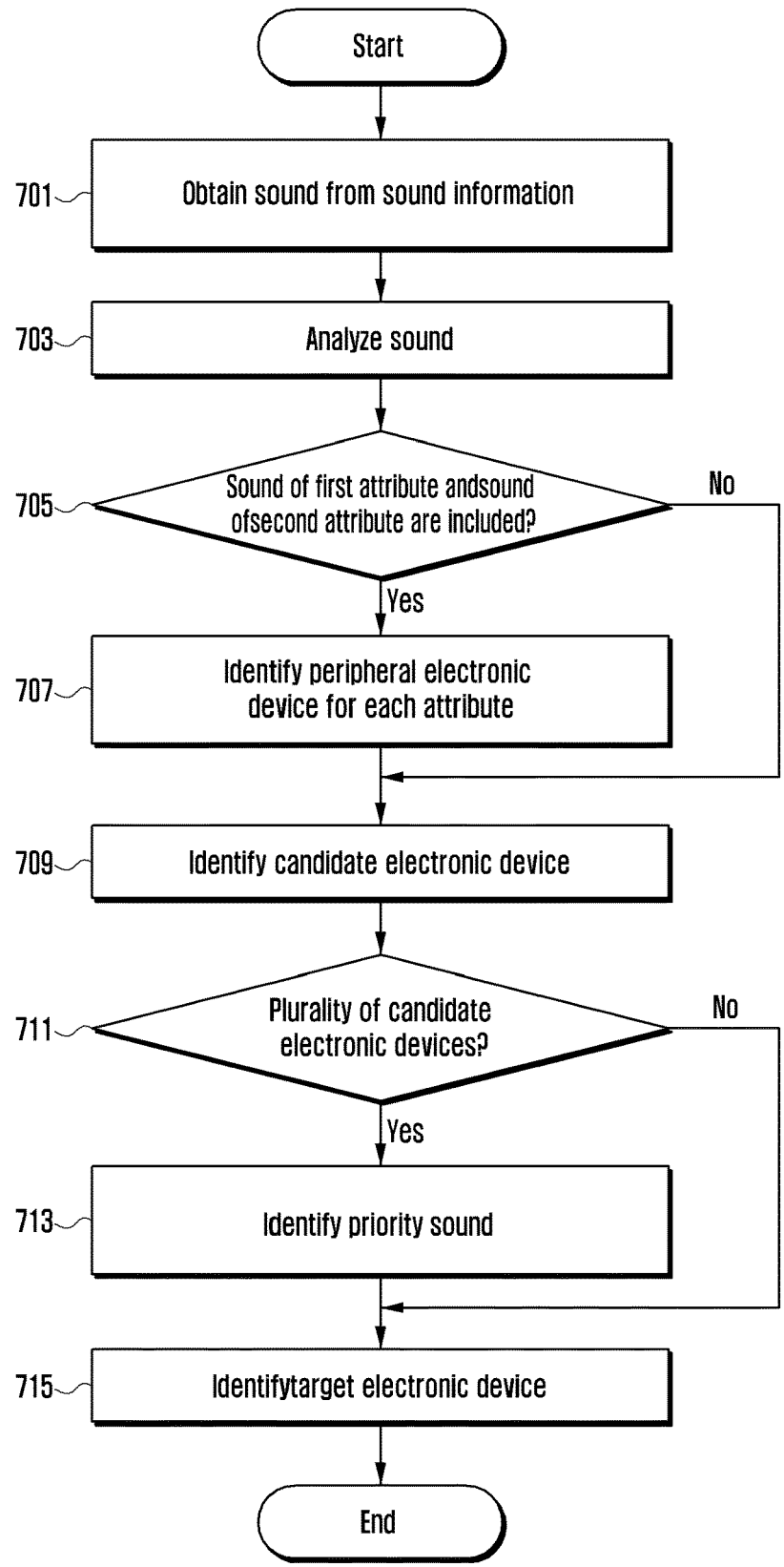
FIG. 7 is a flowchart showing an operating method of determining a target electronic device in an electronic device according to an embodiment of the disclosure.

FIG. 7 is a flowchart showing an operating method of determining a target electronic device in an electronic device according to an embodiment of the disclosure.

Referring to FIG. 7, at operation 701, the processor 120 (e.g., at least one processor including processing circuitry or the function processing module 400 of FIG. 4) of the electronic device 101 may obtain information (e.g., "sound" is illustrated in FIG. 7), related to user detection, from situation information (e.g., "sound information" is illustrated in FIG. 7). The electronic device 101 may collect situation information (e.g., sound information obtained through a microphone) obtained from the electronic device 101, and may collect situation information (e.g., sound information) transmitted by a peripheral electronic device through a communication interface. The processor 120 may identify situation information, including information (e.g., first sensing information to eighth sensing information) related to user detection, and situation information, not including information related to user detection, in the collected situation information. In the example of FIG. 7, the processor 120 may identify sound information, including a sound related to user detection, and sound information, not including a sound related to user detection, in the collected sound information. The processor 120 may exclude sound information, not including a sound, in an operation 703 and subsequent operations thereof, and may perform an operation 703 and subsequent operations there based on sound information including a sound.

At operation 703, the processor 120 may analyze the obtained sound. The processor 120 may analyze the sound based on the waveform, size or frequency of the sound, and may identify the attribute of each sound. The electronic device 101 may store a sound database (DB) related to various sounds, such as that shown in the example of Table 2. The electronic device 101 may obtain a sound DB related to various sounds from an external server.

TABLE 2

| Sound type | Frequency (Hz) | Amplitude (strength) (dB) |
|---|---|---|
| Person's voice | A | a |
| Dialogue sound | B | b |
| Footstep sound | C | c |
| Applause sound | D | d |
| Door-closing sound | E | e |
| Door-striking sound | F | f |
| Desk-striking sound | G | g |
| Keyboard-typing sound | H | h |
| Radio sound | I | i |
| Mixer-turning sound | J | j |
| Food-cutting sound | K | K |
| Sink-draining sound | L | l |
| Cookie-eating sound | M | m |
| Shower sound | N | n |
| Toilet water sound | O | o |
| . . . | . . . | . . . |

As illustrated in Table 2, the sound DB may define sound information (e.g., frequency and/or amplitude) related to various sounds. The sound information may include a frequency (Hz) indicative of the high and low of a sound and amplitude (or sound size) indicative of the intensity (or strength) of a sound. Additionally or alternatively, the sound information may further include a sound waveform for each sound. The sound information for each sound may be represented as an approximate average or range. For example, a person's voice may be configured to include a frequency A (e.g., about 125~1,000 Hz), an applause sound may be configured to include a frequency D (e.g., about 400 Hz), and a dialogue sound may be configured to include amplitude b (e.g., about 65 dB). When a sound becomes loud, a value of the amplitude may increase. The processor 120 may analyze a sound with reference to a sound DB, such as that illustrated in Table 2.

The processor 120 may identify whether at least one of the sound of a first attribute or the sound of a second attribute is included based on a result of analysis. The sound of the first attribute may include a person (or user)'s voice and a surrounding sound (e.g., footstep sound, applause sound, keyboard-typing sound, kitchen noise (e.g., mixer-turning sound or food-cutting sound (e.g., chopping board sound, a cooking sound)), shower sound, or toilet water sound) which may be generated by a person (or user). The sound of the second attribute may include other sounds (e.g., sound (e.g., TV sound or music sound) output by a given device (e.g., TV or a radio)) other than the first attribute. A person's voice and other sounds (e.g., a person's voice output by TV) may be identified based on at least a noise degree of a sound, the waveform of a sound, or state (or playback) information (e.g., TV turn-on information or state information providing notification of TV playback) provided by a corresponding peripheral electronic device that outputs other sounds, for example. In various embodiments, sounds other than the sound of the first attribute or the sound of the second attribute may be considered as noise based on a result of analysis, and thus a corresponding sound may be excluded from a candidate group by which a target electronic device is identified.

If the processor 120 operates based on complex situation information, such as the first sensing information to the eighth sensing information, in addition to sound information as situation information for user detection, the processor 120 may distinguish between the first attribute and the second attribute based on at least sensing information by which a user can be identified (or whether the sensing information has a direct association with the user). The first attribute may include, for example, sensing information including at least one person (image), sensing information including a person's voice, or detection information related to an object or proximity, which may be directly associated with a user. The second attribute may include, for example, sensing information (e.g., environment sensing information) related to an environment change or detection information related to other sounds (e.g., music sound or TV sound), which is not directly associated with a user. Other sensing information in addition to sensing information of the first attribute or detection information of the second attribute may be considered to be noise based on a result of analysis, and corresponding sensing information may be excluded from a candidate group by which a target electronic device may be identified.

Referring back to FIG. 7, at operation 705, the processor 120 may identify whether both the sound of the first attribute and the sound of the second attribute are included based on a result of the analysis.

At operation 705, if the sound of any one of the sound of the first attribute or the sound of the second attribute is detected from the analyzed sound (No at operation 705), the processor 120 may proceed to operation 709 and perform an operation 709 and subsequent operations thereof.

If both the sound of the first attribute and the sound of the second attribute are detected from the analyzed sound, the processor 120 (Yes at operation 705), the processor may identify a peripheral electronic device for each attribute at operation 707. For example, the processor 120 may distinguish between a peripheral electronic device that has provided the sound of the first attribute and a peripheral electronic device that has provided the sound of the second attribute. A peripheral electronic device including a sound for each attribute may be identified with reference to the ID information field and data field of a message as illustrated in Table 1, for example. The identification of a peripheral electronic device for each attribute may be for user detection or user location detection and for providing an optimal electronic device for providing a user with notification more precisely (or accurately), for example. Operation 707 or may be omitted, and an operation of identifying a peripheral electronic device having priority (e.g., candidate electronic device) may be directly performed using a sound as in operation 709.

At operation 709, the processor 120 may identify a candidate electronic device for identifying a target electronic device.

If the process proceeds from operation 707, the processor 120 may identify a candidate electronic device for a target electronic device based on at least the relation (e.g., position relation, place information, or operation state information) between the first attribute and the second attribute or between peripheral electronic devices.

The processor 120 may select a peripheral electronic device that has provided the sound of the first attribute as a candidate electronic device. The processor 120 may identify a mutual association between selected candidate electronic devices with reference to information on the place of each candidate electronic device, and may identify (or provide) a candidate electronic device except some peripheral electronic devices among the selected candidate electronic devices based on a result of the identification.

It may be assumed that a user is present at a given place within a kitchen, a peripheral electronic device that has provided the sound of the first attribute (e.g., an electronic device in the same space (or location) as that of the user or an electronic device in proximity to the space (or location) where the user is present) includes a first device (e.g., microwave range) and a second device (e.g., refrigerator) disposed in the kitchen, a peripheral electronic device that has provided the sound of the second attribute includes a third device (e.g., TV) and a fourth device (e.g., smart speaker) disposed in a living room, and a peripheral electronic device that provides a mixed sound of the first attribute and the second attribute includes a washer present at the place (e.g., laundry room) near the kitchen.

The processor 120 may exclude a third device (e.g., TV) and a fourth device (e.g., smart speaker), having the second attribute, from a candidate electronic device based on the identification of the attribute. The processor 120 may exclude a fifth device, positioned at a distant place (or different place) compared to other device, from a candidate electronic device based on space information of the remaining first device, second device, and fifth device. The processor 120 may provide a candidate electronic device based on the first device and the second device.

If the process proceeds from operation 705, the processor 120 may identify a candidate electronic device for a target electronic device based on at least a corresponding attribute (e.g., first attribute or second attribute) or the relation (e.g., position relation, place information, or operation state information) between peripheral electronic devices. The processor 120 may configure a candidate electronic device using at least one peripheral electronic device, located at similar places, as a group based on a place association between the peripheral electronic devices as described above.

Referring back to FIG. 7, at operation 711, the processor 120 may identify whether the identified candidate electronic device includes a plurality of candidate electronic devices.

If one candidate electronic device is identified (No at operation 711), the processor 120 may proceed to operation 715, and may perform operation 715 and subsequent operations thereof.

If a plurality of candidate electronic devices is identified (Yes at operation 711), the processor 120 may identify a priority sound at operation 713. The processor may identify a sound, having a relatively larger size, as a priority sound by comparing the sizes (or amplitude) of sounds. If, as a result of the identification of priority, a plurality of (e.g., at least 2) sounds generally has the same size (or a size included in a set range), the processor 120 may identify the plurality of sounds as the same priority.

At operation 715, the processor 120 may identify a candidate electronic device, related to the identified priority sound, as a target electronic device. If a plurality of sounds has the same priority, the processor 120 may identify a plurality of candidate electronic devices, related to the corresponding sounds, as a target electronic device (e.g., a plurality of target electronic devices).

In FIG. 7, in order to help understanding of various embodiments, an embodiment using given sensing information has been described, but the various embodiments are not limited to the embodiment (or operation) of FIG. 7. A target electronic device may be tracked and identified based on various types of sensing information and/or various conditions. The notification of a source electronic device may be provided through the identified target electronic device.

Hereinafter, an operation scenario for collecting situation information (e.g., sound information) in various network environments, various types of electronic devices, or various conditions and providing notification through a target electronic device is described.

Figure 8:
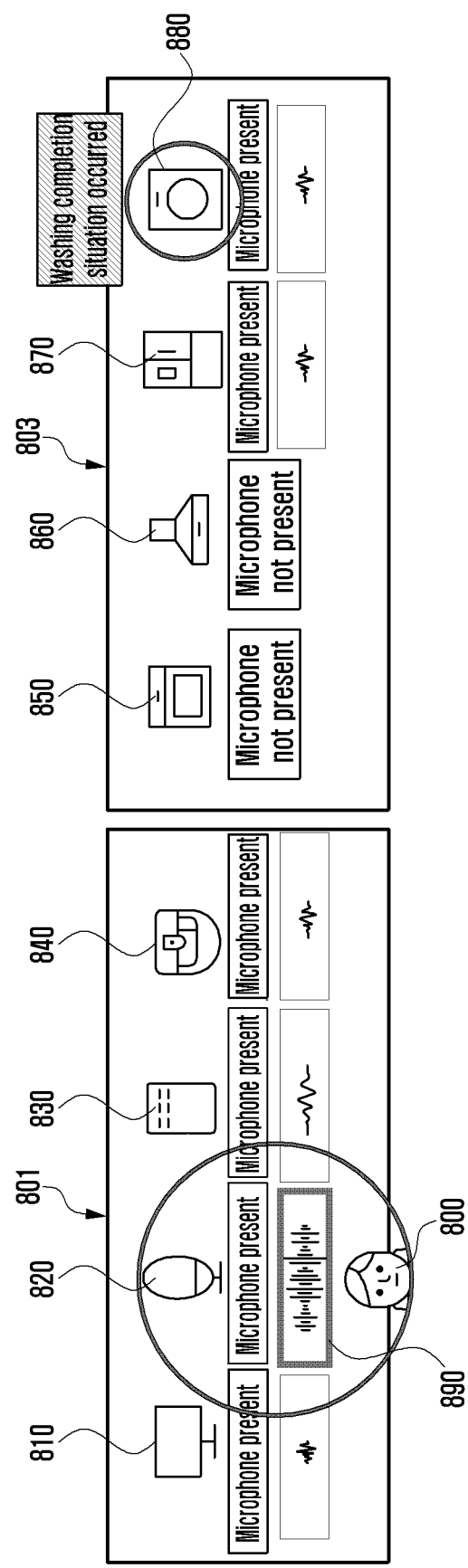
FIG. 8 is a diagram illustrating an example in which notification is provided in a network environment according to an embodiment of the disclosure.

FIG. 8 is a diagram illustrating an example in which notification is provided in a network environment according to an embodiment of the disclosure.

FIG. 8 shows an example in which the notification of a source electronic device is forwarded to a peripheral electronic device having the greatest surrounding sound recognition and provided to a user 800.

Referring to FIG. 8, an example is shown in which a first electronic device 810, a second electronic device 820, a third electronic device 830, and a fourth electronic device 840 are present in a first space (e.g., living room) 801 and a fifth electronic device 850, a sixth electronic device 860, a seventh electronic device 870, and an eighth electronic device 880 are present in a second space (e.g., kitchen) 803. FIG. 8 shows an example of a scenario in which a sound is used as situation information and some electronic devices (e.g., fifth electronic device 850 and sixth electronic device 860) do not have an element (or situation collection interface) (e.g., microphone for sound collection) for collecting situation information.

Information on a given place (e.g., place information) in a given space may have been previously registered with respect to each of the electronic devices 810 to 880. The information may be shared between the electronic devices 810 and 820 through a look-up table or an interworking application (e.g., smart things app).

A given situation related to notification (e.g., the occurrence of a washing completion situation) may occur in the eighth electronic device 880 (e.g., washer), and a user 800 may be present in the first space 801 different from second space 803 in which the eighth electronic device 880 is present. Notification may be divided into notification of a first type and notification of a second type. For example, the notification of the first type may include notification related to non-real time (or non-real-time property) processing. The notification of the second type may include notification related to real-time (or real-time property) processing. The notification of the first type may include notification that does not require real-time delivery to the user 800 or that has given low importance (e.g., personal privacy), such as washing completion. The notification of the second type may include notification that requires real-time delivery to the user 800 or that has given high importance (e.g., personal privacy), such as the reception of a call. A source electronic device in which notification occurs may be in the state in which it may wait for (or suspend) the output of the notification if the notification is notification of a first type occurs and may output the notification if the notification is notification of a second type.

If a notification (or given situation) occurs in the eighth electronic device 880 (or may operate in central control equipment or an electronic device playing the role thereof or a server, although not shown), the eighth electronic device 880 may search peripheral electronic devices 810 to 840 and 870 that belong to the peripheral electronic devices 810 to 870 and that may collect situation information (e.g., equipped with a microphone for sound collection) for sound information on a sound (e.g., surrounding sound, person's voice or given sound) in the vicinity of a corresponding electronic device, before the eighth electronic device 880 outputs the notification (or while outputting the notification if it is notification of the second type). The peripheral electronic devices 810 to 840 and 870 equipped with microphones may perform complex sensing on a sound (e.g., sound waveform, whether text is present, or sound DB utilization) for each electronic device.

The eighth electronic device 880 (or a device operating in central control equipment or an electronic device playing the role thereof or a server, although not shown) may identify a target electronic device based on sounds collected by the peripheral electronic devices 810 to 840 and 870. The eighth electronic device 880 may identify a peripheral electronic device (e.g., second electronic device 820) that belongs to the peripheral electronic devices 810 to 840 including microphones at the places (or space areas) where the greatest sound is detected and that has a sound 890 having the greatest and clearest sound waveform as a target electronic device. The eighth electronic device 880 may forward the notification to the second electronic device 820 identified as the target electronic device, and the second electronic device 820 may provide the notification to the user 800 by outputting the notification.

In order to prevent power consumption and/or unnecessary collection (e.g., always collection) of an electronic device with respect to an element (or situation collection interface) (e.g., microphone or sensor) for situation information collection (or detection), the electronic device may operate according to various conditions. A microphone related to sound collection is described as an example, but the same or similar operation may be performed on other elements.

The operation (e.g., real-time on) of a microphone for collecting situation information (e.g., sound information) for each electronic device may be divided into a first situation (e.g., basically two situations) or a second situation (e.g., four subdivided situations), as in the example of Table 3. Various embodiments of the disclosure are not limited to the situations and there may be a variation of various configurations.

TABLE 3

Microphone real-time on for each electronic device

| Microphone always on | | Microphone turn-on/off) (privacy mode) | |
|---|---|---|---|
| Real-time always on | Partial always on | Bidirectional analysis on <-> off | Single analysis off -> on |

As illustrated in Table 3, the real-time on operation of a microphone (or sensor) for each electronic device may be divided into the first situation in which the microphone is always on and the second situation in which the microphone is turned on/off. The first situation may be divided into a first sub-situation in which the microphone operates based on real-time always-on and a second sub-situation in which the microphone operates based on partial always-on. The second situation may be divided into a third sub-situation in which the microphone is alternately turned on/off through bidirectional analysis (e.g., on<→off) and a fourth sub-situation in which the microphone is turned from off to on through single analysis (e.g., off→on).

The first sub-situation includes the situation in which the microphone is always on, for example, and may be a method of checking the waveform and high and low of a sound obtained every moment and providing always analysis and accurate notification for each electronic device.

The second sub-situation may be a method in which, for example, a criterion for meaningful data, such as the attribute/waveform and size of a sound, is set in each electronic device (or server) stage and a corresponding electronic device provides notification by providing data (e.g., situation information) only when the corresponding criterion is exceeded. The data (e.g., situation information) may be provided by a server, and notification may be provided to a target electronic device based on the server.

The third sub-situation may be a method of reducing a privacy issue by analyzing only a given time (e.g., about N seconds) situation before and after (or ahead or behind) the occurrence of notification and providing notification to an electronic device (e.g., target electronic device) in which a related sound has occurred so that the notification can be obtained through always microphone-on of a user, for example.

The fourth sub-situation may be a method of turning on the microphone only when (or timing) notification occurs in any one electronic device and providing notification to an electronic device (e.g., target electronic device) in which a related sound has occurred based on a subsequent sound, for example.

Figure 9:
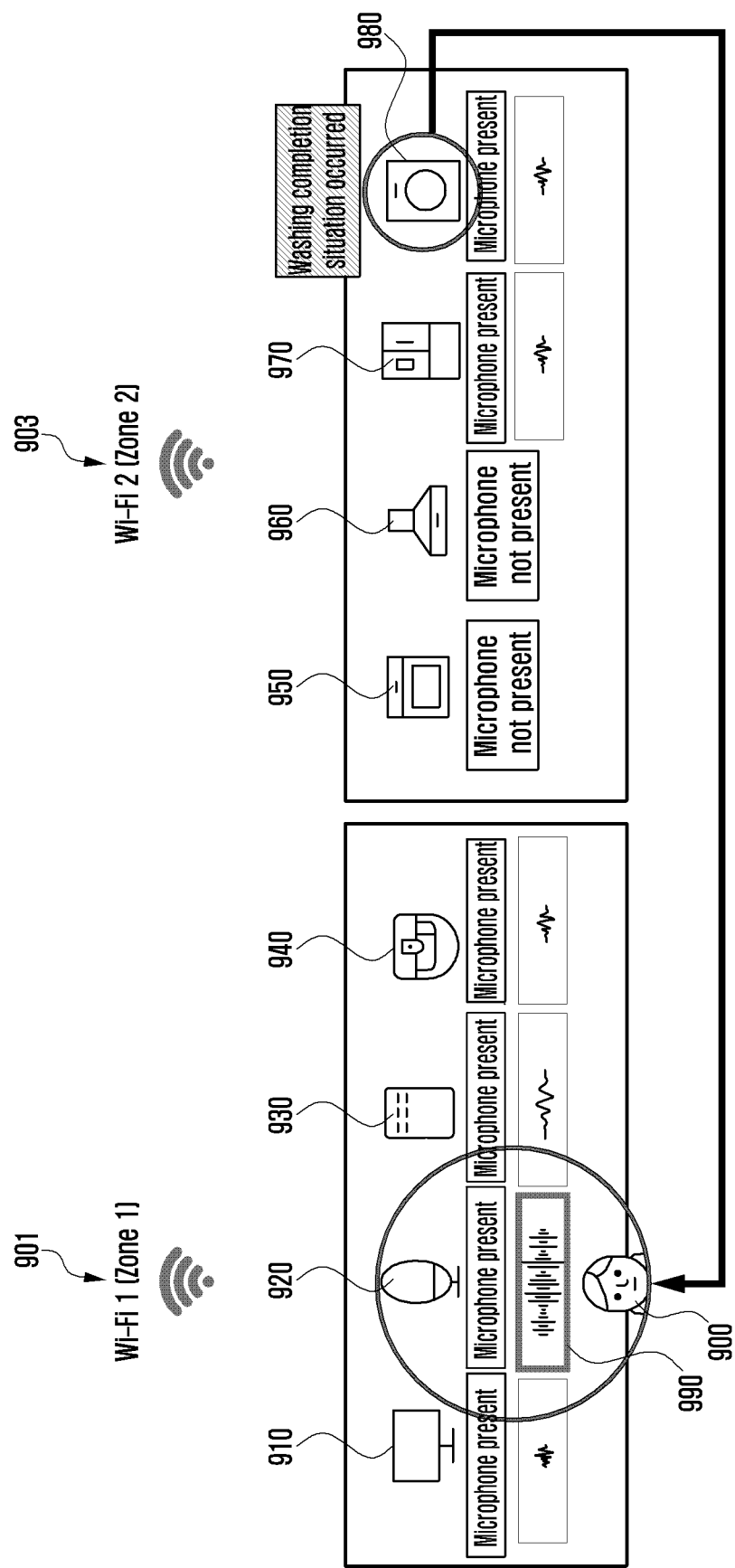
FIG. 9 is a diagram illustrating another example in which notification is provided in a network environment according to an embodiment of the disclosure.

FIG. 9 is a diagram illustrating another example in which notification is provided in a network environment according to an embodiment of the disclosure.

Referring to FIG. 9, an example is shown in which if place information has not been previously registered for each electronic device, a target electronic device is identified based on an access point (AP) to which each electronic device is connected for Wi-Fi and notification is provided to a user 900.

FIG. 9 shows an example in which a first electronic device 910, a second electronic device 920, a third electronic device 930, and a fourth electronic device 940 are present in a first space (e.g., first Wi-Fi area) 901 and a fifth electronic device 950, a sixth electronic device 960, a seventh electronic device 970, and an eighth electronic device 980 are present in a second space (e.g., second Wi-Fi area) 903. FIG. 9 shows an example of a scenario in which a sound is used as situation information and some electronic devices (e.g., fifth electronic device 950 and sixth electronic device 960 do not have an element (e.g., a microphone for sound collection) for collecting situation information.

The location of each of the electronic devices 910 to 980 may be classified based on connected W-Fi. Information (e.g., place information) on the place designated in a corresponding space may be set, and may be shared between the electronic devices 910 to 980 through a look-up table or an interworking application (e.g., smart things app). The space may be divided into the first Wi-Fi zone and the second Wi-Fi zone based on then AP to which each of the electronic devices 910 to 980 is connected for Wi-Fi.

A given situation related to notification (e.g., the occurrence of a washing completion situation) may occur in the eighth electronic device 980 (e.g., washer). The user 900 may be present in the first space 901 different from the second space 903 where the eighth electronic device 980 is positioned. The notification of the eighth electronic device 980 may be processed as non-real-time notification or real-time notification based on the type (e.g., first type or second type) of notification. A source electronic device in which notification occurs may be in the state in which it may wait for (or suspend) the output of the notification if the notification is notification of a first type and may output the notification if the notification is notification of a second type.

If a notification (or a given situation) occurs in the eighth electronic device 980 (or a device operating in central control equipment or an electronic device playing the role thereof or a server, although not shown), before the eighth electronic device 980 outputs the notification (or while it outputs the notification if the notification is notification of the second type), the space areas of peripheral electronic devices 910 to 970 may be classified based on Wi-Fi to which the peripheral electronic devices are connected. Sound information on a sound (e.g., surrounding sound, person's voice or given sound) in the vicinity of a corresponding electronic device may be searched for from the peripheral electronic devices 910 to 940 in a space that belongs to the classified space and that includes a peripheral electronic device from which a sound has been detected. If one AP for Wi-Fi is present in a given space or the place does not need to be classified for each electronic device, a corresponding electronic device (or source electronic device) in which notification has occurred may directly provide (or output) the notification.

Each of the peripheral electronic devices 910 to 940 including microphones in the classified space (e.g., first space 901) may perform complex sensing (e.g., sound waveform, whether text is present or sound DB utilization) on a sound.

A target electronic device may be identified based on sounds collected by the electronic devices 910 to 940 in the vicinity of the eighth electronic device 980 (or may operate in central control equipment or an electronic device playing the role thereof or a server, although not shown). The eighth electronic device 980 may identify a peripheral electronic device (e.g., second electronic device 920) that belongs to the peripheral electronic devices 910 to 940 having microphones at the place (or space area) where the greatest sound is detected and that has a sound 990 having the greatest and clearest sound waveform as a target electronic device. The eighth electronic device 980 may forward notification to the second electronic device 920 identified as the target electronic device. The second electronic device 920 may provide the user 900 with the notification by outputting the notification.

Figure 10:
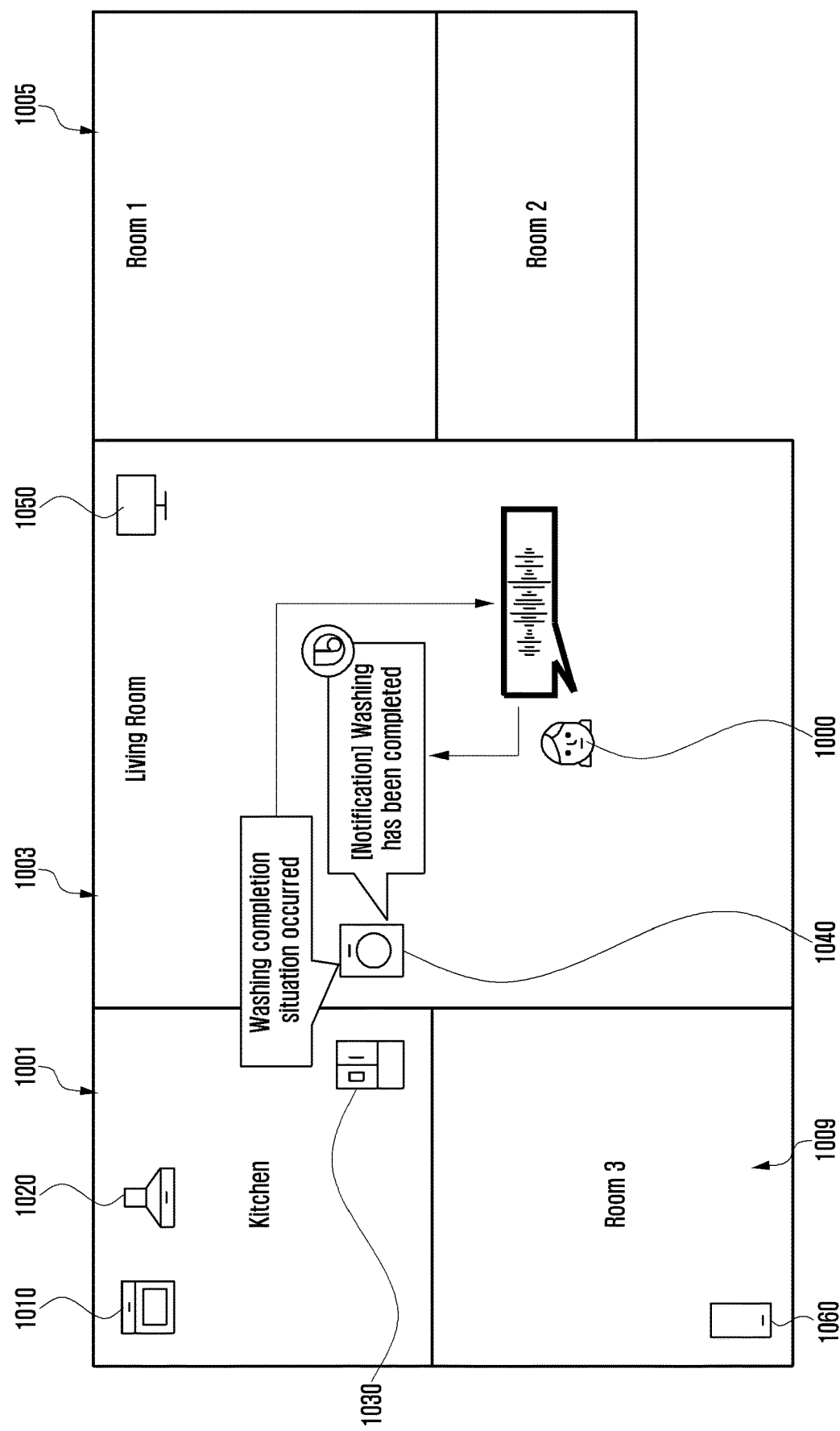
FIG. 10 is a diagram illustrating another example in which notification is provided in a network environment according to an embodiment of the disclosure.

FIG. 10 is a diagram for illustrating another example in which notification is provided in a network environment according to an embodiment of the disclosure.

FIG. 10 illustrates a floor plan within a home (or the inside structure of the home) for convenience of description, and may show an example in which various types of electronic devices are present at various places (or locations) in a given space within a home. FIG. 10 shows an example in which a first electronic device 1010 (e.g., microwave range), a second electronic device 1020 (e.g., hood), and a third electronic device 1030 (e.g., refrigerator) are present in a first space (or first place) 1001 (e.g., kitchen), a fourth electronic device 1040 (e.g., washer) and a fifth electronic device 1050 (e.g., TV) are present in a second space (or second place) 1003 (e.g., living room), a sixth electronic device 1060 (e.g., smartphone) is present in a third space (or third place) 1009 (e.g., room 3), and an electronic device is not present in a fourth space (or fourth place) 1005 (e.g., room 1) and a fifth space (or fifth place) 1007 (e.g., room 2).

Referring to FIG. 10, in the environment in which a plurality of electronic devices is present in a given space, a given situation related to notification (e.g., the occurrence of a washing completion situation) may occur in at least any one electronic device (e.g., fourth electronic device 1040). A user 1000 may be present in the second space (or second place) 1003 (e.g., living room) in which the fourth electronic device 1040 is present.

If a notification occurs in the fourth electronic device 1040 (e.g., source electronic device), the fourth electronic device 1040 may identify the user 1000 before it outputs the notification, may identify an electronic device (e.g., target electronic device) that can easily forward the notification to the user 1000 and that is positioned in the vicinity of the user 1000, and may provide the notification to the user 1000 through the target electronic device.

When the occurrence of notification is detected, the fourth electronic device 1040 may collect various information (e.g., sensing information or sound information), related to the detection of the user 1000, from the surroundings and peripheral electronic devices within a given space before it outputs the notification. Electronic devices (e.g., first electronic device 1010 to sixth electronic device 1060) may perform sensing (e.g., based on situation recognition or based on a sound) on the surrounding situation of each electronic device using various methods.

The sensing operation may include an operation for each of the electronic devices 1010 and 1060 to perform situation recognition for detecting (or measuring) various situations occurring in an electronic device or in the vicinity of an electronic device in real time In FIG. 10, the sensing operation is illustrated as being an operation of collecting (or obtaining) a surrounding sound.

When notification (or a given situation) occurs in the fourth electronic device 1040 (or device operating in central control equipment or an electronic device playing the role thereof or a server, although not shown), the fourth electronic device 1040 may obtain sound information by collecting a sound around the fourth electronic device 1040 and obtain sound information collected by the peripheral electronic devices 1010~1030, 1050, and 1060, before the fourth electronic device 1040 outputs notification (while outputting the notification).

The fourth electronic device 1040 may identify a target electronic device based on sounds collected by the fourth electronic device 1040 and the peripheral electronic devices 1010 to 1030, 1050, and 1060. The fourth electronic device 1040 may identify an electronic device (e.g., fourth electronic device 1040 itself) that belongs to peripheral electronic devices having microphones at the place (or space) where the greatest sound is detected and that has a sound having the greatest and clearest sound waveform as a target electronic device. If a sound related to the detection of the user 1000 is detected in the fourth electronic device 1040 (e.g., if a sound having the greatest and clearest sound waveform is detected), the fourth electronic device 1040 may directly provide notification to the user 1000 by outputting the notification.

If an electronic device in which a notification has occurred and a user (or an electronic device from which the greatest sound is output) are present in the same (or proximate) space (or place), the corresponding electronic device in which the notification has occurred may provide the notification to the user by outputting the notification without any change (or directly).

Figure 11:
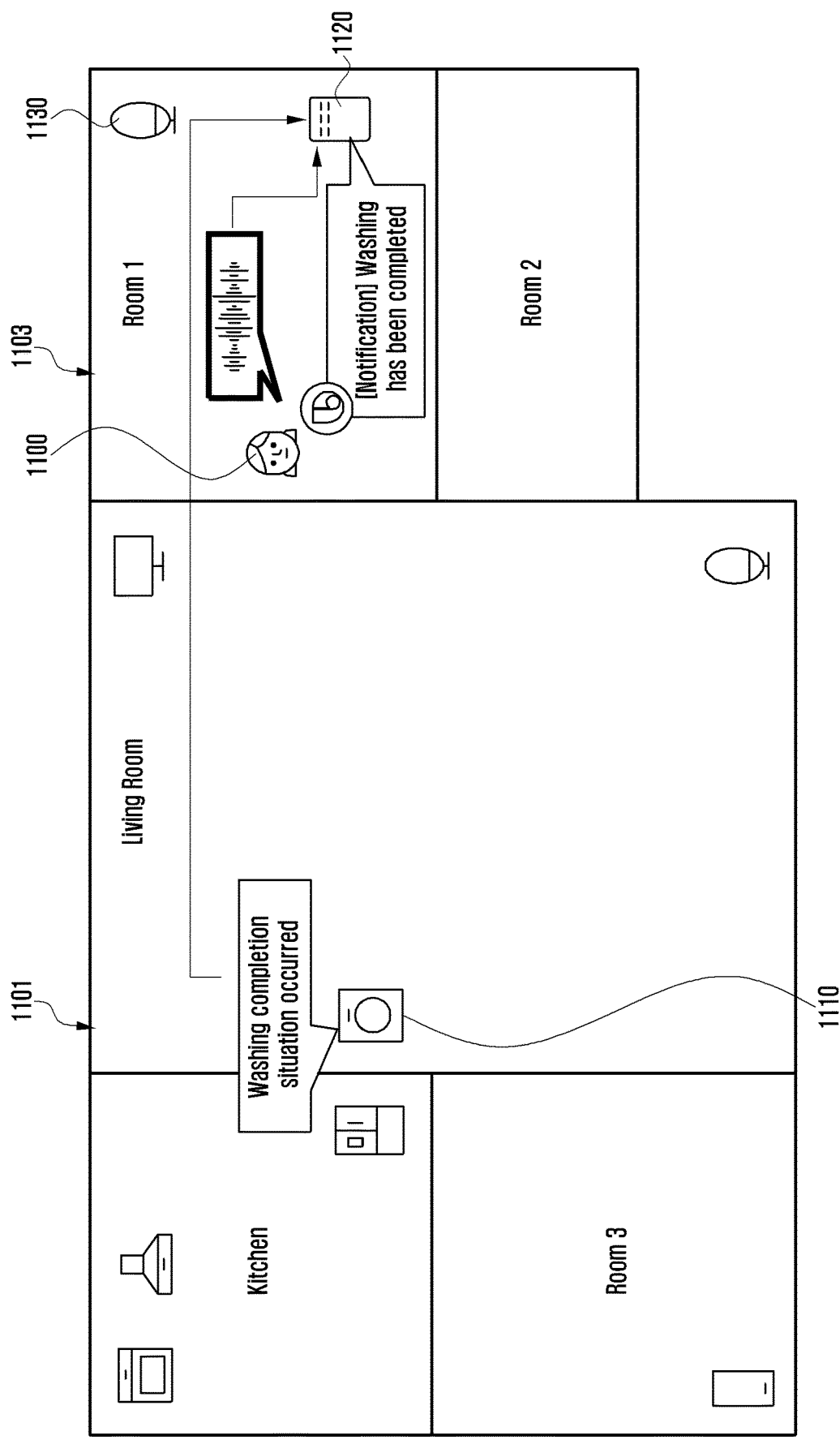
FIG. 11 is a diagram illustrating another example in which notification is provided in a network environment according to an embodiment of the disclosure.

FIG. 11 is a diagram illustrating another example in which notification is provided in a network environment according to an embodiment of the disclosure.

Referring to FIG. 11, a floor plan within a home (or the inside structure of the home) is illustrated for convenience of description. FIG. 11 shows an example in which as described in the part described with reference to FIGS. 3 and 10, various types of the electronic devices are present at various places (or locations) in a given space within a home. A source electronic device that generates notification and a target electronic device that belongs to electronic devices in the vicinity of the source electronic device and that will output the notification according to various embodiments are described below. In describing FIG. 11, a description (e.g., description of other electronic devices) redundant or corresponding to the description of FIGS. 3 and 10 is omitted.

Referring to FIG. 11, in the environment in which a plurality of electronic devices is present in a given space, a given situation related to notification (e.g., the occurrence of a washing completion situation) may occur in at least any one electronic device (e.g., source electronic device 1110) in a first space (or first place) 1101 (e.g., living room). A user 1100 may be present in a second space (or second place) 1103 (e.g., room 1)) different from the first space (or first place) 1101 in which the source electronic device 1110 is present.

According to various embodiments, if notification occurs in the source electronic device 1110, the source electronic device 1110 may identify an electronic device (e.g., target electronic device) that can easily forward the notification to the user 1100 and that is positioned near the user 1100 by detecting the user 1100 before the source electronic device 1110 outputs the notification, and may provide the notification to the user 1100 through the target electronic device. The source electronic device 1110 may be in the state in which the source electronic device 1110 may wait for (or suspend) the output of notification if the notification occurred in the source electronic device 1110 is notification of a first type and may output the notification if the notification is notification of a second type.

If notification (or a given situation) occurs in the source electronic device 1110 (or may operate in central control equipment or an electronic device playing the role thereof or a server, although not shown), the source electronic device 1110 may identify a target electronic device that belongs to peripheral electronic devices 1120 and 1130 in a space including a peripheral electronic device where a sound is detected and that will output the notification, before it outputs the notification (or while outputting the notification if the notification is notification of a second type).

The source electronic device 1110 (or device operating in central control equipment or an electronic device playing the role thereof or a server, although not shown) may identify at least one peripheral electronic device (e.g., electronic device 1120), having a sound of the greatest and clearest sound waveform, as a target electronic device based on sounds collected from the peripheral electronic devices 1120 and 1130. The source electronic device 1110 may forward notification to the electronic device 1120 identified as a target electronic device. The electronic device 1120 may provide the notification to the user 1100 by outputting the notification.

Figure 12:
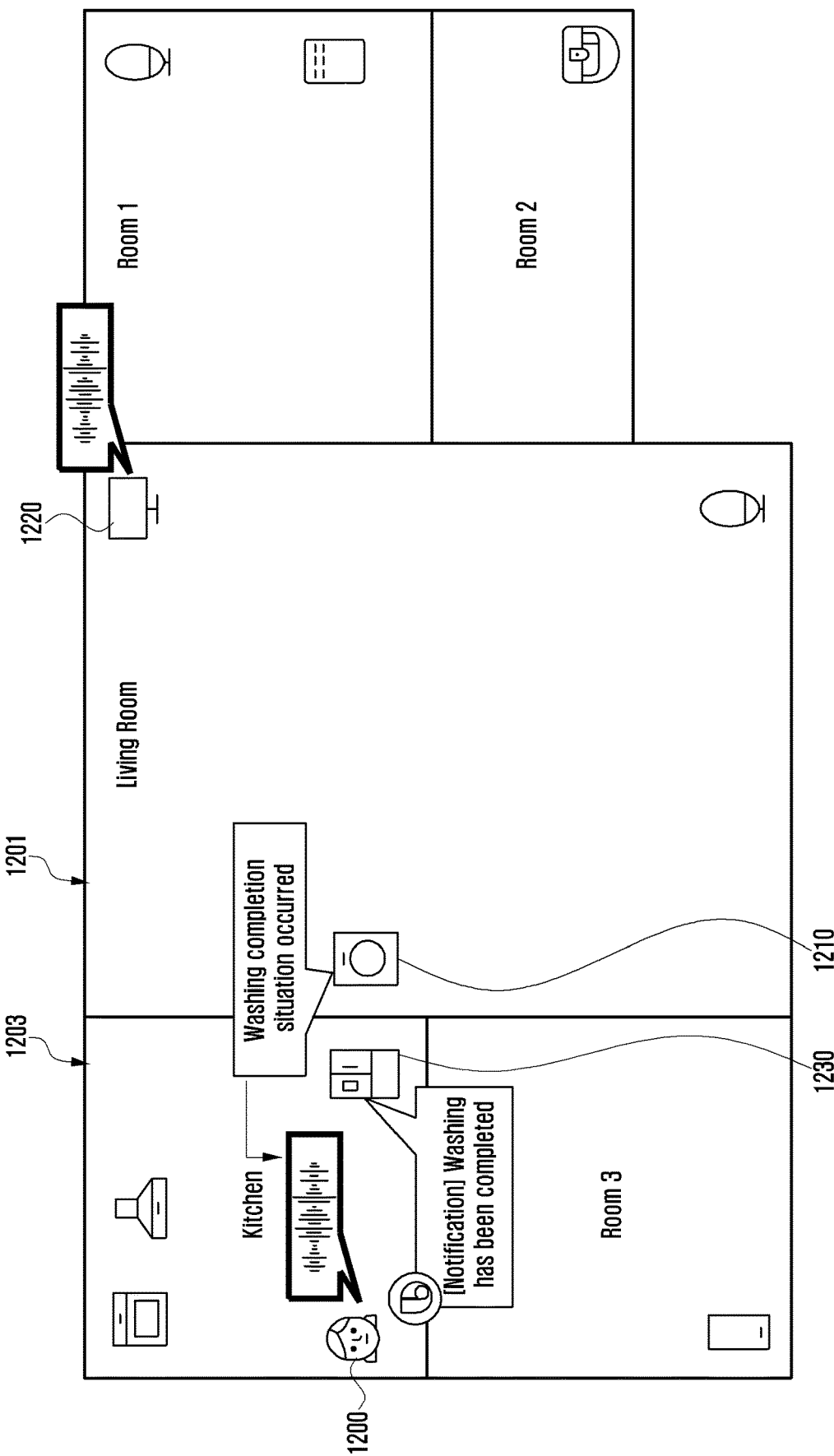
FIG. 12 is a diagram illustrating another example in which notification is provided in a network environment according to an embodiment of the disclosure.

FIG. 12 is a diagram illustrating another example in which notification is provided in a network environment according to an embodiment of the disclosure.

Referring to FIG. 12, a floor plan within a home (or the inside structure of the home) is illustrated for convenience of description as described in the part described with reference to the above-described drawings (e.g., FIGS. 10 and 11). FIG. 12 shows an example in which various types of the electronic devices are present at various places (or locations) in a given space within a home. A source electronic device that generates a notification, a target electronic device that belongs to electronic devices in the vicinity of the source electronic device and that will output the notification, and some electronic devices related to a determination of the target electronic device according to various embodiments are described below. In describing FIG. 12, a description (e.g., description of other electronic devices) redundant with or corresponding to the above description is omitted.

Referring to FIG. 12, in the environment in which a plurality of electronic devices is present in a given space, a given situation related to notification (e.g., the occurrence of a washing completion situation) may occur may occur in at least any one electronic device (e.g., source electronic device 1210) in a first space (or first place) 1201 (e.g., living room). A user 1200 is present in a second space (or second place) 1203 (e.g., kitchen) different from the first space (or first place) 1201 in which the source electronic device 1210 is present.

If a notification occurs in the source electronic device 1210, the source electronic device 1210 may identify an electronic device (e.g., target electronic device) that may easily forward the notification to the user 1200 and that is positioned in the vicinity of the user 1200 by detecting the user 1200 before it outputs the notification, and may provide the notification to the user 1200 through the target electronic device. The source electronic device 1210 in which notification occurs may be in the state in which the source electronic device 1210 may wait for (or suspend) the output of the notification if the notification of a first type occurs and may output the notification if the notification of a second type occurs.

There may be a situation in which a second electronic device 1220 in the first space (or first place) 1201 in which the source electronic device 1210 (hereinafter referred to as a "first electronic device 1210") is present outputs a broadcasting sound including a person's voice and the output broadcasting sound is collected by the first electronic device 1210 and the second electronic device 1220. There may be a situation in which the user 1200 is present in the second space (or second place) 1203 and a person's voice spoken by the user 1200 is collected by a third electronic device 1230 in the second space (or second place) 1203.

If a notification (or a given situation) occurs in the first electronic device 1210 (or source electronic device) (or may operate in central control equipment or an electronic device playing the role thereof or a server, although not shown), the first electronic device 1210 may identify a target electronic device that belongs to the electronic devices 1210, 1220, and 1230 from which sounds are detected and that will output the notification, before it outputs the notification (while outputting the notification).

The first electronic device 1210 (or device operating in central control equipment or an electronic device playing the role thereof or a server, although not shown) may identify an electronic device from which a person's voice is detected as a target electronic device based on sounds collected from the first electronic device 1210 itself and the peripheral electronic devices 1220 and 1230. The voice of a real person may be included in sounds collected by the third electronic device 1230. Furthermore, a person's voice may be included in sounds collected from the first electronic device 1210 and the second electronic device 1220 based on the broadcasting sound of the second electronic device 1220.

The first electronic device 1210 may identify a target electronic device by distinguishing a person's voice and a broadcasting voice from collected sounds. The first electronic device 1210 may identify a broadcasting voice based on at least a degree of noise of a collected sound, the waveform of a sound, or state (or playback) information (e.g., TV turn-on information or state information providing notification that broadcasting playback is performed (e.g., information indicative of content streaming)) provided by the second electronic device 1220 (or given server (e.g., cloud)) that outputs a broadcasting voice.

The first electronic device 1210 may identify the third electronic device 1230 that provides a sound, classified as a person's voice, as a target electronic device. The first electronic device 1210 may forward notification to the third electronic device 1230 identified as a target electronic device. The third electronic device 1230 may provide the notification to the user 1200 by outputting the notification.

Figure 13:
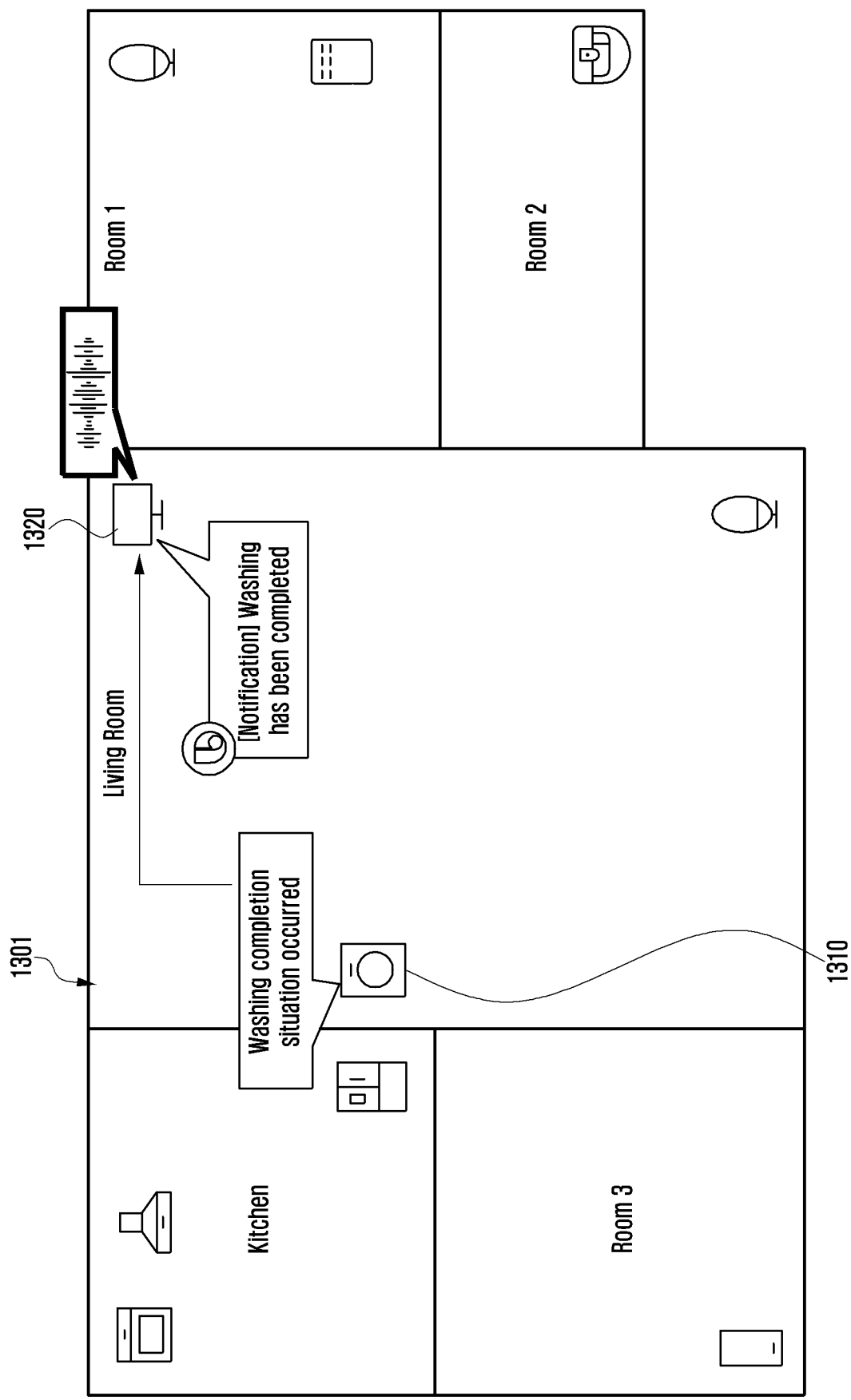
FIG. 13 is a diagram illustrating another example in which notification is provided in a network environment according to an embodiment of the disclosure.

FIG. 13 is a diagram illustrating another example in which notification is provided in a network environment according to an embodiment of the disclosure.

Referring to FIG. 13, a floor plan within a home (or the inside structure of the home) is illustrated for convenience of description, as described in the parts described with reference to the above drawings. FIG. 13 shows an example in which various types of electronic devices are present at various places (or locations) in a given space within a home. A source electronic device that generates notification, a target electronic device that belongs to electronic devices in the vicinity of the source electronic device and that will output notification, and some electronic devices related to a determination of the target electronic device according to various embodiments are described below. In describing FIG. 13, a description (e.g., description of other electronic devices) redundant with or corresponding to the above description is omitted.

Referring to FIG. 13, in the environment in which a plurality of electronic devices is present in a given space, there may be a situation in which a given situation related to notification (e.g., the occurrence of a washing completion situation) may occur occurs in a source electronic device 1310 within a first space (or first place) 1301 (e.g., living room) and a sound (e.g., a person's voice or a life-related sound) related to a user has not been collected. FIG. 13 may be the situation in which other sounds (e.g., a sound (e.g., a broadcasting sound, such as a TV sound or music sound) is output from an electronic device, such as TV, a radio or a speaker) are output from a peripheral electronic device 1320 in the first space (first place).

If a notification occurs in the source electronic device 1310, the source electronic device 1310 may identify a target electronic device capable of easily forwarding the notification to a user before it outputs the notification, and may provide the notification to the user through the target electronic device.

The source electronic device 1310 may detect a broadcasting sound of the peripheral electronic device 1320 without detecting a person's voice or life-related sound in collected sounds. If a direct sound related to a user (e.g., a person's voice or a life-related sound) is not detected, the source electronic device 1310 may identify that the user uses a peripheral electronic device in the vicinity of the peripheral electronic device that has provided other sounds. The user may watch TV without speaking in a living room or may listen to music in other space.

If a direct sound related to a user (e.g., a person's voice or a life-related sound) is not detected, the source electronic device 1310 (or may operate in central control equipment or an electronic device playing the role thereof or a server, although not shown) may identify the peripheral electronic device 1320 from which other sounds have been detected (or from which a broadcasting sound is output) as a target electronic device. The source electronic device 1310 may distinguish between other sounds based on at least a degree of noise of a collected sound, the waveform of a sound, or state (or playback) information (e.g., TV turn-on information or state information providing notification of broadcasting playback (e.g., information indicating whether content streaming is performed)) provided by the peripheral electronic device 1320 (or given server (e.g., cloud)) that outputs a broadcasting voice.

The source electronic device 1310 may forward notification to the peripheral electronic device 1320 identified as a target electronic device. The peripheral electronic device 1320 may output the notification.

As illustrated in FIG. 13, if a sound is not generated (e.g., if any sound including a person's voice is not generated), notification may be provided with reference to other information (e.g., user account, set priority or various types of sensing information) other than sound information. If a sound is not generated (or regardless of whether a sound is generated), a target electronic device may be selected based on at least whether an electronic device has a sensor or configuration information (e.g., favorites/priority electronic device configuration or user account), and may provide notification.

The electronic device 101 (e.g., source electronic device, server, or central control equipment) may search for a peripheral electronic device configured as favorites or priority. If any information related to a user is inferred (or tracked) by the corresponding peripheral electronic device, the electronic device 101 may identify a peripheral electronic device as a target electronic device so that it provides notification.

If a user account is established (or connected), the electronic device 101 (e.g., source electronic device, server, or central control equipment) may search for a peripheral electronic device (e.g., the electronic device (e.g., tablet PC or smartphone) of the user) to which the user account is connected. If any information related to the user is inferred (or tracked) by the corresponding peripheral electronic device, the electronic device 101 may identify the corresponding peripheral electronic device as a target electronic device so that it provides notification.

The electronic device 101 (e.g., source electronic device, server, or central control equipment) may search for a peripheral electronic device based on at least one history related to the provision of previous situation information (e.g., sound) by peripheral electronic devices or the output of previous notification. If any information related to the user is inferred (or tracked) by a peripheral electronic device, the electronic device 101 may identify the corresponding peripheral electronic device as a target electronic device and provide notification. For example, the electronic device 101 may identify a peripheral electronic device that has output notification most recently as a target electronic device so that it provides notification.

If a given electronic device (e.g., a speaker in a living room) is designated as a device for common use, the electronic device 101 (e.g., source electronic device, server, or central control equipment) may identify a target electronic device by prioritizing a corresponding peripheral electronic device. The electronic device 101 may search for a peripheral electronic device specialized for a sound, and may identify a target electronic device by prioritizing a peripheral electronic device having the strongest (or high) sound output.

An electronic device (e.g., baby monitor, CCTV, camera-equipped electronic device, or smartphone) including a sensor (e.g., presence sensor, proximity sensor, camera, or the sensor module 176 of FIG. 1) is turned on automatically (or periodically), may identify whether a user is present, and may provide related situation information to the electronic device 101 (e.g., source electronic device, server, or central control equipment). The electronic device 101 may identify a target electronic device based on obtained situation information and provide notification.

Figure 14:
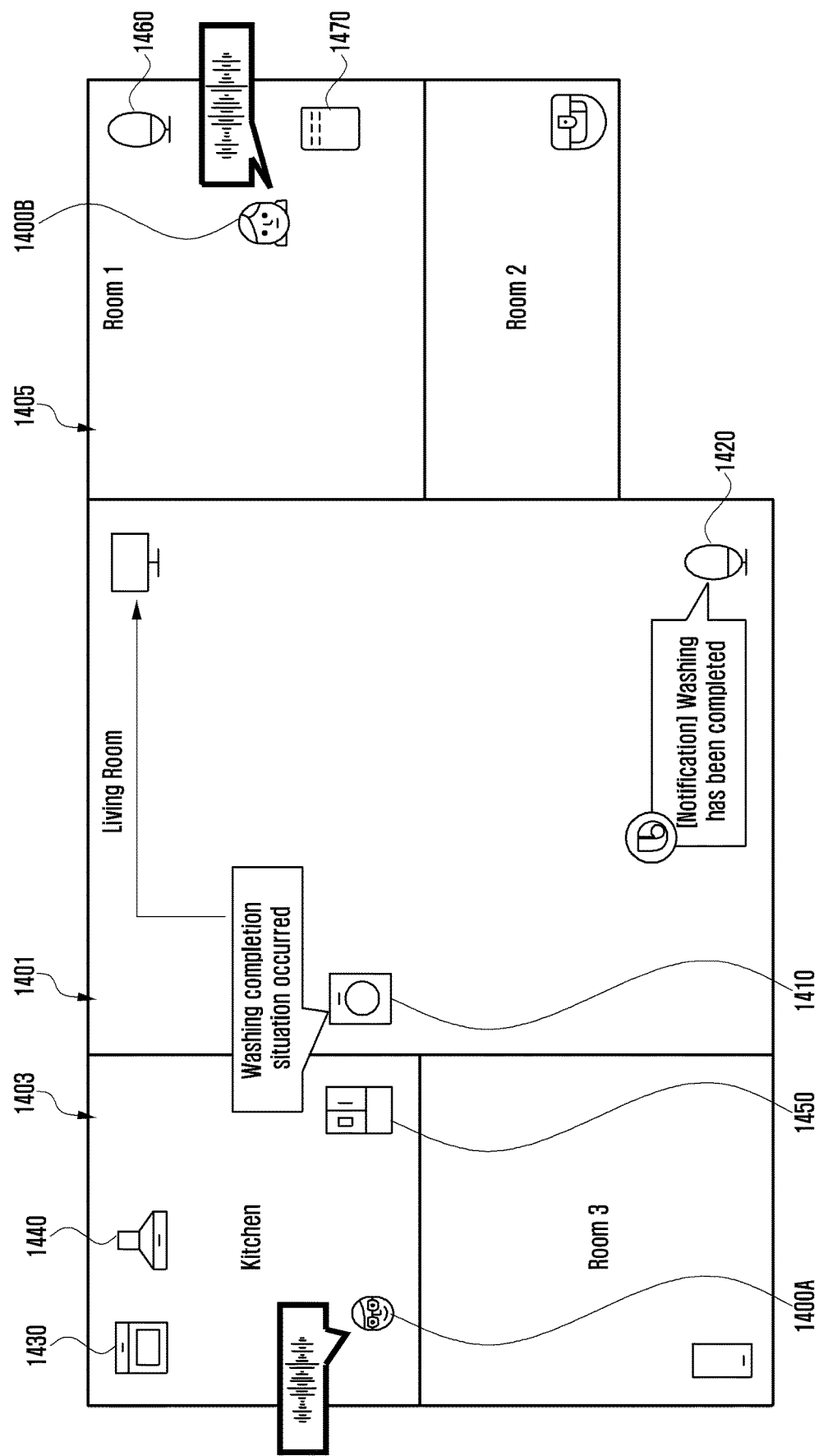
FIG. 14 is a diagram illustrating another example in which notification is provided in a network environment according to an embodiment of the disclosure.

FIG. 14 is a diagram illustrating another example in which notification is provided in a network environment according to an embodiment of the disclosure.

Referring to FIG. 14, a floor plan within a home (or the inside structure of the home) is illustrated for convenience of description as described in the parts described with reference to the above drawings. FIG. 14 shows an example in which various types of electronic devices are present at various places (or locations) in a given space within a home. In describing FIG. 14, a description (e.g., description of other electronic devices) redundant with or corresponding to the above description is omitted.

Referring to FIG. 14, in the environment in which a plurality of electronic devices is present in a given space, a given situation related to notification (e.g., the occurrence of a washing completion situation) may occur. Furthermore, at least any one electronic device (e.g., source electronic device 1410) may be present in a first space (or first place) 1401 (e.g., living room), and a first user 1400A and a second user 1400B may be present in a second space (or second place) 1403 (e.g., kitchen) and a third space (or third place) 1405 (e.g., room 1), respectively, which are different from the first space (or first place) 1401 in which the source electronic device 1410 is present.

First peripheral electronic devices 1430, 1440, and 1450 in the second space 1403 may collect situation information related to the first user 1400A (e.g., a first sound related to the voice of the first user 1400A). Second peripheral electronic devices 1460 and 1470 in the third space 1405 may collect situation information related to the second user 1400B (e.g., a second sound related to the voice of the second user 1400B). FIG. 14 illustrates an example in which the first sound collected by the first peripheral electronic devices 1430, 1440, and 1450 in the second space 1403 and the second sound collected by the second peripheral electronic devices 1460 and 1470 in the third space 1405 generally have a similar level (e.g., similar sound size) and any one sound having higher priority cannot be selected (or cannot compete for superiority).

If a notification occurs in the source electronic device 1410, the source electronic device 1410 may identify an electronic device that can easily forward the notification to a user and that is in proximity to the user, and may provide the user with the notification through the target electronic device. There may be in the state in which the source electronic device 1410 may wait for (or suspend) the output of the notification if the notification of a first type occurs and may output the notification if the notification of a second type occurs.

The source electronic device 1410 (or device operating in central control equipment or an electronic device playing the role thereof or a server, although not shown) may collect the first sound related to the first user 1400A from the first peripheral electronic devices 1430, 1440, and 1450 in the second space (or second place) 1403, and may collect the second sound related to the second user 1400B from the second peripheral electronic devices 1460 and 1470 in the third space (or third place) 1405.

In such an environment, if the first sound and the second sound in different spaces (or places) have a similar level (e.g., a level having a size within a set error range), the source electronic device 1410 may identify a target electronic device based on a set selection method for the target electronic device. The source electronic device 1410 may include all the first peripheral electronic devices 1430, 1440, and 1450 and the second peripheral electronic devices 1460 and 1470 as target electronic devices based on first setting. The source electronic device 1410 may include at least one of the first peripheral electronic devices 1430, 1440, and 1450 and the second peripheral electronic devices 1460 and 1470 as a target electronic device based on second setting. For example, the source electronic device 1410 may identify at least one peripheral electronic device in a space in which a user (e.g., the first user 1400A or the second user 1500B) related to (or designated for) the notification of the source electronic device 1410 is present as a target electronic device. The source electronic device 1410 may include a different peripheral electronic device except the first peripheral electronic devices 1430, 1440, and 1450 and the second peripheral electronic devices 1460 and 1470 or the source electronic device 1410 itself as a target electronic device based on third setting. For example, the source electronic device 1410 may search for a given peripheral electronic device and identify a retrieved peripheral electronic device as a target electronic device.

If an electronic device designated by a user has been set in relation to the notification of the source electronic device 1410, for example, the source electronic device 1410 may identify the corresponding electronic device (e.g., peripheral electronic device 1420) as a target electronic device. Designation (or setting) by a user may include that at least one condition of favorites, priority, recent notification output, or the strongest sound output, for example, is set. At least one peripheral electronic device may be included as a target electronic device based on the set at least one condition.

The source electronic device 1410 may identify a target electronic device based on a sequential determination of a combination of the first setting, the second setting, or the third setting. The source electronic device 1410 may identify whether setting regarding an electronic device designated based on favorites or priority is present (or presence or absence). If a designated electronic device is not present (e.g., if a designated electronic device has not been set), the source electronic device 1410 may identify an electronic device that has output notification most recently as a target electronic device based on the history of peripheral electronic devices.

When a target electronic device is identified based on a history, if a given electronic device (e.g., speaker in a living room) is present as a device for common use, for example, the source electronic device 1410 may identify a target electronic device by prioritizing the corresponding electronic device, or may identify a target electronic device by prioritizing an electronic device specialized for a sound (e.g., an electronic device having the strongest sound output, for example, a speaker). If an electronic device based on a history is not searched for, the source electronic device 1410 may identify all the first peripheral electronic devices 1430, 1440, and 1450 of the first space 1403 and the second peripheral electronic devices 1460 and 1470 of the second space 1405 from which sounds have been collected, for example, as target electronic devices so that they provide notification at the same time.

Figure 15:
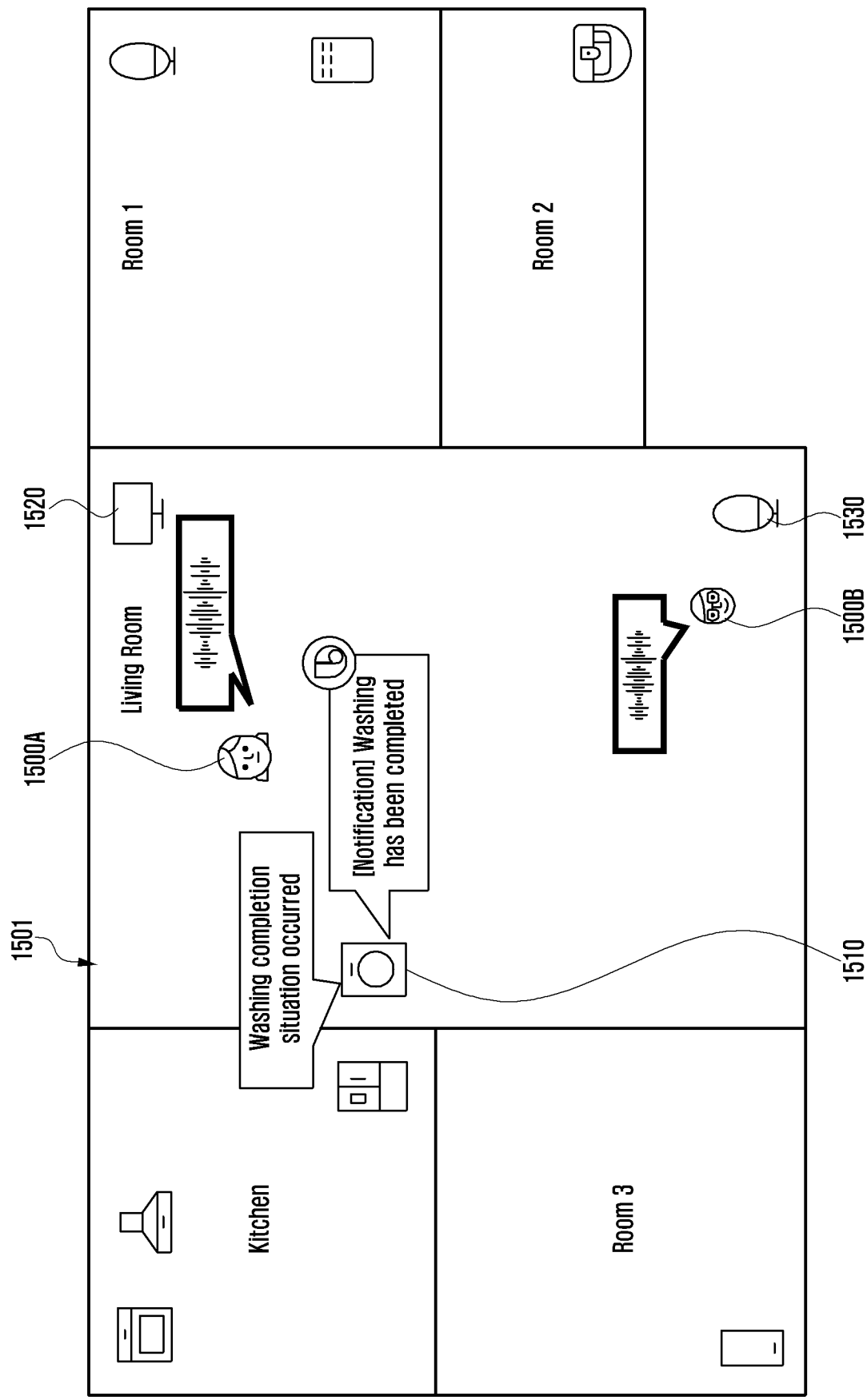
FIG. 15 is a diagram illustrating another example in which notification is provided in a network environment according to an embodiment of the disclosure.

FIG. 15 is a diagram for illustrating another example in which notification is provided in a network environment according to an embodiment of the disclosure.

Referring to FIG. 15, a floor plan within a home (or the inside structure of the home) is illustrated for convenience of description as described in the parts described with reference to the above drawings. FIG. 15 shows an example in which various types of electronic devices are present at various places (or locations) in a given space within a home. In describing FIG. 15, a description (e.g., description of other electronic devices) redundant with or corresponding to the above description is omitted.

Referring to FIG. 15, in the environment in which a plurality of electronic devices is present in a given space, a given situation related to notification (e.g., the occurrence of a washing completion situation) may occur in a source electronic device 1510 in a first space (or first place) 1501 (e.g., living room). A first user 1500A and a second user 1500B may be present in the first space (or first place) 1401 in which the source electronic device 1410 is present. The first user 1500A may be present closer to a first peripheral electronic device 1520, and the second user 1500B may be present closer to a second peripheral electronic device 1530.

The first peripheral electronic device 1520 may collect situation information related to the first user 1500A (e.g., a first sound related to the voice of the first user 1500A). The second peripheral electronic device 1530 may collect situation information related to the second user 1500B (e.g., a second sound related to the voice of the second user 1500B). FIG. 15 illustrates that the first sound collected by the first peripheral electronic device 1520 and the second sound collected by the second peripheral electronic device 1530, which are present in the same space (or place), generally have a similar level (e.g., similar sound size) and any one sound having higher priority cannot be selected (or cannot compete for superiority).

If a notification occurs in the source electronic device 1510, the source electronic device 1510 may identify an electronic device that can easily forward the notification to a user and that is in proximity to the user, and may provide the user with the notification through the target electronic device. The source electronic device 1510 may wait for (or suspend) the output of notification if the notification of a first type occurs, and may output the notification if the notification of a second type occurs.

The source electronic device 1510 (or may operate in central control equipment or an electronic device playing the role thereof or a server, although not shown) may collect a first sound related to the first user 1500A from the first peripheral electronic device 1520, and may collect the second sound related to the second user 1500B from the second peripheral electronic device 1530 in the same space as the first peripheral electronic device 1520.

The first sound and the second sound in the same space 1501 have a similar level (e.g., a level having a size within a set error range), the source electronic device 1510 may identify the source electronic device 1510 or at least one peripheral electronic device as a target electronic device based on a set selection method for the target electronic device.

If the peripheral electronic devices 1520 and 1530 from which sounds are collected are present in the same space as the source electronic device 1510, the source electronic device 1510 may include the source electronic device 1510 as a target electronic device.

The source electronic device 1510 may identify both the first peripheral electronic device 1520 and the second peripheral electronic device 1530 as target electronic devices.

The source electronic device 1510 may identify at least one of the first peripheral electronic device 1520 and the second peripheral electronic device 1530 as a target electronic device. For example, the source electronic device 1510 may identify a peripheral electronic device in the vicinity of a user (e.g., the first user 1500A or the second user 1500B) related to (or designated for) the notification of the source electronic device 1510 as a target electronic device.

The source electronic device 1510 may search the first peripheral electronic device 1520 and the second peripheral electronic device 1530 for a designated peripheral electronic device, and may identify the retrieved peripheral electronic device as a target electronic device. For example, if an electronic device designated by a user has been set in relation to the notification of the source electronic device 1510, the source electronic device 1510 (or device operating in central control equipment or an electronic device playing the role thereof or a server, although not shown) may identify the corresponding peripheral electronic device (e.g., the second peripheral electronic device 1530) as a target electronic device. According to an embodiment, designation (or setting) by a user may include that at least one condition of favorites, priority, recent notification output, or the strongest sound output, for example, is set. At least one peripheral electronic device may be included as a target electronic device based on the set at least one condition.

The source electronic device 1510 may identify whether setting regarding an electronic device designated based on favorites or priority is present (or presence or absence). If a designated electronic device is not present (e.g., if a designated electronic device has not been set), the source electronic device 1510 may identify a peripheral electronic device that belongs to the peripheral electronic devices 1520 and 1530 and that has output notification most recently as a target electronic device. If a designated electronic device is not present (e.g., if a designated electronic device has not been set) and a peripheral electronic device (e.g., a speaker in a living room) that belongs to the peripheral electronic devices 1520 and 1530 and that has been designated as a device for common use is present, the source electronic device 1510 may identify the corresponding peripheral electronic device as a target electronic device by prioritizing the corresponding peripheral electronic device or may identify an electronic device specialized for a sound (e.g., an electronic device having the strongest sound output, for example, a speaker) as a target electronic device by prioritizing the electronic device.

Figure 16A:
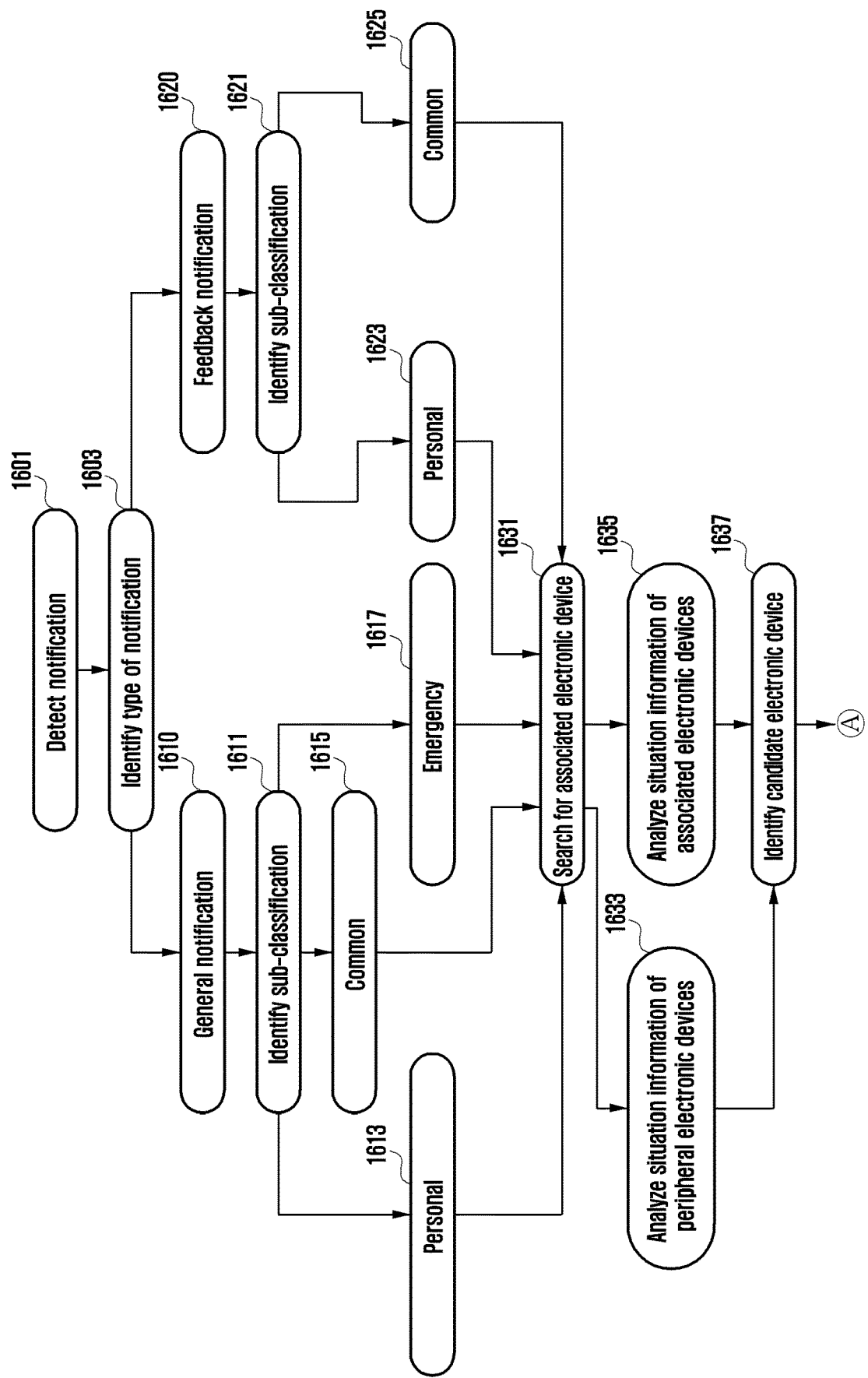
FIG. 16A is a flowchart showing an operating method of determining a target electronic device in an electronic device according to an embodiment of the disclosure.

FIG. 16A is a flowchart showing an operating method of determining a target electronic device in an electronic device according to an embodiment of the disclosure.

Figure 16B:
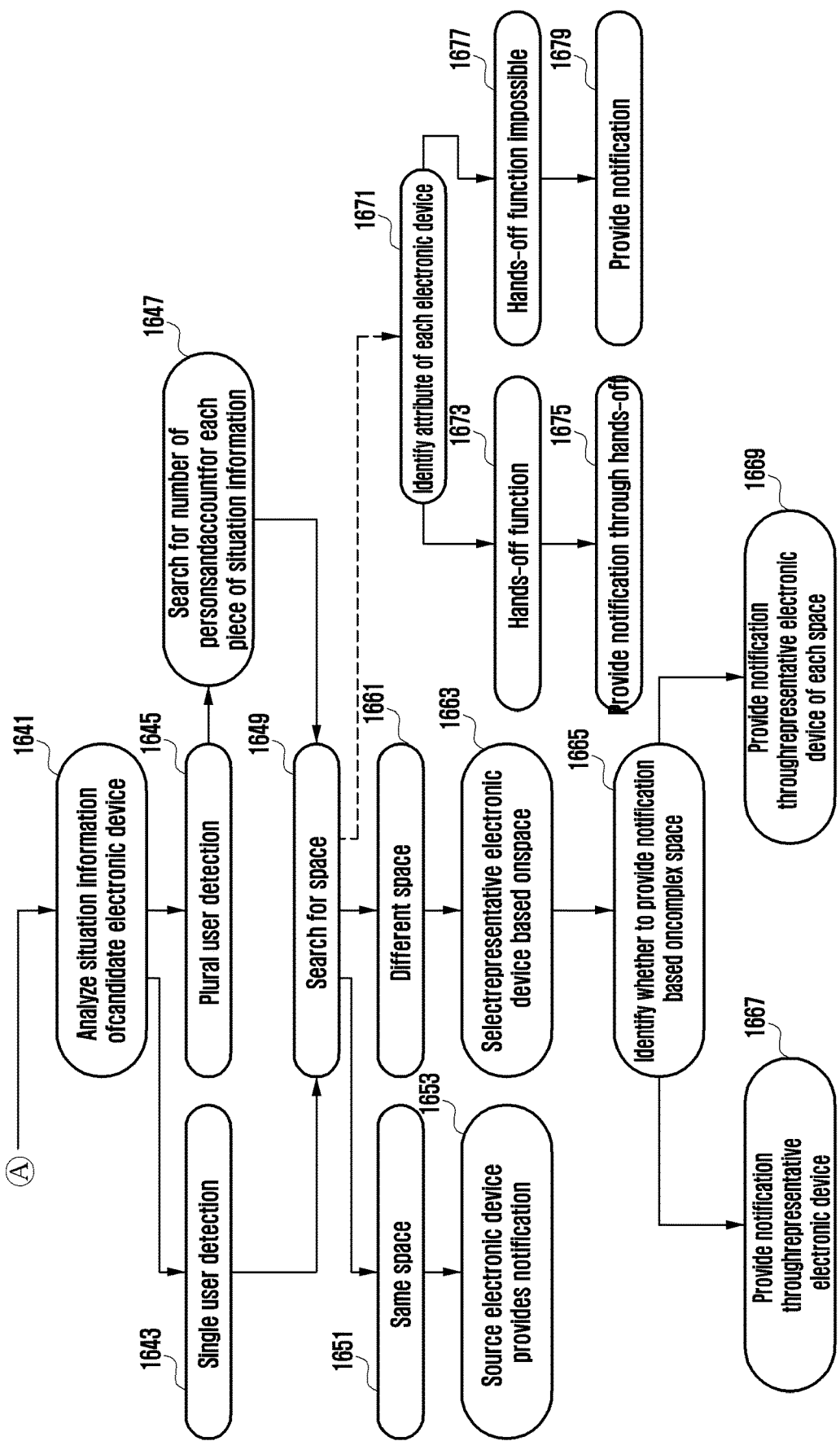
FIG. 16B is a flowchart showing an operating method of determining a target electronic device in an electronic device according to an embodiment of the disclosure.

FIG. 16B is a flowchart showing an operating method of determining a target electronic device in an electronic device according to an embodiment of the disclosure.

Referring to FIGS. 16A and 16B, at block 1601, the electronic device 101 (e.g., device operating in a source electronic device, central control equipment or an electronic device playing the role thereof, or a server) (or the processor 120 of the electronic device 101) may detect notification related to at least one function of the electronic device 101. The electronic device 101 may detect a notification occurring due to the execution of a function (e.g., the start or completion of the execution of a function) therein or may obtain notification from the outside (e.g., external different electronic device or server), based on at least a characteristic (or type) of the electronic device 101.

At block 1603, the electronic device 101 may identify the type of notification in response to the detection of the notification. The type of notification may include general notification 1610 and feedback notification 1620. The general notification 1610 does not require feedback from a user, and may include notification that may be provided to a user unidirectionally. For example, the general notification 1610 may include notification for simple notification, which does not require separate feedback from a user, such as the start of a function (e.g., "washing start", "cooking start" or "cleaning start") or the completion of a function (e.g., "washing completion, "cooking completion" or "cleaning completion"). The feedback notification 1620 may include notification that requires the feedback of a user or that requires an interaction with a user in association with the notification. For example, the feedback notification 1620 may include notification of a given attribute that requires the execution of a call according to the reception of a call from the outside or a given element (e.g., microphone, speaker or voice recognition engine) for the transmission of a reply message according to the reception of a message from the outside or the notification of a given attribute that must be delivered to a user, such as a disaster/emergency message.

At block 1611 and block 1621, the electronic device 101 may identify sub-classification for the notification (e.g., general notification 1610 or feedback notification 1620) based on a result of the identification.

The electronic device 101 may identify whether the sub-classification of the general notification 1610 corresponds to personal notification 1613, common (or official) notification 1615, or emergency notification 1617, for example. The personal notification 1613 may include notification (e.g., notification designated for a first user or notification designated for a second user) that is associated with a pre-designated user and that must be provided to a given user. The common (or official) notification 1615 may include notification (e.g., cleaning completion notification or air purification notification) that is not associated with a given user or that may be provided in common if a given user is not present. The emergency notification 1617 may include notification (e.g., notification providing notification that a gas range (or gas stove) is operating or notification providing notification that the door of a refrigerator is open) that requires an alarm (or warning) or attention.

The electronic device 101 may identify whether the sub-classification of the feedback notification 1620 corresponds to personal notification 1623 or common (or official) notification 1625, for example. In one embodiment, the personal notification 1623 may include notification (e.g., notification for the reception of a call or notification for the reception of a message) that needs to be provided to a given user associated with notification. The common (or official) notification 1625 may include notification (e.g., disaster notification, emergency notification or gas leakage sensing notification) that does not have any target (e.g., user) for notification, but needs to be forwarded to a user.

At block 1631, the electronic device 101 may search peripheral electronic devices for an electronic device associated with the identified notification of the sub-classification. According to an embodiment, the electronic device 101 may identify at least one peripheral electronic device that belongs to peripheral electronic devices and that is associated with the personal notification 1613 of the general notification 1610. The electronic device 101 may identify at least one peripheral electronic device that belongs to peripheral electronic devices and that is associated with the personal notification 1623 of the feedback notification 1620. In one embodiment, an associated electronic device associated for each notification of the sub-classification may include a user related to notification or a peripheral electronic device capable of performing a function or a peripheral electronic device designated for each notification of the sub-classification. A criterion for the associated electronic device may include an electronic device capable of voice recording in the case of the personal notification 1613, 1623, may include an electronic device of a given space (e.g., living room) or multi-account in the case of the common notification 1615, and may include an electronic device (e.g., a speaker in a living room) designated as a device for common use for each space (or place) in the case of the emergency notification 1617 of the general notification 1610 or the common notification 1625 of the feedback notification 1620.

If an associated electronic device is not searched for (or if an associated electronic device is not present) at block 1631, at block 1633, the electronic device 101 may collect situation information based on peripheral electronic devices and analyze the situation information. At block 1637, the electronic device 101 may identify a candidate electronic device for a target electronic device, among the peripheral electronic devices, based on a result of the analysis.

If an associated electronic device is searched for (or if an association electronic device is present) at block 1631, at block 1635, the electronic device 101 may collect situation information based on the associated electronic device and analyze it. At block 1637, the electronic device 101 may identify a candidate electronic device for a target electronic device, among the association electronic devices, based on a result of the analysis.

At block 1637, the determination of the candidate electronic device may correspond to those described in the parts described with reference to the above drawings. For example, the electronic device 101 may identify, as a candidate electronic device, at least one electronic device from which situation information (e.g., a sound) related to user detection has been collected, a given electronic device (e.g., an electronic device specialized for a sound or an electronic device having strong sound output), or an electronic device searched for based on set information (e.g., favorites/priority electronic device setting or a user account), among peripheral electronic devices (or association electronic devices).

At block 1641, the electronic device 101 may analyze the situation information of the candidate electronic device. The electronic device 101 may obtain situation information collected by the candidate electronic device, and may obtain situation information, including information related to a user, from the obtained situation information by analyzing (or tracking) the information (e.g., first sensing information to eighth sensing information) (e.g., a person's voice, a person image or a surrounding sound) related to the user. According to an embodiment, the electronic device 101 may identify a user (or the number of users) in the obtained situation information. The electronic device 1641 may identify whether the identification is single user detection 1643 or plural user detection 1645 based on user classification.

If a single user is detected at block 1643, at block 1649, the electronic device 101 may search for (or identify) the space (or place) of the candidate electronic device in which the user is detected (or where the candidate electronic device is positioned). For example, the electronic device 101 may identify whether the candidate electronic device is positioned in the same space as the electronic device 101 or a different space by identifying the space of the candidate electronic device in which the user is detected.

If a plurality of users is detected at block 1643, at block 1647, the electronic device 101 may search for the number of persons (e.g., the number of users) and an account (e.g., a user account or the electronic device of a user account) for each piece of situation information (or candidate electronic device). At block 1649, the electronic device 101 may search for (or identify) at least one space (or place) of the candidate electronic device (or where the candidate electronic device is positioned) for each piece of situation information in which the user is detected. For example, the electronic device 101 may identify whether each of a plurality of candidate electronic devices is positioned in the same space as the electronic device 101 and a different space by identifying the space of each of the plurality of candidate electronic devices in which the plurality of users is detected.

If the electronic device 101 identifies the space as the same space 1651 based on a result of the search at block 1649, at block 1653, the notification may be directly provided through the electronic device 101. The electronic device 101 may identify the electronic device 101 itself as a target electronic device based on user detection within the same space 1651, and may provide the notification to the user by outputting the notification generated from the electronic device 101.

If the electronic device 101 identifies the space as a different space 1661 based on a result of the search at block 1649, at block 1663, the electronic device 101 may identify (or select) a representative electronic device based on the space (or place). The representative electronic device may include one or more electronic devices for each space.

At block 1665, the electronic device 101 may identify whether to provide notification based on a complex space. The electronic device 101 may identify whether notification needs to be provided by several spaces (or places) based on the type (or attribute) of notification.

If the notification is identified as notification provided by a single space at block 1665, at block 1667, the electronic device 101 may provide the notification through the representative electronic device of the corresponding space. The electronic device 101 may identify the representative electronic device of the space as a target electronic device, and may forward the notification to the corresponding representative electronic device so that the notification is output by the representative electronic device.

If the notification is identified as notification provided by a complex space at block 1665, at block 1669, the electronic device 101 may provide the notification through the representative electronic device of each of the plurality of spaces. According to an embodiment, the electronic device 101 may identify a representative electronic device for each space as a target electronic device, and may forward the notification to the representative electronic device of each space so that pieces of the notification are output through the representative electronic devices of the respective spaces generally at the same time (or together).

In addition to or alternative to the search for the space at block 1649, at block 1671, the electronic device 101 may identify (or search for) the attribute of each electronic device if the attribute of notification corresponds to notification of a given attribute that requires a given element (e.g., microphone or speaker), such as a call. For example, the electronic device 101 may identify whether a hands-off function (or support a call function) is possible (or whether a microphone and speaker for a call function is included) by identifying the attribute of each candidate electronic device.

If hands-off function-possible 1673 is identified at block 1671, at block 1675, the electronic device 101 may provide the notification based on hands-off by hands-off to a target electronic device. If a hands-off function needs to be applied as in a call, the electronic device 101 may identify an electronic device that belongs to candidate electronic devices and that supports both a speaker and a microphone as a target electronic device by prioritizing the electronic device, and may provide the notification (e.g., ringtone) or related information (e.g., "there is a call from OO").

If hands-off function-impossible 1677 is identified at block 1671, at block 1679, the electronic device 101 may provide the notification based on at least one method corresponding to that described above, without hands-off.

As illustrated in Table 4, the electronic device 101 may select a target electronic device for outputting notification based on the type of notification (or information associated with the notification). In the case of a notification having a personal attribute directly associated with a user, such as a message or call, is strong, the electronic device 101 may select a peripheral electronic device, related to the corresponding user (or user account), as a target electronic device. In the case of a notification of a given attribute that requires a given element (e.g., microphone or speaker), such as a call, the electronic device 101 may select a peripheral electronic device, including the corresponding element (e.g., microphone or speaker) (or providing a corresponding function), as a target electronic device. The electronic device 101 may select an electronic device, connected to a user account, as a target electronic device by prioritizing the electronic device. The electronic device 101 may select a peripheral electronic device, having situation information of a high (e.g., great) state (e.g., sound waveform or sound size), as a target electronic device. When situation information having the same level is detected (e.g., when a sound having the same level is generated), the electronic device 101 may select a target electronic device based on at least a condition based on surrounding environments, as described above.

TABLE 4

|  | Voice Recording present | Voice Recording not present |
|---|---|---|
| Personal notification | Prioritize and select corresponding electronic device if voice set in a user account is recognized. | Prioritize and select an electronic device based on a user account. Prioritize and select an electronic device whose sound waveform and size are recognized at the highest level. |

TABLE 4-continued

| | Voice Recording present | Voice Recording not present |
|---|---|---|
| Common notification | Select an electronic device in the direction in which a loud sound is recognized or capable of providing notification toward a person. | Prioritize and select an electronic device suitable for a situation if sounds of the same level are recognized. (Provide script that protects personal information) |
| Given notification | Prioritize and select an electronic device supporting a corresponding spec. among corresponding electronic devices if voice set in a user account is recognized. | Prioritize and select a peripheral electronic device supporting a corresponding spec. among peripheral electronic devices from which the strongest sound is detected if voice is not recognized. (Provide script that protects personal information) |

As illustrated in Table 4, if there is a peripheral electronic device capable of voice recording for personal notification (e.g., schedule or message), the electronic device 101 (or may operate in central control equipment or an electronic device playing the role thereof (e.g., AI device), or a server) may prioritize and select the corresponding peripheral electronic device when voice set in a person user account is recognized, and may provide notification (e.g., "OO! You have a message from AA") through the selected peripheral electronic device.

If a peripheral electronic device capable of voice recording for personal notification (e.g., schedule or message) is not present, the electronic device 101 may prioritize and select a peripheral electronic device connected by a personal user account, a peripheral electronic device whose sound waveform and size is recognized at the highest level, or a peripheral electronic device suitable for a corresponding situation when sounds of the same level are recognized, and may provide notification through the selected peripheral electronic device. In the case of personal notification, the electronic device 101 may provide a script that protects personal information, such as "OO have a message."

The electronic device 101 may select a peripheral electronic device in the direction in which a loud sound is recognized or capable of providing notification toward a person with respect to common notification (e.g., fine dust concentration, temperature, or washing notification) as described above, and may provide the notification through the selected peripheral electronic device.

If a peripheral electronic device capable of voice recording is present with respect to given notification (e.g., notification that requires a given function/spec. as in the situation in which a microphone and a speaker are necessary at the same time, such as a call), when voice set in a person user account is recognized, the electronic device 101 may prioritize and select a peripheral electronic device that belongs to the corresponding peripheral electronic devices and that supports the corresponding spec., and may provide the notification through the selected peripheral electronic device. For example, if a hands-off function has to be applied as in a call, the electronic device 101 may prioritize and select a peripheral electronic device supporting a speaker and a microphone at the same time, and may provide corresponding notification (or information related to the notification) (e.g., "OO! you have a call from AA").

If a peripheral electronic device capable of voice recording is not present with respect to given notification, when voice is not recognized, for example, the electronic device 101 may prioritize and select a peripheral electronic device that belongs to peripheral electronic devices from which the strongest sound is detected and that supports a corresponding spec., and may provide the notification through the selected peripheral electronic device. According to an embodiment, in the case of given notification, the electronic device 101 may provide a script that protects personal information, such as "OO! You have a call."

Figure 17:
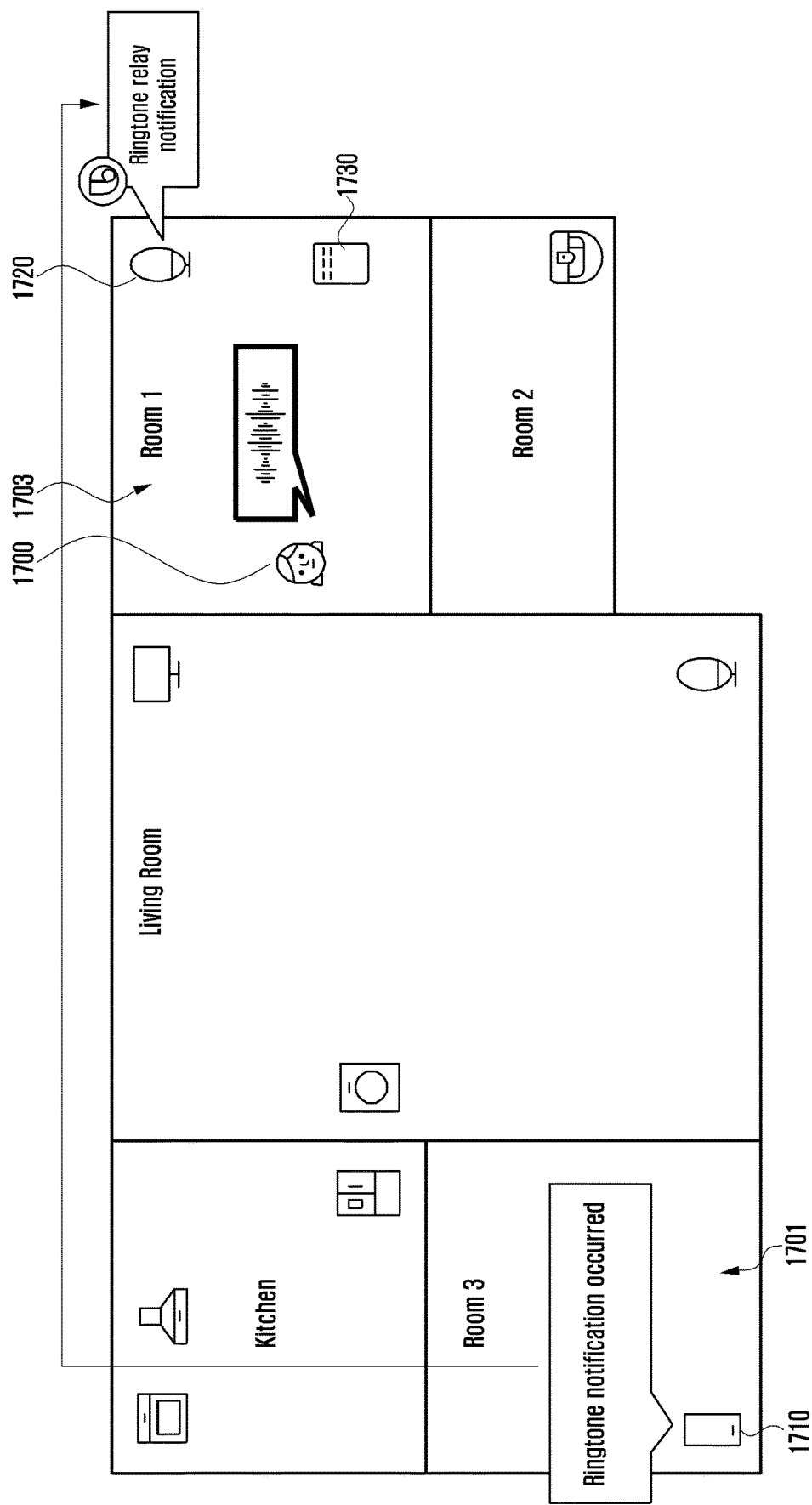
FIG. 17 is a diagram illustrating another example in which notification is provided in a network environment according to an embodiment of the disclosure.

FIG. 17 is a diagram illustrating another example in which notification is provided in a network environment according to an embodiment of the disclosure.

Referring to FIG. 17, a floor plan within a home (or the inside structure of the home) is illustrated for convenience of description as described in the parts described with reference to the above drawings. FIG. 17 shows an example in which various types of electronic devices are present at various places (or locations) in a given space within a home. In describing FIG. 17, a description (e.g., description of other electronic devices) redundant with or corresponding to the above description is omitted. According to an embodiment, FIG. 17 may show an example in which a target electronic device is identified (or selected) based on the type of notification (or information).

Referring to FIG. 17, in the environment in which a plurality of electronic devices is present in a given space, a given situation related to notification (e.g., a call notification sound occurs) may occur in a source electronic device 1710 in a first space (or first place) 1701, and a user 1700 may be present in a second space (or second place) 1703 different from the first space 1701 in which the source electronic device 1710 is present. A first peripheral electronic device 1720 and a second peripheral electronic device 1730 in the second space 1703 may collect situation information related to the user 1700 (e.g., a sound related to the voice of the user 1700).

If a notification occurs in the source electronic device 1710, the source electronic device 1710 may identify a target electronic device that can easily forward the notification to the user and that is in proximity to the user, and may provide the user with the notification through the target electronic device. If a notification of a given attribute that requires a given element (e.g., microphone or speaker), such as a message or call, occurs, the source electronic device 1710 may prioritize and select a peripheral electronic device, including the corresponding element (or supporting a corresponding function) as a target electronic device.

When given notification, such as "call notification", occurs, if situation information (e.g., sound) related to user detection is not detected in a corresponding space (e.g., the first space 1701 in which the source electronic device 1710 is positioned) for a set given time (e.g., about N second), the source electronic device 1710 may collect situation information from peripheral electronic devices in a different space. The source electronic device 1710 may collect sounds related to the user 1700 from the first peripheral electronic device 1720 and the second peripheral electronic device 1730 in the second space 1703.

The source electronic device 1710 may prioritize and select a peripheral electronic device that belongs to the peripheral electronic devices 1720 and 1730 from which sounds are collected and that has the function of a corresponding attribute (or an element (e.g., microphone or speaker) for the execution of a corresponding function), such as a call, as a target electronic device. For example, in FIG. 17, the source electronic device 1710 may identify whether the peripheral electronic devices 1720 and 1730 in the second space 1703 can perform a function related to a call (or whether they include an element related to the execution of a function, such as a microphone and a speaker), and may identify the first peripheral electronic device 1710 capable of performing the function related to a call as a target electronic device. The source electronic device 1710 may identify peripheral electronic devices (e.g., the candidate electronic device) proximate to the user, and may identify an electronic device that belongs to the identified peripheral electronic devices proximate to the user and that has an attribute corresponding to notification as a target electronic device. The source electronic device 1710 may identify a target electronic device by identifying whether an electronic device can perform a function related to an attribute corresponding to the type of notification (e.g., notification of a given attribute, such as a call) and identifying a degree of proximity to a user. For example, in FIG. 17, if a peripheral electronic device capable of performing a function related to a call is plural, the source electronic device 1710 may identify a peripheral electronic device most proximate to the user as a target electronic device based on the above-described sensing information.

The source electronic device 1710 may provide the notification through the first peripheral electronic device 1720. According to an embodiment, the source electronic device 1710 may forward the notification based on a hands-off function so that a call notification sound is output continuously (or consecutively) through the first peripheral electronic device 1720.

Figure 18:
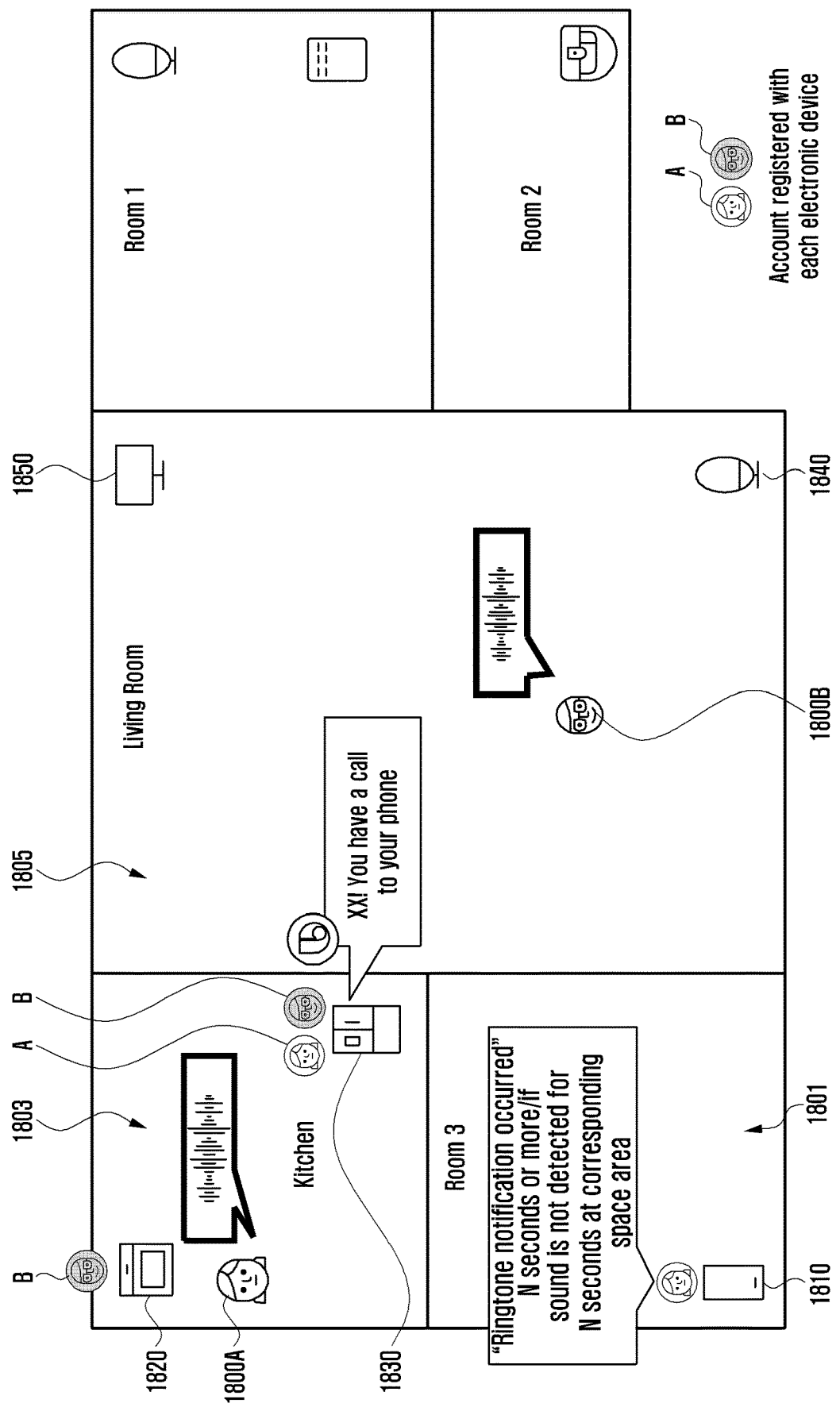
FIG. 18 is a diagram illustrating another example in which notification is provided in a network environment according to an embodiment of the disclosure.

FIG. 18 is a diagram illustrating another example in which notification is provided in a network environment according to an embodiment of the disclosure.

Referring to FIG. 18, a floor plan within a home (or the inside structure of the home) is illustrated for convenience of description as described in the parts described with reference to the above drawings. FIG. 18 shows an example in which various types of electronic devices are present at various places (or locations) in a given space within a home. FIG. 18 may show an example in which a target electronic device is identified (or selected) based on the type of notification (or information).

Referring to FIG. 18, in the environment in which a plurality of electronic devices is present in a given space, a given situation related to notification (e.g., a call notification sound occurs) may occur in a first electronic device 1810 (e.g., source electronic device) in a first space (or first place) 1801, and a first user 1800A and a second user 1800B are present in a second space (or second place) 1803 and a third space (or third place) 1805, respectively, which are different from the first space 1801 in which the first electronic device 1810 is present. Peripheral electronic devices (e.g., second electronic device 1820 and third electronic device 1830) in the second space 1803 may collect situation information related to the first user 1800A (e.g., a sound related to the voice of the first user 1800A). Peripheral electronic devices (e.g., fourth electronic device 1840 and fifth electronic device 1850) in the third space 1805 may collect situation information related to the second user 1800B (e.g., a sound related to the voice of the second user 1800B).

The first user 1800A may be more proximate to the second electronic device 1820 within the second space 1803, and the second user 1800B may be more proximate to the fourth electronic device 1840 within the third space 1805. The user account (or user voice) (hereinafter referred to as an "account B") of the second user 1800B has been previously registered (or pre-configured) with the second electronic device 1820 in the second space 1803. The user account (or user voice) (hereinafter referred to as an "account A") of the first user 1800A and the account B of the second user 1800B may have been previously registered with the third electronic device 1830 in the second space 1803. FIG. 18 illustrates that a sound collected from the third electronic device 1840 in the third space 1805 has a larger sound waveform and size than sounds collected from other peripheral electronic devices 1820, 1830, and 1850. Although a sound collected from the fourth electronic device 1840 of the third space 1805 has the highest priority (e.g., a sound having the greatest sound waveform and/or size), if an account (or user voice) regarding a user related to notification is recognized in another peripheral electronic device from which a sound is collected, priority may be assigned to the corresponding peripheral electronic device and the notification may be provided.

If a notification occurs in the first electronic device 1810, the first electronic device 1810 may identify a target electronic device that can easily forward the notification to a user and that is in proximity to the user, and may provide the user with the notification through the target electronic device. If a notification having a strong personal attribute, such as a message or call, occurs, a target electronic device may be selected by prioritizing a peripheral electronic device associated with the user account of a user related to the corresponding notification (e.g., an electronic device with which a user voice has been registered and which has recognized the user voice).

When a notification of a personal attribute, such as "call notification", occurs, if situation information (e.g., sound) related to user detection is not detected in a corresponding space (e.g., the first space 1801 in which the first electronic device 1810 is positioned) for a set time (e.g., about N second), the first electronic device 1810 may collect situation information from peripheral electronic devices 1820 to 1850 in a different space. According to an embodiment, the first electronic device 1810 may collect a first sound, related to the first user 1800A, from the peripheral electronic devices 1820 and 1830 in the second space 1803, and may collect a sound, related to the second user 1800B, from the peripheral electronic devices 1840 and 1850 in the third space 1805.

If a notification of a personal attribute, such as a call, occurs, the first electronic device 1810 may identify a user (or user account) related to the notification. In FIG. 18, an example in which the notification (e.g., the reception of a call) of a personal attribute is related to the first user 1800A is described. The first electronic device 1810 may prioritize and select a peripheral electronic device (e.g., third electronic device 1830) that belongs to the peripheral electronic devices 1820 to 1850 from which sound are collected and in which the user account (e.g., account A) of a user (e.g., the first user 1800A) related to notification of a personal attribute has been set as a target electronic device. For example, in FIG. 18, the first electronic device 1810 may search the peripheral electronic devices 1820 to 1850 for a peripheral electronic device (e.g., third electronic device 1830) in which the account A regarding the first user 1800A has been set (or registered). The first electronic device 1810 may prioritize and select a peripheral electronic device that belongs to peripheral electronic devices in which a user account has been set and that can perform a function related to a call (or includes all elements related to the execution of a function, such as a microphone and a speaker).

The first electronic device 1810 may provide notification through the third electronic device 1830. According to an embodiment, when the first electronic device 1810 provides the notification, it may provide information (or script) (e.g., "XX! You have a cell to your phone". "XX! You have a call.") related to the notification in relation to personal information (or privacy) protection, so the notification is output through the third electronic device 1830. In an embodiment, the first electronic device 1810 may forward notification based on a hands-off function, so a call notification sound is output contiguously (or consecutively) through the third electronic device 1830.

If an electronic device associated with the user account of a user is not present in the space in which the user related to notification is detected, the first electronic device 1810 may provide only minimum information. Notification related to the second user 1800B in the third space 1805 may occur in the first electronic device 1810 of the first space 1801, the fourth electronic device 1840 of the peripheral electronic devices 1840 and 1850 in the third space 1805 may be selected as a target electronic device, and the account B of the second user 1800B may not be registered with the peripheral electronic devices 1840 and 1850 in the third space 1805. In such a case, when the first electronic device 1810 provides notification to the fourth electronic device 1840 selected as the target electronic device, it may provide the target electronic device with only minimum notification (or information related to notification) or provide a script related to personal information (or privacy) protection.

As in the example of Table 5 below, a target electronic device for outputting notification may be selected based on the type (or attribute) of notification (or information associated with notification).

an electronic device from which the greatest sound output can be delivered, such as a speaker. If there is an electronic device that may be connected to the outside (e.g., call center, service center, emergency disaster center or police station), the electronic device 101 may automatically connect to the outside through the corresponding electronic device so that emergency situation notification is forwarded.

The electronic device 101 may provide notification through a peripheral electronic device from which a sound is generated, with respect to personal notification (e.g., message or schedule). The electronic device 101 may provide notification by applying a rule, corresponding to the part described with reference to Table 4, depending on whether a peripheral electronic device capable of voice recording regarding a user is present.

The electronic device 101 may provide notification depending on whether a sound is generated with respect to common notification (e.g., washing notification, fine dust concentration notification or temperature notification). The electronic device 101 may provide common notification based on a peripheral electronic device from which a sound is detected. For example, the electronic device 101 may provide common notification based on a peripheral electronic device whose person is clearly identified to be present. If a sound is not detected in the electronic device 101, for example, if a determination of the presence or absence of a person for the electronic device 101 is not possible, notification may be provided by applying a rule corresponding to the part described with reference to the above described (e.g., FIG. 13).

Figure 19:
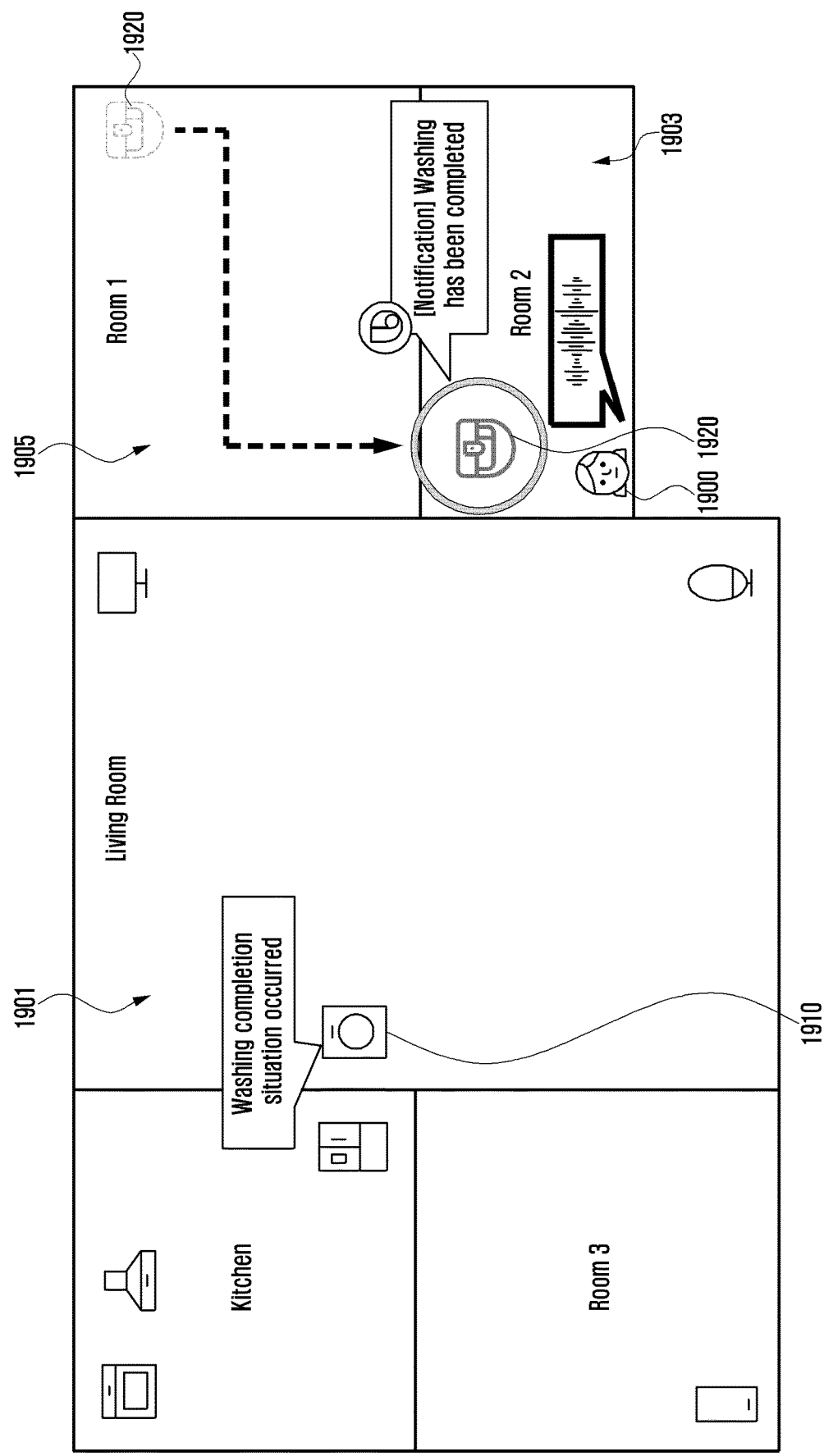
FIG. 19 is a diagram illustrating another example in which notification is provided in a network environment according to an embodiment of the disclosure.

FIG. 19 is a diagram illustrating another example in which notification is provided in a network environment according to an embodiment of the disclosure.

Referring to FIG. 19, a floor plan within a home (or the inside structure of the home) is illustrated for convenience of description as described in the parts described with reference to the above drawings. FIG. 19 shows an example in which various types of electronic devices are present at various places (or locations) in a given space within a home. FIG. 19 may show an example in which if any electronic device capable of providing notification (or information) is not present in the space where a user is present, the notification is provided to the user through a movable electronic device.

TABLE 5

|  | Sound detection | sound not detected |
|---|---|---|
| Emergency situation notification | Select at least one electronic device for each space. (e.g., assign priority to an electronic device to which a sound can be delivered at the highest level, such as a speaker) Provide automatic connection with the outside) | |
| Personal notification | Provide notification to a peripheral electronic device from which a sound is generated - apply a corresponding rule depending on the presence or absence of user voice recording | |
| Common notification | Provide common notification to an electronic device from which a sound is generated | Apply a rule based on setting |

As illustrated in Table 5, the electronic device 101 (or may operate in central control equipment or an electronic device playing the role thereof (e.g., AI device), or a server) may provide notification based on at least one electronic device for each space (or place) regardless of whether a sound occurs (or regardless of whether a sound is detected) (e.g., regardless of whether a person is present can be identified) with respect to emergency situation notification (e.g., fire or robbery). The electronic device 101 may assign priority to Referring to FIG. 19, in the environment in which a plurality of electronic devices is present in a given space, a given situation related to notification (e.g., the occurrence of a washing completion situation) may occur in a first electronic device 1910 (e.g., the source electronic device) in a first space (or first place) 1901, and a user 1900 may be present in a second space (or second place) 1903 different from the first space 1901 in which the first electronic device 1910 is present.

FIG. 19 shows an example in which no electronic device is present in the second space 1903 in which the user 1900 is present. Detection (e.g., sound collection) related to the user 1900 in the second space 1903 may be collected by a second electronic device 1920 in a third space 1905 neighboring the second space 1903. The second electronic device 1920 of the third space 1905 may illustrate a movable electronic device (e.g., robotic vacuum cleaner).

If a notification occurs in the first electronic device 1910, the first electronic device 1910 may identify a target electronic device that can easily forward the notification to a user and that is in proximity to the user, and may provide the user with the notification through the target electronic device. Referring to FIG. 19, if notification occurs in the first electronic device 1910, the first electronic device 1910 may collect situation information (e.g., sound) from a peripheral electronic device. The first electronic device 1910 may collect a sound related to the user 1900 from the second electronic device 1920 in the third space 1905. In FIG. 19, the user 1900 is not present in the third space 1905, and the second electronic device 1920 of the third space 1905 may collect a sound related to the user 1900 and generated from the second space 1903. The second electronic device 1920 of the third space 1905 may provide the electronic device 1910 with information (or inference information), providing notification that the user 1900 is not present in its own space (e.g., third space 1905) and that the user 1900 is present in a different space (e.g., second space 1903), along with situation information. Alternatively, such information (or inference information) may be used for the first electronic device 1910 (e.g., source electronic device) to perform inference (or perform user tracking) based on situation information obtained from the second electronic device 1920.

If it is identified that the user 1900 is not present in the space (e.g., the third space 1905) of the second electronic device 1920 from which a sound is collected and a peripheral electronic device is not present in the space (e.g., the second space 1903) of the user 1900, the first electronic device 1910 may prioritize and select a movable peripheral electronic device as a target electronic device. The first electronic device 1910 may identify a movable electronic device (or movable type electronic device) based on ID information (e.g., device ID) of a peripheral electronic device. The first electronic device 1910 may identify a space (e.g., the second space 1903) in which the user 1900 is present based on situation information collected from the second electronic device 1920 of the third space 1905.

The first electronic device 1910 may request (or instruct or control) an identified movable electronic device (e.g., second electronic device 1920) to move to the second space 1920 in which the user 1900 is present and to forward notification to the user 1900. In response to the reception of a request from the first electronic device 1910, the second electronic device 1920 in the third space 1905 may move to the third space 1930 (e.g., direction in which a sound is generated), and may provide notification, generated from the first electronic device 1910, to the user 1900 present in the second space 1903.

If a movable electronic device is not present in an environment, such as the example of FIG. 19, the first electronic device 1910 may provide notification to the user 1900 based on an electronic device (e.g., the second electronic device 1920 in the third space 1905) closest to the place where a sound is generated or at least one electronic device selected based on priority.

As described above, the space in which a user is present (e.g., location expected as a user's audible range) can be identified based on various types of situation information (e.g., based on a sound, such as a surrounding sound and/or a given sound or based on sensing that may be measured by a sensor), and required notification (or information related to the notification) may be provided through an electronic device in the vicinity of the user. After a user location may be analyzed by taking into consideration various contexts, such as a space (or place), the attribute or size of sensing information (e.g., sound), or the attribute of notification (or information), the notification can be provided to a user clearly through the most suitable electronic device based on at least one output method (e.g., sound). As the number of electronic devices being used within a given space is increased, the amount of notification and information to be delivered may be increased. An electronic device that is most proximate to the current location of a user and that can forward notification most easily can be automatically connected based on situation information (e.g., sound) which may naturally occur during life, such as a sound in the vicinity of a user or a given sound, without a given configuration of the user, and may provide notification and information or may provide a connection for services.

Notification from a source electronic device is provided based on a corresponding peripheral electronic device having the greatest response, such as a person's voice or the waveform of a sound. Accordingly, when notification or service is provided, a user can most listen to the notification in the location in the vicinity of the user. The accuracy of notification forwarding can be improved by dividing a space (or place or location) on a section basis or a Wi-Fi basis, for example. The attribute of situation information (e.g., sound) can be automatically identified. For example, a sound attribute, such as a person voice, a surrounding sound, or broadcasting, can be automatically identified, and the most suitable target electronic device can be selected. The waveform, size, accuracy, or strength of a sound can be measured by taking into consideration the accuracy of situation information. A degree of accuracy can be improved by identifying the attribute of notification (or information). For example, regarding the attribute of notification, an optimal target electronic device can be inferred by analyzing and identifying the attribute of notification, such as personal, emergency, or common, and information to be provided. Notification or a function (e.g., hands-off function or movable electronic device control function) most suitable for a corresponding situation (or context), such as a given function of a peripheral electronic device, by taking into consideration various contexts of a user or peripheral electronic device can be provided.

Figure 20:
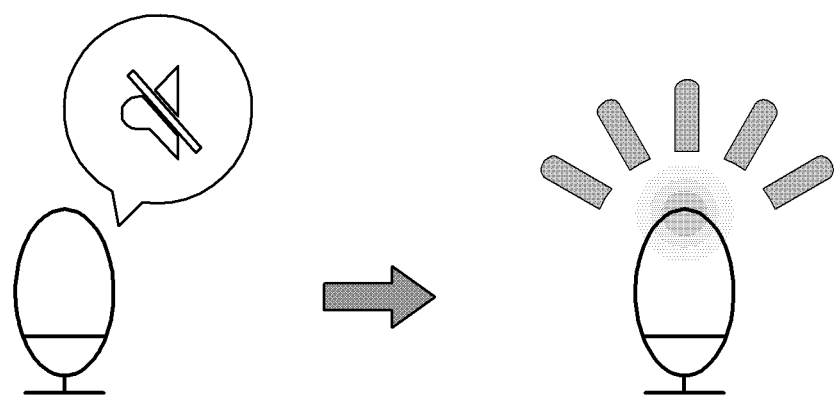
FIG. 20 is a diagram illustrating an example in which notification is provided in a network environment according to an embodiment of the disclosure.

FIG. 20 is a diagram illustrating an example in which notification is provided in a network environment according to an embodiment of the disclosure.

Figure 21:
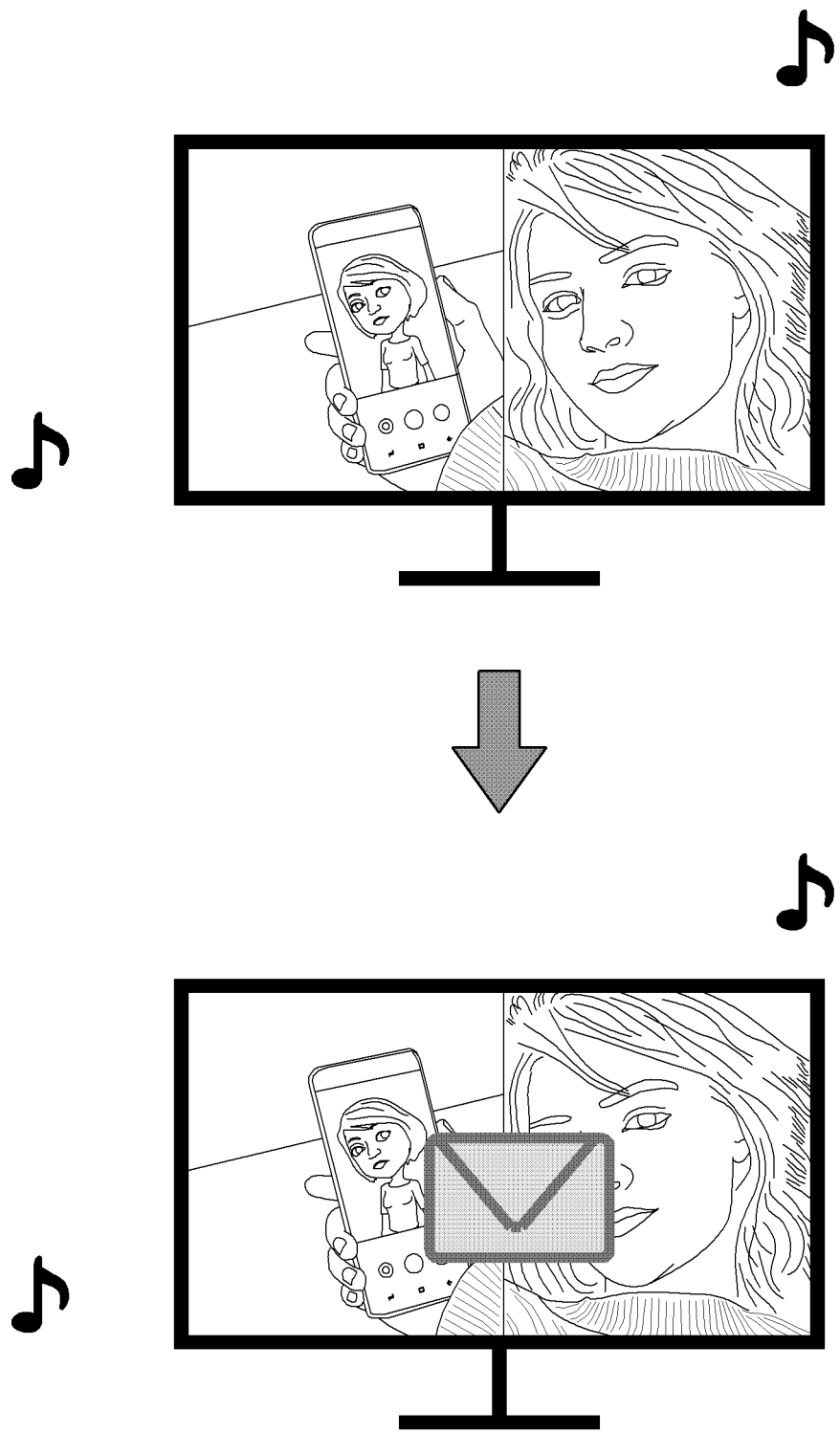
FIG. 21 is a diagram illustrating an example in which notification is provided in a network environment according to an embodiment of the disclosure.

FIG. 21 is a diagram illustrating an example in which notification is provided in a network environment according to an embodiment of the disclosure.

Referring to FIGS. 20 and 21, FIGS. 20 and 21 show examples of a method for a target electronic device to output notification. For example, an electronic device (e.g., source electronic device, central control equipment, or target electronic device) may identify a method of feeding notification back based on at least the attribute (or characteristic) of a corresponding electronic device, the attribute of notification, or a surrounding situation (e.g., manner mode application or late at night), and may provide the method to a user.

In the situation in which the use of a sound is impossible, such as that sound feedback is impossible (e.g., sound output mode off) or that a manner mode is set, notification may be provided to a user using a different output method (e.g., a lighting, haptic or message display method).

Referring to FIG. 20, FIG. 20 may show an example in which notification is provided using the lighting function of the electronic device 101. For example, in the environment in which notification feedback based on a sound may hinder a user (or peripheral user) or in a manner mode situation, notification (or information) may be provided through modality other than a sound, such as a lighting/time message.

Referring to FIG. 21, if a display-based electronic device, such as TV or a monitor, is the first-priority electronic device (e.g., target electronic device) for notification, notification may be forwarded to a user using a temporal effect (e.g., time message) in addition to a sound because the user may watch the electronic device. For example, in the situation in which a display-based electronic device has been selected as the first-priority target electronic device, for example, notification (or information) may be provided through a time message rather than a sound or modality in addition to a sound, such as lighting, using a display attribute.

Figure 22:
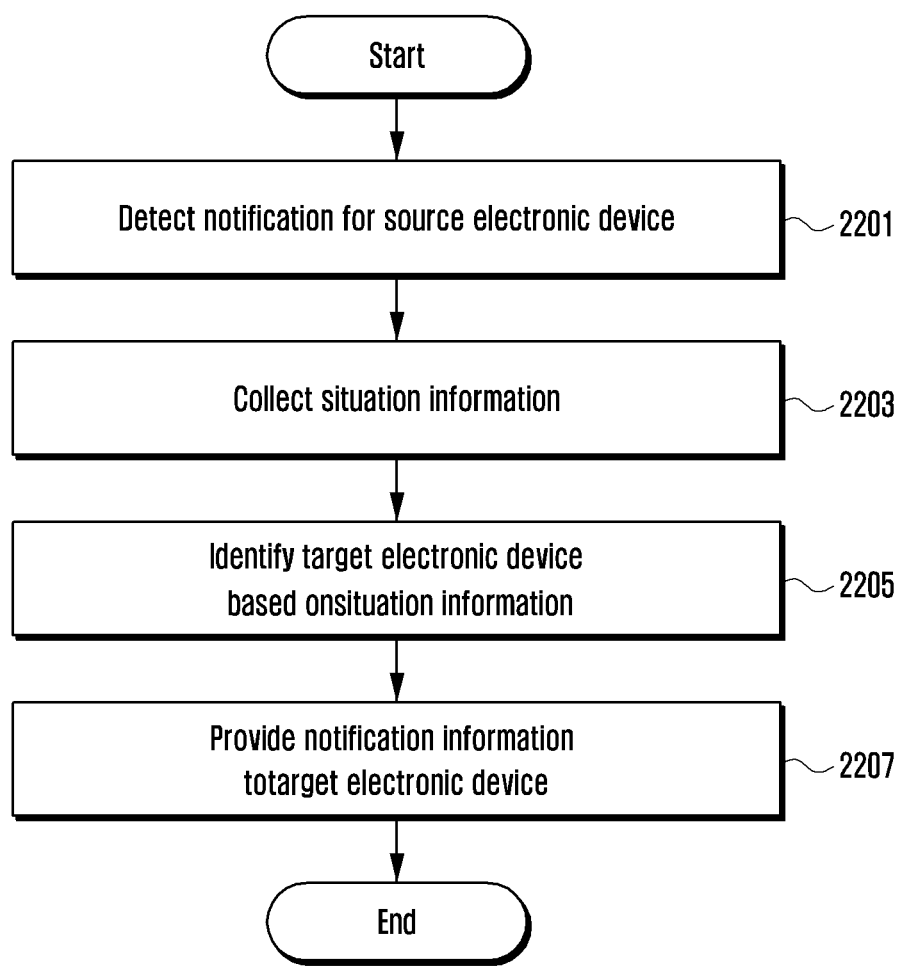
FIG. 22 is a flowchart showing an operating method of an electronic device according to an embodiment of the disclosure.

FIG. 22 is a flowchart showing an operating method of an electronic device according to an embodiment of the disclosure.

Referring to FIG. 22, an example is shown of an operation of controlling an electronic device (e.g., central control equipment, a hub, an AI device, or a central server (or cloud server)) present in a given space along with electronic devices present outside the given space to detect the occurrence of the notification of a source electronic device, to identify a target electronic device based on situation information, and to provide the notification of the source electronic device to the target electronic device.

Referring to FIG. 22, at operation 2201, the processor 120 (e.g., at least one processor including processing circuitry or the function processing module 400 of FIG. 4) of the electronic device 101 may detect a notification related to at least one function of a source electronic device and occurring in the source electronic device. The processor 120 may detect a notification occurring based on the execution of a function (e.g., the start or completion of the execution of a function) within a source electronic device or notification forwarded from the outside (e.g., external different electronic device or server) to a source electronic device. The source electronic device may forward the occurred notification to the electronic device 101. The processor 120 may identify the occurrence of the notification of the source electronic device in accordance with the notification of the source electronic device. The electronic device 101 may detect the reception of an external event (e.g., the reception of a call) having a connected source electronic device as a destination, and may deliver (or forward) the obtained event to a source electronic device and also identify the detection of the event as the occurrence of notification for the source electronic device.

At operation 2203, the processor 120 may collect situation information. The processor 120 may collect situation information based on the source electronic device and situation information based on at least one peripheral electronic device in the vicinity of the source electronic device, in response to the detection of the occurrence of the notification of the source electronic device. The processor 120 may obtain the collected situation information based on various sensors (e.g., the sensor module 176 of FIG. 1, the camera module 180 of FIG. 1, or the input device 150 (e.g., microphone) of FIG. 1) of the electronic devices.

The processor 120 may obtain (or collect) situation information based on a push method of requesting electronic devices to forward situation information. The processor 120 may obtain (or collect) situation information from the periodic or aperiodic transmission of situation information collected by electronic devices. If notification occurs in a source electronic device, the processor 120 may transmit (or broadcast) a message to request electronic devices to transmit situation information through the interface module, and may obtain situation information from the electronic devices in response thereto.

At operation 2205, the processor 120 may identify a target electronic device based on the situation information. The processor 120 may analyze collected situation information, and may identify a target electronic device that will output the notification of a source electronic device based on a result of the analysis. The processor 120 may identify a source electronic device or at least one of electronic devices in the vicinity of a source electronic device as a target electronic device. The processor 120 may identify (or analyze) situation information, including information related to user detection, in pieces of collected situation information by analyzing the situation information. An operation of identifying a target electronic device based on situation information may correspond to that described in the part in which a target electronic device of the electronic device 101 is identified, which has been described with reference to the drawings.

At operation 2207, the processor 120 may provide notification information to the target electronic device. The processor 120 may transmit, to the target electronic device, notification information (e.g., data related to a notification message, a notification voice, or a notification sound) related to the notification through a communication interface (e.g., the interface 177 of FIG. 1 or the communication module 190 of FIG. 1) connected to the target electronic device so that the notification generated from the source electronic device is output by the target electronic device. If a source electronic device is identified to be a target electronic device, the processor 120 may output notification based on the source electronic device.

Figure 23:
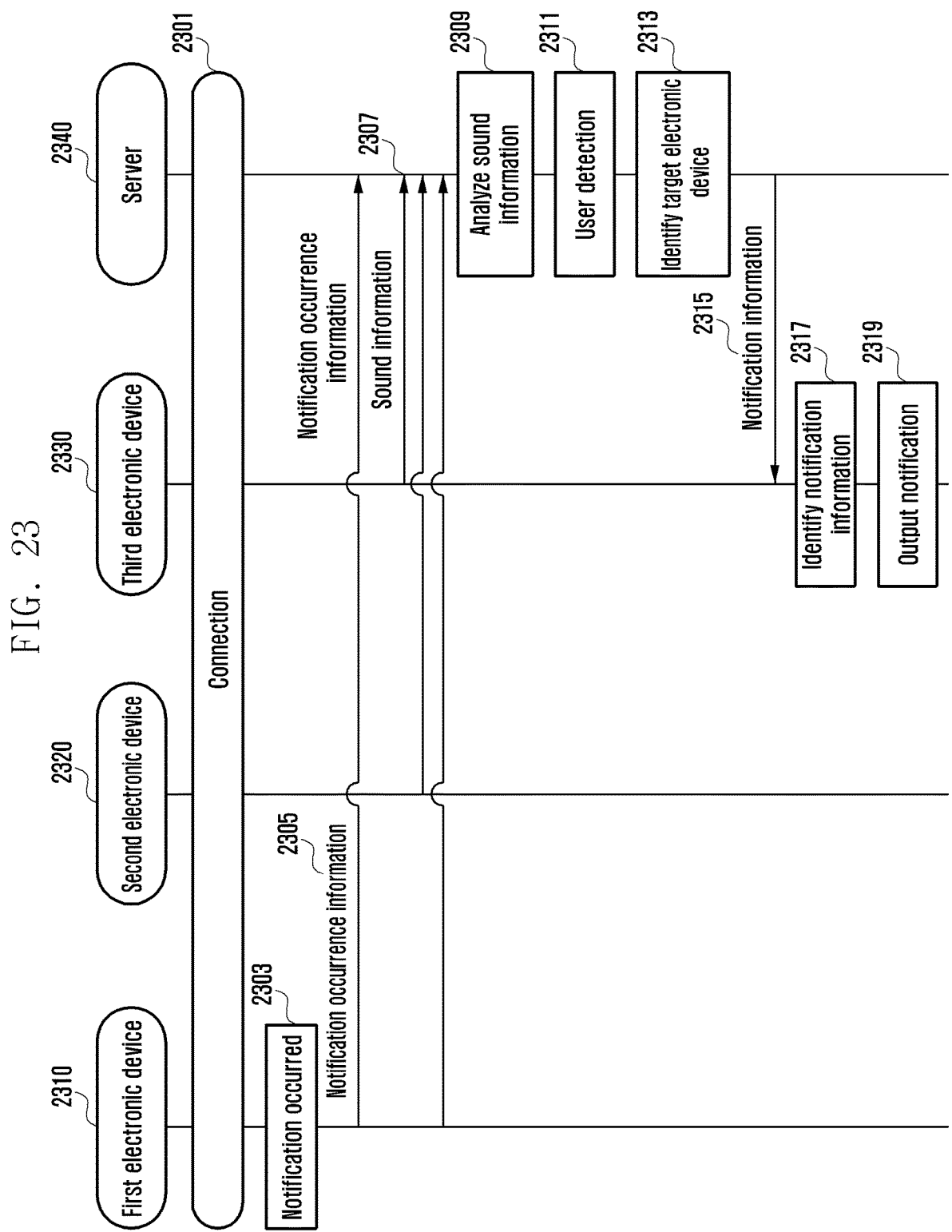
FIG. 23 is a diagram illustrating an example in which notification is provided by interworking electronic devices in a network environment according to an embodiment of the disclosure.

FIG. 23 is a diagram for illustrating an example in which notification is provided by interworking electronic devices in a network environment according to an embodiment of the disclosure.

Referring to FIG. 23, an example is shown in which a first electronic device 2310 is a source electronic device, a second electronic device 2320 and a third electronic device 2330 are peripheral electronic devices disposed at different places in the same space as that of the first electronic device 2310. FIG. 23 may show an example in which a server 2340 controls to detect the occurrence of notification in the electronic devices 2310, 2320, and 2330, to select a target electronic device for notification output among the electronic devices 2310, 2320, and 2330, and to output the notification of the source electronic device through the target electronic device. FIG. 23 shows an example in which the electronic devices 2310, 2320, and 2330 provide or collect situation information based on a sound, but various embodiments are not limited thereto. Situation information (or detection information) may include collection information obtained (or collected or measured) by each of the electronic devices 2310, 2320, and 2330 through a sensing operation.

Referring to FIG. 23, at operation 2301, each of the first electronic device 2310, the second electronic device 2320, and the third electronic device 2330 may be connected to the server 2340. The first electronic device 2310, the second electronic device 2320, and the third electronic device 2330 may be indirectly connected through the server 2340. The first electronic device 2310, the second electronic device 2320, and the third electronic device 2330 may be directly connected. The server 2340 may include a device (e.g., central control equipment, a hub, or an AI device) present in the same space as the electronic devices 2310 to 2330 or a device (e.g., cloud server) present outside the space.

At operation 2303, the first electronic device 2310 (e.g., source electronic device) may detect the occurrence of notification. The first electronic device 2310 may detect the occurrence of notification related to at least one function.

At operation 2305, when the first electronic device 2310 detects the occurrence of notification, the first electronic device 2310 may transmit notification occurrence information for the occurrence of the notification to the server 2340 through a communication interface setup with the server 2340. The notification occurrence information may include at least one of a function related to the occurrence of the notification, the attribute (or type) of the notification, or ID information of the first electronic device 2310, for example.

At operation 2307, the server 2340 may collect situation information related to the first electronic device 2310 and electronic devices (e.g., the second electronic device 2320 and the third electronic device 2330) in the vicinity of the first electronic device 2310. The server 2340 may obtain (or collect) sound information from the electronic devices 2310, 2320, and 2330 through the communication interface. The electronic devices 2310, 2320, and 2330 may periodically measure (or detect) a sound, and may transmit sound information, including the measured sound, to the server 2340. The electronic devices 2310, 2320, and 2330 may measure (or detect) a sound based on a given event (e.g., the reception of a sound information request from the server 2340), and may transmit sound information, including the measured sound, to the server 2340. In FIG. 23, an example in which sound information is used as situation information is described, but various embodiments are not limited thereto.

At operation 2309, the server 2340 may analyze the collected sound information. The server 2340 may identify (or analyze) sound information that belongs to the collected sound information and that includes information related to user detection. For example, the server 2340 may identify sound information that belongs to sound information obtained from the electronic devices 2310, 2320, and 2330 and that includes a sound. The server 2340 may obtain a sound from the identified sound information and analyze the sound (e.g., the waveform, size or frequency of the sound).

At operation 2311, the server 2340 may detect a user based on a result of analysis. The server 2340 may detect a user in information (e.g., given sound) that belongs to the collected sound information and that is related to user detection. The information related to user detection may include a sound including a person (e.g., user)'s voice, or a surrounding sound (e.g., stamping sound, footstep sound, door-striking sound, applause sound, desk-striking sound, keyboard-typing sound, or TV sound). If information (or sound) related to user detection is included in collected sound information, the server 2340 may identify that a user is present in the vicinity of an electronic device that has provided a corresponding sound.

At operation 2313, the server 2340 may identify a target electronic device. The server 2340 may identify an electronic device that has provided information (or sound) related to user detection, among the collected sound information, as a target electronic device. The server 2340 may identify (or recognize) a target electronic device based on at least ID information of the electronic devices 2310, 2320, and 2330. In FIG. 23, an example in which the third electronic device 2330 is a target electronic device is described. In A method of identifying a target electronic device by analyzing situation information (e.g., sound) may correspond to that described in the parts described with reference to the above drawings.

At operation 2315, the server 2340 may transmit notification information (or notification data) related to the notification to the third electronic device 2330 based on a communication interface (e.g., the interface 177 of FIG. 1 or the communication module 190 of FIG. 1) set up (or formed) with the third electronic device 2330.

At operation 2317, the third electronic device 2330 (e.g., target electronic device) may obtain the notification information from the server 2340 through the communication interface, and may identify the obtained notification information. The third electronic device 2330 may further include an operation of identifying the attribute of the notification information and converting (or processing) notification to be output based on at least the attribute of the notification information.

At operation 2319, the third electronic device 2330 may output notification, corresponding to the notification information, using at least one method. The third electronic device 2330 may provide notification, generated from the first electronic device 2310, to a user by outputting the notification on behalf of the first electronic device 2310. The third electronic device 2330 may output notification based on at least one of a visual, auditory or tactile element. The first electronic device 2310 may output corresponding notification generated from the first electronic device 2310 in parallel to the output of notification from the third electronic device 2330 (or after the server 2340 transmits notification information for notification output to the third electronic device 2330).

Figure 24:
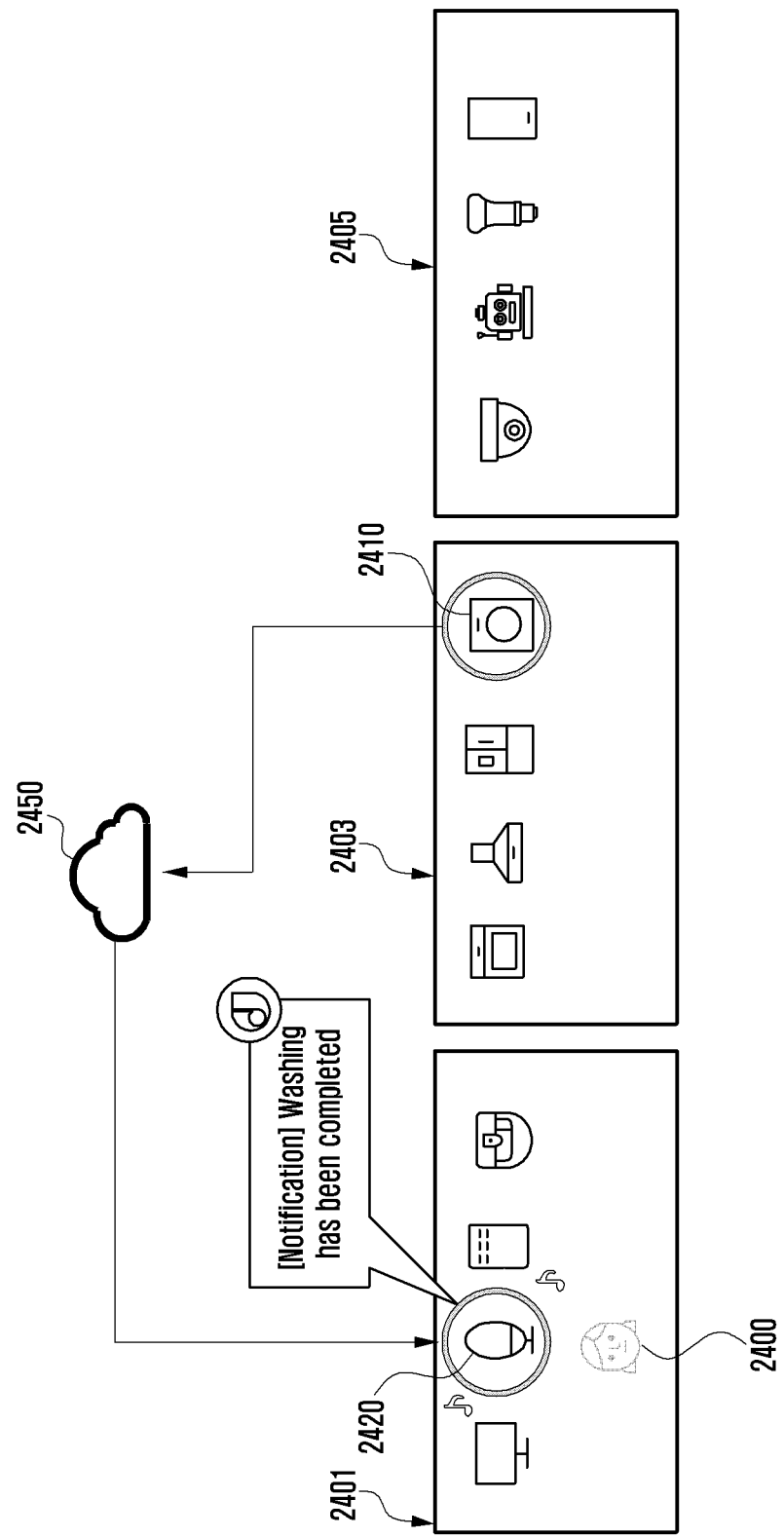
FIG. 24 is a diagram illustrating an example in which notification is provided in a network environment according to an embodiment of the disclosure.

FIG. 24 is a diagram for illustrating an example in which notification is provided in a network environment according to an embodiment of the disclosure.

Referring to FIG. 24, an example is shown in which a target electronic device capable of forwarding the notification of a source electronic device to a user most easily is identified based on a sound and the notification is provided to a user 2400 by forwarding the notification of the source electronic device to the identified target electronic device based on a server 2450.

Referring to FIG. 24, a space may be divided into a first space 2401 (e.g., living room), a second space 2403 (e.g., kitchen), and a third space 2405 (e.g., room), and a plurality of electronic devices may be present in each of the spaces 2401, 2403, and 2405. FIG. 24 shows an example of a scenario in which a sound is used as situation information. Information (e.g., place information) on a place designated in the given space of electronic devices may have been previously registered with the server 2450.

A given situation related to notification (e.g., the occurrence of a washing completion situation) may occur in a first electronic device 2410 (e.g., source electronic device) in the second space 2403. The user 2400 may be present in the first space 2401 different from the second space 2403 in which the first electronic device 2410 is present. The notification may be classified as a notification of a first type and/or a notification of a second type. For example, the notification of the first type may include notification related to non-real-time (or non-real-time property) processing. The notification of the second type may include notification related to real-time (or real-time property) processing.

The first electronic device 2410 may transmit notification occurrence information (or notification information) for the occurrence of notification to the server 2450 through a communication interface established with the server 2450, in response to the detection of the occurrence of the notification. If a notification (or a given situation) occurs in the first electronic device 2410, the server 2450 may search electronic devices, belonging to electronic devices in each of the spaces 2401, 2403, and 2405 and capable of collecting situation information (e.g., equipped with a microphone for sound collection), for sound information for a sound (e.g., surrounding sound, person's voice or given sound) in the vicinity of a corresponding electronic device.

The server 2450 may identify a target electronic device based on sounds collected from electronic devices. The server 2450 may identify an electronic device (e.g., the second electronic device 2420 in the first space 2401) that belongs to electronic devices in a space (or place) in which the greatest sound is detected and that has a sound having the greatest and clearest sound waveform as a target electronic device.

If a user's voice or a surrounding sound is clear, the server 2450 may select an electronic device (e.g., a second electronic device 2420) most proximate to the user's voice or surrounding sound as a target electronic device. If a user's voice or a surrounding sound is unclear, for example, if a user's voice or a surrounding sound is not present, the server 2450 may identify other sounds (e.g., content playback sound, such as a music sound or a TV sound). The server 2450 may select an electronic device (e.g., the second electronic device 2420 in the first space 2401) in which corresponding other sounds are played back as a target electronic device based on the identified other sounds.

The server 2450 may forward notification to the second electronic device 2420 of the first space 2401 identified as a target electronic device. The second electronic device 2420 may provide notification to the user 2400 by outputting the notification.

An element (e.g., microphone, camera or sensor) for situation information collection (or detection) may operate based on various conditions in order to prevent power consumption and/or unnecessary collection (e.g., always collection) of an electronic device. For example, as described in the part described with reference to Table 3, the element may operate based on various conditions. If the occurrence of notification by a source electronic device is detected, the server 2450 may transmit, to each of electronic device in the spaces 2401, 2403, and 2405, a command to turn on an element (e.g., various sensors, such as a microphone and a camera) related to the collection of situation information. For example, the server 2450 may control an electronic device to turn on a microphone.

Figure 25:
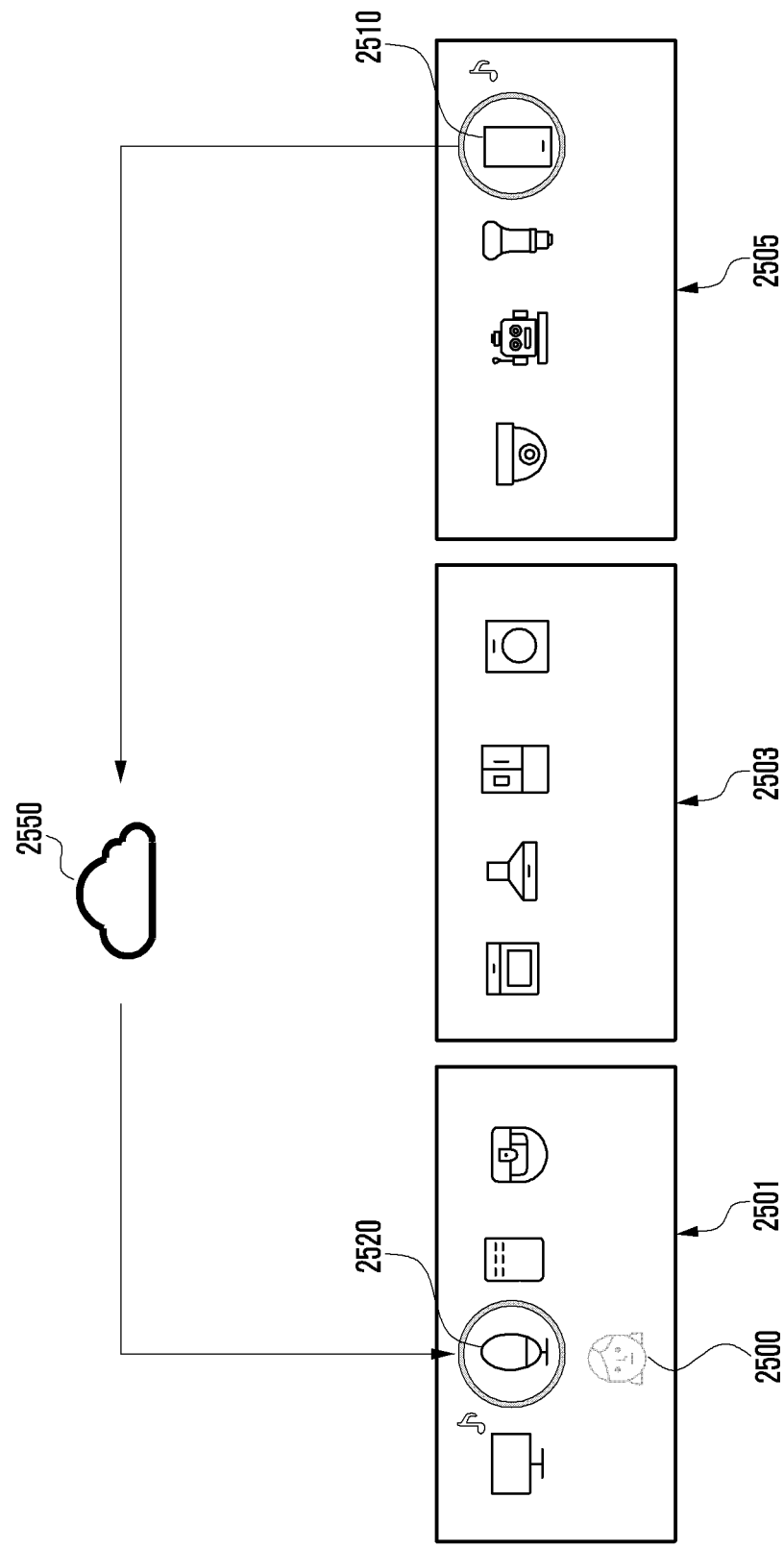
FIG. 25 is a diagram illustrating an example in which notification is provided in a network environment according to an embodiment of the disclosure.

FIG. 25 is a diagram illustrating an example in which notification is provided in a network environment according to an embodiment of the disclosure.

Referring to FIG. 25, an example is shown in which a target electronic device capable of forwarding the notification of a source electronic device to a user most easily is identified based on a sound and the notification is provided to a user 2500 by forwarding the notification of the source electronic device to the identified target electronic device based on a server 2550.

Referring to FIG. 25, a space may be divided into a first space 2501, a second space 2503, and a third space 2505, and a plurality of electronic devices may be present in each of the spaces 2501, 2503, and 2505. FIG. 25 shows an example of a scenario in which a sound is used as situation information. Information (e.g., place information) on a place designated in the given space of electronic devices may have been previously registered with the server 2550.

In the environment in which a plurality of electronic devices is present in given spaces (e.g., the first space 2501, the second space 2503, and the third space 2505), a given situation related to notification (e.g., the occurrence of a call notification sound) may occur in a first electronic device 2510 (e.g., source electronic device) in the third space 2505. The user 2500 may be present in the first space 2501 different from the third space 2505 in which the first electronic device 2510 is present.

The first electronic device 2510 may transmit notification occurrence information (or notification information) for the occurrence of a notification to the server 2550 through a communication interface established with the server 2550, in response to the detection of the occurrence of the notification. If a notification (or a given situation) occurs in the first electronic device 2510, the server 2550 may search electronic devices in each of the spaces 2501, 2503, and 2505 for sound information for a sound (e.g., surrounding sound, person's voice, or given sound) in the vicinity of a corresponding electronic device.

If a notification occurs in the first electronic device 2510, the server 2550 may identify an electronic device that can easily forward notification to a user and that is in proximity to the user as a target electronic device, and may provide the user with the notification through the target electronic device. If a notification of a given attribute that requires a given element (e.g., microphone or speaker), such as a message or call, occurs, the server 2550 may prioritize and select an electronic device, including the corresponding element (or supporting a corresponding function), as a target electronic device.

Referring to FIG. 25, when given notification, such as "call notification", occurs in the first electronic device 2510, if situation information (e.g., a sound, such as a user's voice or a surrounding sound) related to user detection is not detected in the third space 2503 for a set given time (e.g., about N second) within a corresponding space (e.g., the third space 2503 in which the first electronic device 2510 is positioned), the server 2550 may collect situation information from electronic devices in a different space. According to an embodiment, the server 2550 may collect a sound related to the user 2500 from a second electronic device 2520 in the first space 2501.

If a user's voice or a surrounding sound is clear, the server 2550 may select an electronic device (e.g., the second electronic device 2520) most proximate to the user's voice or the surrounding sound as a target electronic device. If a user's voice or a surrounding sound is unclear, for example, if a user's voice or a surrounding sound is not present, the server 2550 may identify other sounds (e.g., a content playback sound, such as a music sound or a TV sound). The server 2550 may select an electronic device (e.g., the second electronic device 2520 in the first space 2501) in which corresponding other sounds are played back as a target electronic device based on identified other sounds. The server 2550 may prioritize and select an electronic device that belongs to electronic devices from which sounds are collected and that has a function of a corresponding attribute (or an element (e.g., microphone or speaker) for the execution of a corresponding function), such as a call, as a target electronic device. For example, in FIG. 25, the server 2550 may identify the second electronic device 2520 that belongs to electronic devices in the first space 2501 and that can perform a function (e.g., hands-off function) related to a call (or including all elements related to the execution of a function, such as a microphone and a speaker) as a target electronic device.

The server 2550 may forward notification to the second electronic device 2520 of the first space 2501 identified as a target electronic device. The second electronic device 2520 may provide notification to the user 2500 by outputting the notification. The server 2550 may provide the notification of the first electronic device 2510 through the second electronic device 2520. The server 2550 may forward notification based on a hands-off function so that a call notification sound is output contiguously (or consecutively) through the second electronic device 2520.

Figure 26:
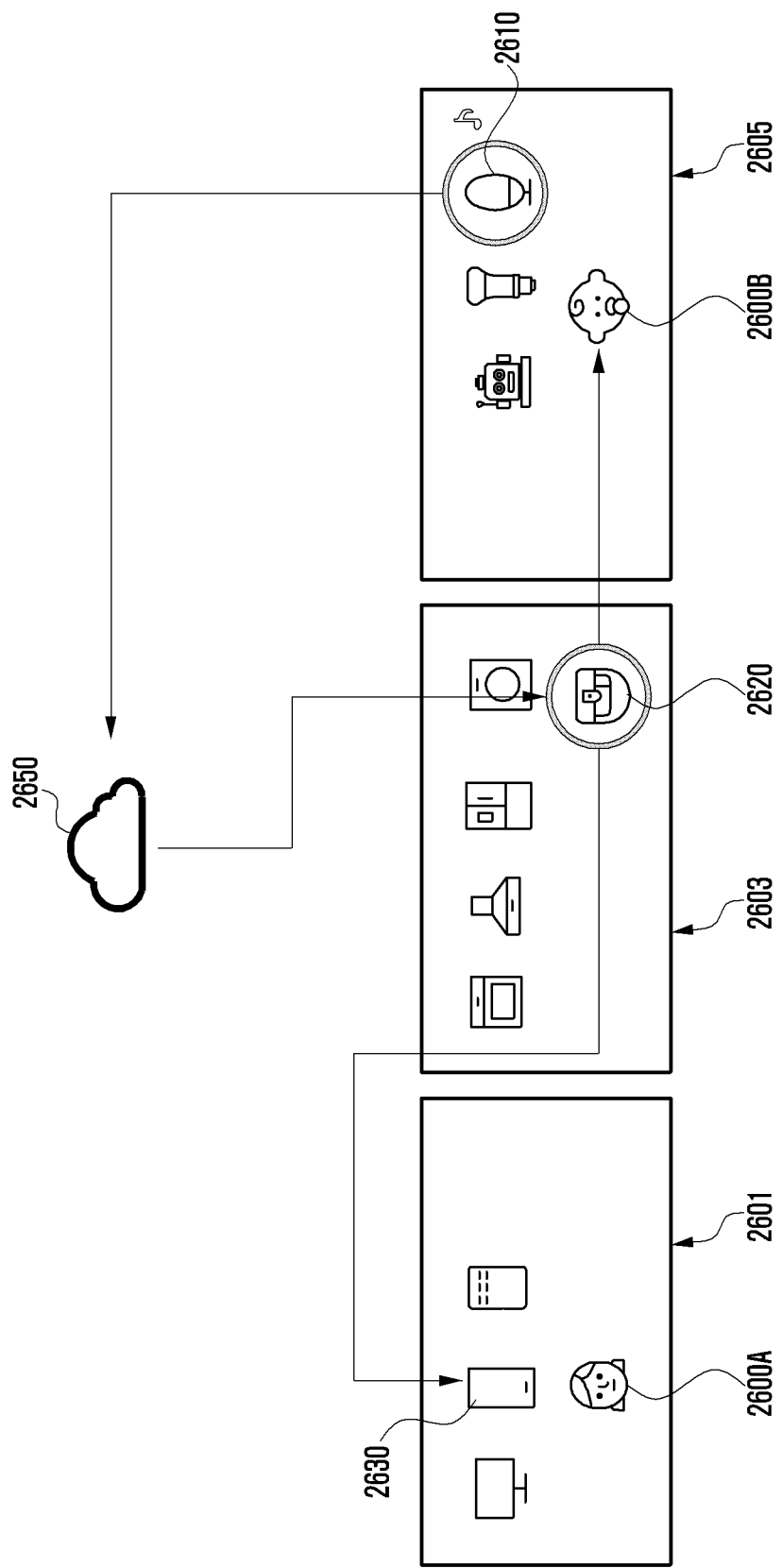
FIG. 26 is a diagram illustrating an example in which notification is provided in a network environment according to an embodiment of the disclosure.

FIG. 26 is a diagram illustrating an example in which notification is provided in a network environment according to an embodiment of the disclosure.

Referring to FIG. 26, an example is shown in which a target electronic device capable of forwarding the notification of a source electronic device to a user most easily is identified based on a sound and the notification is provided to a user 2600 by forwarding the notification to the identified target electronic device based on a server 2650. FIG. 26 shows an example in which if a sound of a given size or more (e.g., a situation in which a pet barks loudly or a child cries) is detected in a space in which a given object (e.g., child or pet) is present, whereas a given user (e.g., parents) is not present in the corresponding space, notification is provided through a target electronic device in proximity to a user and at the same time, state notification regarding the given object is provided to the corresponding user using a movable electronic device. FIG. 26 shows an example in which related notification (or information related to notification) is provided based on a sound using a plurality of electronic devices with respect to the situation of a corresponding space (or place) in which a sound is detected.

Referring to FIG. 26, a location may be divided into a first space 2601, a second space 2603, and a third space 2605, and a plurality of electronic devices may be present in each of the spaces 2601, 2603, and 2605. FIG. 26 shows an example of a scenario in which a sound is used as situation information. Information (e.g., place information) on a place designated in the given space of electronic devices may have been previously registered with the server 2650.

In the environment in which a plurality of electronic devices is present in given spaces (e.g., the first space 2601, the second space 2603, and the third space 2605), a given situation related to notification (e.g., the detection of a sound based on the crying of a child 2600B) may occur in a first electronic device 2610 (e.g., source electronic device) in the third space 2605. A user 2600A (e.g., parents) who can care the child 2600B may be present in the first space 2601 different from the third space 2605 in which the first electronic device 2610 is present.

The first electronic device 2610 may transmit notification occurrence information (or notification information) for the occurrence of notification to the server 2650 through a communication interface established with the server 2650, in response to the detection of the occurrence of notification related to a sound of a level or more (e.g., sound waveform or size) set by the user 1600A, such as a sound of a given size (e.g., decibel) or more or a given crying sound.

The server 2650 may identify an electronic device, including an element (e.g., image sensor) capable of situation recognition (or identify or check the situation) in the same space as the space in which notification occurs or a space in the vicinity of the space in which notification occurs, and may instruct the identified electronic device (e.g., the second electronic device 2620 of the second space 2603) to move to the third space 2605 in which the child 2600B is present and to identify the state (e.g., photo photographing).

The second electronic device 2620 may move to the third space 2605 and perform situation recognition (or photo photographing and/or sound collection) on the child 2600B in accordance with the instruction of the server 2650. The second electronic device 2620 may transmit result information (e.g., collected sounds or captured image) based on the results of the execution of situation recognition to the server 2650 or a target electronic device (e.g., a third electronic device 2630) designated by the server 2650. If a notification (or a given situation) set in the first electronic device 2610 occurs, the server 2650 may search electronic devices in each of the spaces 2601, 2603, and 2605 for sound information for a sound (e.g., surrounding sound, person's voice or given sound) in the vicinity of a corresponding electronic device. Referring to FIG. 26, the server 2650 may select the third electronic device 2630 in the first space 2601 as a target electronic device.

The server 2650 may forward situation notification (e.g., a sound and image collected by the second electronic device 26200) to the third electronic device 2630 of the first space 2601 identified as a target electronic device. The third electronic device 2630 may provide the notification to the user 2600A by outputting the notification. If a notification by the first electronic device 2610 is detected, the server 2650 may collect information on a surrounding situation through the movable second electronic device 2620, and may provide the collected information to the third electronic device 2630, that is, a target electronic device through the second electronic device 26200.

Figure 27:
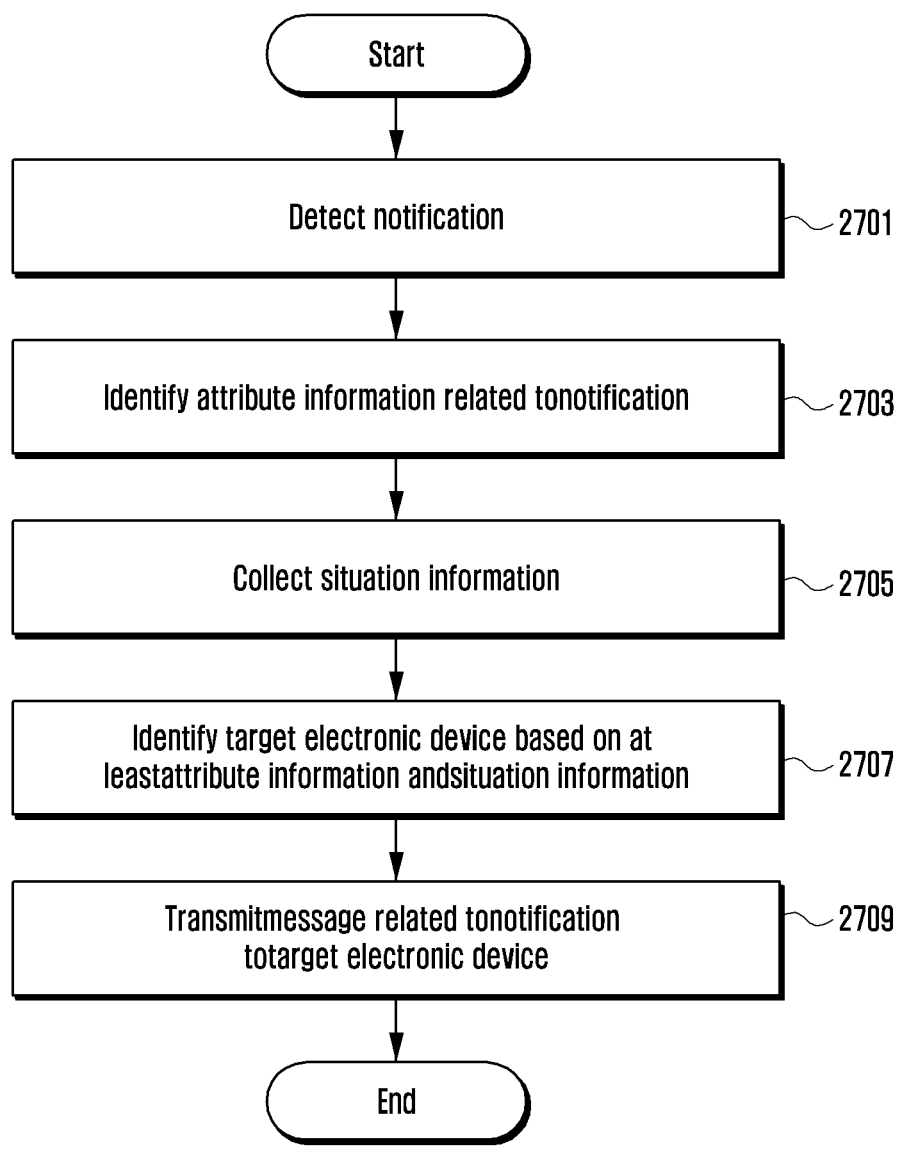
FIG. 27 is a flowchart showing an operating method of an electronic device according to an embodiment of the disclosure.

FIG. 27 is a flowchart showing an operating method of an electronic device according to an embodiment of the disclosure.

Referring to FIG. 27, an example is shown in which an electronic device according to various embodiments of the disclosure identifies a target electronic device based on the attribute (or type) of notification. In the description of FIG. 27, an electronic device that identifies a target electronic device may mean a device capable of being connected to and communicating with peripheral electronic devices, such as a source electronic device, central control equipment, a hub, an AI device, or a cloud server, in a broad sense.

Referring to FIG. 27, at operation 2701, the processor 120 (e.g., at least one processor including processing circuitry or the function processing module 400 of FIG. 4) of the electronic device 101 may detect notification. The processor 120 may detect a first notification generated based on the execution of a function (e.g., the start or completion of the execution of a function) by the electronic device 101 or second notification (e.g., notification related to the reception of a call connection request or the reception of a message transmitted by an external device using the electronic device 101 as a destination (or recipient)) received from an external device (e.g., external different electronic device or server).

At operation 2703, the processor 120 may identify the attribute (or type) of notification information related to the detected notification in response to the detection of the notification. The processor 120 may identify whether the detected notification corresponds to the first notification or the second notification. The processor 120 may also identify a user (e.g., notification (e.g., call, message) reception target user) related to the second notification, with respect to the second notification.

At operation 2705, the processor 120 may collect situation information. The processor 120 may collect situation information based on the electronic device 101 and situation information based on at least one peripheral electronic device. The processor 120 may collect the situation information based on various sensors (e.g., the sensor module 176 of FIG. 1, the camera module 180 of FIG. 1 or the input device 150 of FIG. 1 (e.g., microphone)) of the electronic device 101. The processor 120 may obtain situation information, collected by a peripheral electronic device, from the peripheral electronic device through a communication interface (e.g., the interface module 480). If a notification occurs in the electronic device 101, the processor 120 may transmit (or broadcast) a message to request a peripheral electronic device to transmit situation information through the communication interface, and may obtain situation information from the peripheral electronic device in response thereto.

At operation 2707, the processor 120 may identify a target electronic device based on at least the attribute information and the situation information. The processor 120 may analyze the collected situation information, and may identify a target electronic device that will output the notification of the electronic device 101 based on a result of the analysis. The processor 120 may select a peripheral electronic device (e.g., a candidate electronic device) that belongs to peripheral electronic devices and that includes (or has) notification output performance based on attribute information (e.g., including all of related elements for notification output or the execution of a function (e.g., the execution of a call function) corresponding to notification), and may identify a peripheral electronic device that belongs to the selected peripheral electronic devices and that is in proximity to a user (or positioned in the vicinity of the user (or user location)) as a target electronic device.

At operation 2709, the processor 120 may transmit a message related to the notification to the target electronic device. The processor 120 may transmit a message related to the notification (e.g., data related to a notification message, a notification voice, or a notification sound) to the target electronic device through a communication interface connected to the target electronic device so that the notification generated from the electronic device 101 is output to the target electronic device.

Figure 28:
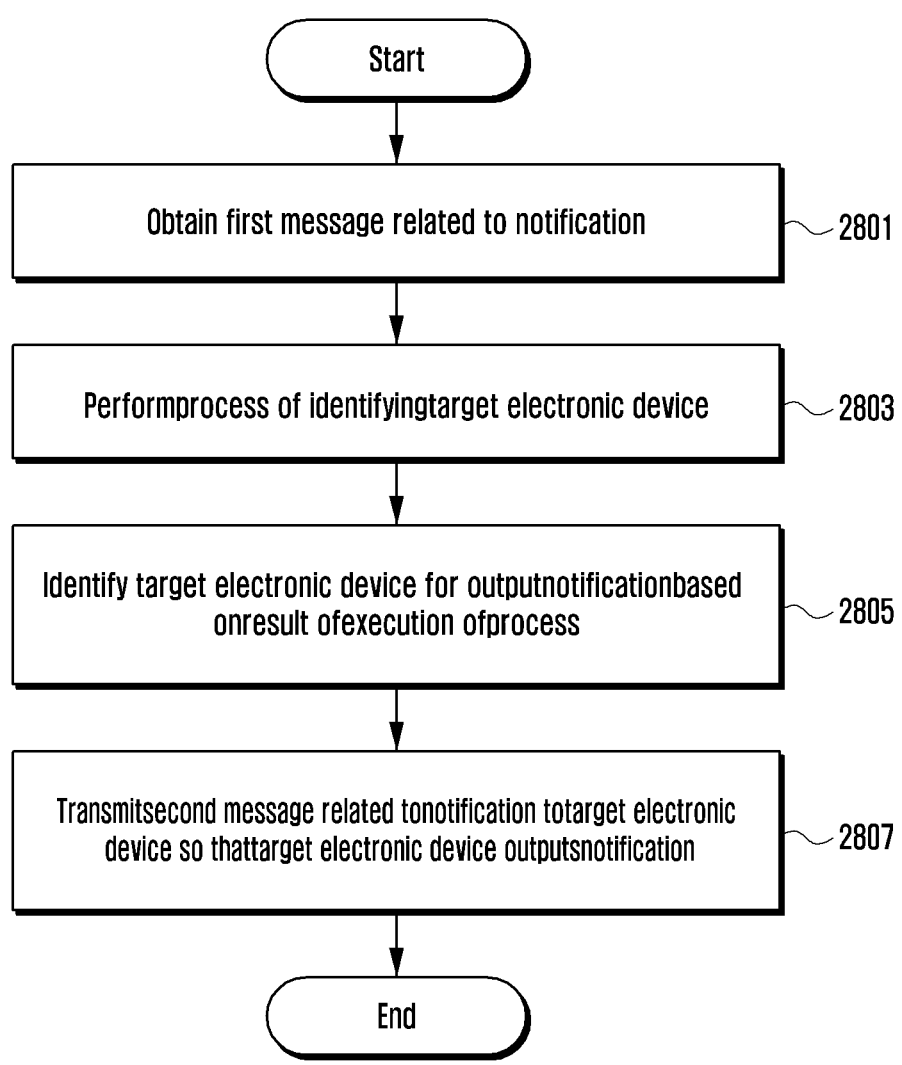
FIG. 28 is a flowchart showing an operating method of an electronic device according to an embodiment of the disclosure.

FIG. 28 is a flowchart showing an operating method of an electronic device according to an embodiment of the disclosure.

Referring to FIG. 28, an example is shown in which an electronic device identifies a target electronic device capable of notification output obtained from the outside according to various embodiments. In the description of FIG. 28, an electronic device that identifies a target electronic device may mean a device capable of being connected to peripheral electronic devices and performing communication, such as a source electronic device, central control equipment, a hub, an AI device, or a cloud server, in a broad sense.

Referring to FIG. 28, at operation 2801, the processor 120 (e.g., at least one processor including processing circuitry or the function processing module 400 of FIG. 4) of the electronic device 101 may obtain a first message related to notification. The processor 120 may obtain a message (or signal) related to given notification having the electronic device 101 (or the user of the electronic device 101) as a destination (or recipient), such as a call (e.g., voice call or video call) connection request, a text message, or an instant message transmitted from the outside, from the outside (e.g., external different electronic device or server).

At operation 2803, the processor 120 may perform a process of identifying a target electronic device that will output the notification of the first message in response to the reception of the first message. The processor 120 may identify notification output performance (or element) necessary to output the notification of the first message (hereinafter referred to as a "first process"). The processor 120 may identify a peripheral electronic device (e.g., a first candidate electronic device) that belongs to peripheral electronic devices and that includes the notification output performance identified in the first process, based on collected situation information (hereinafter referred to as a "second process"). The processor 120 may identify a peripheral electronic device (e.g., a second candidate electronic device) that belongs to peripheral electronic devices (e.g., the first candidate electronic devices) and that is in proximity to a user (or positioned in the vicinity of a user (or user location)) based on collected situation information (hereinafter referred to as a "third process"). The operation sequence of the first process, the second process, and the third process is not limited to the disclosed sequence, and the first to third processes may be performed sequentially, in parallel, in a reverse-sequential manner, or randomly. For example, the processor 120 may identify peripheral electronic devices proximate to a user according to the third process, and may identify a peripheral electronic device that belongs to the identified peripheral electronic devices and that includes notification output performance identified according to the first process, according to the second process.

At operation 2805, the processor 120 may identify a target electronic device that will output the notification based on a result of the execution of the process. The processor 120 may identify an electronic device that includes notification output performance capable of notification output and is in proximity to a user (in the vicinity of the user) as a target electronic device that will output the notification based on the first processor, the second process, and the third process.

At operation 2807, the processor 120 may transmit a second message related to the notification to the target electronic device so that the target electronic device outputs the notification. The processor 120 may transmit the second message, related to the notification, to the target electronic device through a communication interface connected to the target electronic device so that the electronic device 101 outputs the notification, received from the outside, to the target electronic device. The second message may include notification itself (e.g., ringtone) or related information (e.g., "there is a call from OO'""). In one embodiment, the second message (e.g., related information) may be configured based on text (or message) or based on a sound (or voice) based on at least the attribute of a target electronic device.

Figure 29:
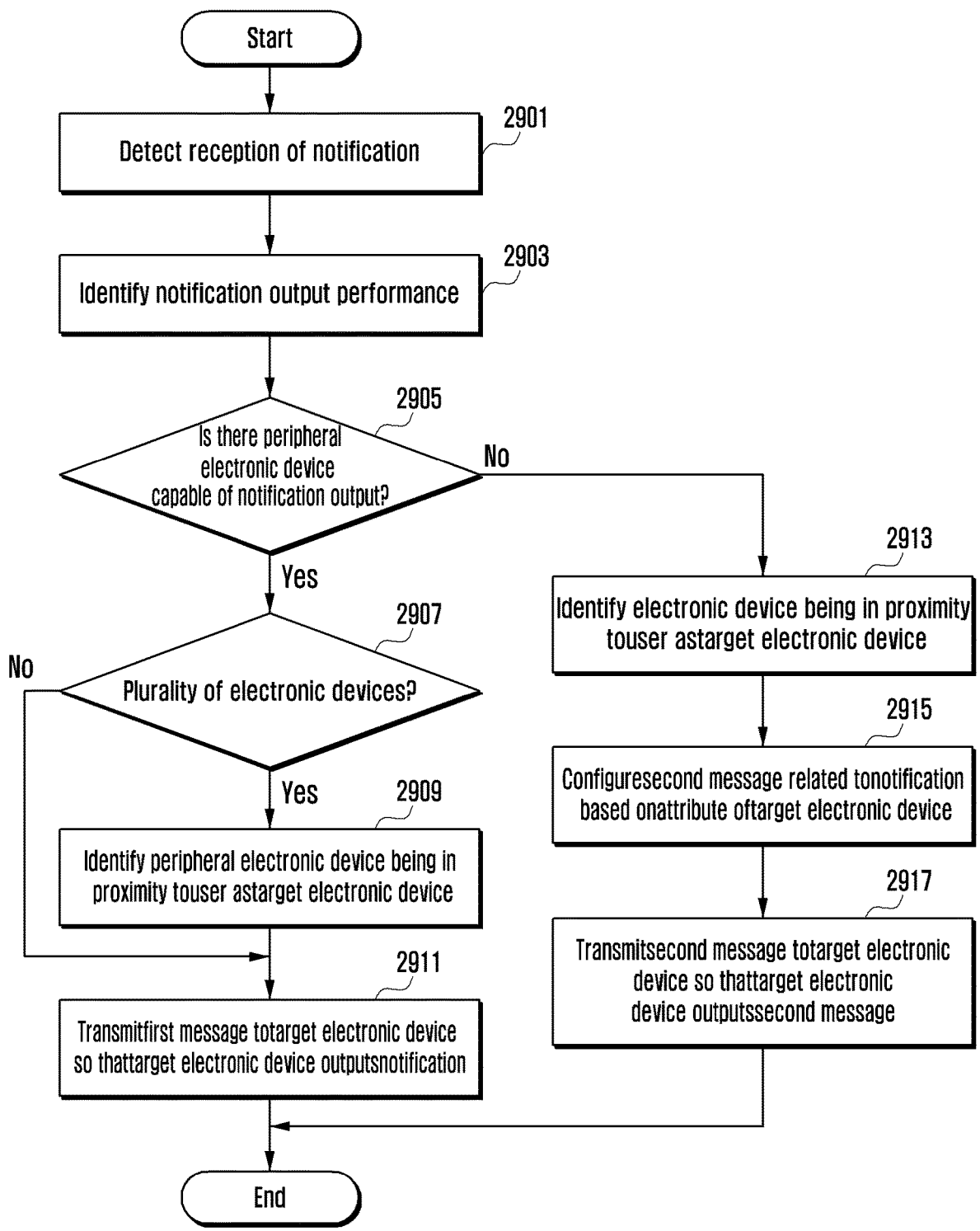
FIG. 29 is a flowchart showing an operating method of an electronic device according to an embodiment of the disclosure.

FIG. 29 is a flowchart showing an operating method of an electronic device according to an embodiment of the disclosure.

Referring to FIG. 29, an example is shown of a process for an electronic device to identify a target electronic device capable of outputting obtained notification based on the detection of the reception of the notification from the outside. In the description of FIG. 29, an electronic device that identifies a target electronic device may mean a device capable of being connected to peripheral electronic devices and performing communication, such as a source electronic device, central control equipment, a hub, an AI device, or a cloud server, in a broad sense.

Referring to FIG. 29, at operation 2901, the processor 120 (e.g., at least one processor including processing circuitry or the function processing module 400 of FIG. 4) of the electronic device 101 may detect the reception of notification. The processor 120 may obtain notification of a given attribute, such as a call (e.g., voice call or video call) connection request, a text message, or an instant message having the electronic device 101 (or the user of the electronic device 101) as a destination (or recipient), from the outside (e.g., external different electronic device or server).

At operation 2903, the processor 120 may identify notification output performance (hereinafter referred to as "first notification output performance") related to the notification in response to the detection of the reception of the notification. The processor 120 may identify the first notification output performance (or element) necessary to output the notification by analyzing the attribute (or type) of the obtained notification. The processor 120 may identify notification output performance (hereinafter referred to as "second notification output performance") of each peripheral electronic device based on collected situation information or previously stored (or shared) device information (e.g., device type information, output type (e.g., capable of display, capable of sound output, or capable of a communication function) information, notification output performance (e.g., element) information) of peripheral electronic devices.

At operation 2905, the processor 120 may identify a peripheral electronic device capable of notification output. The processor 120 may identify whether at least one peripheral electronic device (e.g., candidate electronic device) including the first notification output performance of the notification is present in peripheral electronic devices based on the second notification output performance of the peripheral electronic devices. For example, the processor 120 may identify a peripheral electronic device, including at least the first notification output performance necessary to output the notification, by identifying the second notification output performance of each of peripheral electronic devices. The second notification output performance of each of the peripheral electronic devices may be at least partially identical with the first notification output performance, or may be at least partially different from the first notification output performance, or may be fully identical with (may include) the first notification output performance. For example, assuming that elements according to the first notification output performance are a microphone and a speaker for the execution of a call, the second notification output performance of a first peripheral electronic device may include only a microphone element, the second notification output performance of a second peripheral electronic device may include only a speaker element, the second notification output performance of a third peripheral electronic device may include only a display element, the second notification output performance of a fourth peripheral electronic device may include microphone and speaker elements, and the second notification output performance of a fifth peripheral electronic device may include a microphone or speaker and display elements. In such an embodiment, the processor 120 may identify the fourth peripheral electronic device and the fifth peripheral electronic device that belong to peripheral electronic devices and that are identical with or include the first notification output performance of the notification as candidate electronic devices capable of notification output based on the second notification output performance of each of the peripheral electronic devices (e.g., the first peripheral electronic device to the fifth peripheral electronic device).

If a peripheral electronic device capable of notification output (or including notification output performance related to the notification) is present (Yes at operation 2905), the processor 120 may identify whether an identified peripheral electronic devices includes a plurality of electronic devices at operation 2907.

If the number of identified peripheral electronic devices is not a plurality of electronic devices (e.g., the number of peripheral electronic devices capable of notification output is one) (No at operation 2907), the processor 120 may proceed to operation 2911, may identify the corresponding peripheral electronic device as a target electronic device, and may transmit a first message related to the notification to the target electronic device so that the target electronic device outputs the notification. The processor 120 may transmit the first message related to the notification to the target electronic device through a communication interface connected to the target electronic device so that the target electronic device outputs the notification obtained by the electronic device 101 from the outside. The first message may include notification (e.g., ringtone) or related information (e.g., "there is a call from OO"). In one embodiment, the first message (e.g., related information) may be configured based on text (or message) or based on a sound (or voice) based on at least the attribute of a target electronic device.

If the number of peripheral electronic devices capable of notification output is one, the processor 120 may identify whether the peripheral electronic device is in proximity to a user based on at least situation information of the peripheral electronic device. If the peripheral electronic device is in proximity to the user, the processor 120 may identify the peripheral electronic device as a target electronic device. If the peripheral electronic device is not proximate to the user and the peripheral electronic device is a movable electronic device, the processor 120 may identify the peripheral electronic device as a target electronic device, and may control the peripheral electronic device to move to the location of the user. If the peripheral electronic device is not proximate to the user and the peripheral electronic device is not a movable electronic device, the processor 120 may operate to select a peripheral electronic device in the vicinity of the user as a target electronic device as in operation 2913, for example.

If the number of identified peripheral electronic device is a plurality of electronic devices (e.g., the number of peripheral electronic devices capable of notification output is plural) (Yes at operation 2907), at operation 2909, the processor 120 may identify a peripheral electronic device that belongs to a plurality of peripheral electronic devices and that is in proximity to the user (or positioned in the vicinity of the user (or user location)) as a target electronic device that will output the notification based on the collected situation information. The processor 120 may perform an operation of identifying peripheral electronic devices proximate to the user and identifying a peripheral electronic device that belongs to the identified peripheral electronic devices and that includes notification output performance capable of notification output.

At operation 2911, the processor 120 may transmit a first message related to the notification to the target electronic device so that the target electronic device outputs the notification. The processor 120 may transmit the first message related to the notification to the target electronic device through a communication interface connected to the target electronic device so that the target electronic device outputs the notification obtained by the electronic device 101 from the outside. The processor 120 may identify whether a target electronic device has a hands-off function (or supports a call function). If the target electronic device has the hands-off function, the processor 120 may enable the target electronic device to perform a function related to the notification according to hands-off. For example, the processor 120 may provide a target electronic device with a first message (e.g., a ringtone or related information (e.g., "there is a call from OO")) related to notification. Thereafter, the processor 120 may enable the target electronic device to perform a hands-off function based on the user's acceptance (e.g., voice command) of a call connection being received from the target electronic device.

If a peripheral electronic device capable of notification output (or including notification output performance related to the notification) is not present (No at operation 2905), at operation 2913, the processor 120 may identify a peripheral electronic device that belongs to a plurality of peripheral electronic devices and that is in proximity to the user (or positioned in the vicinity of the user (or user location)) as a target electronic device that will output the notification based on collected situation information. The processor 120 may perform an operation of identifying peripheral electronic devices proximate to the user and identifying a peripheral electronic device that belongs to the identified peripheral electronic devices and that includes notification output performance capable of notification output.

At operation 2915, the processor 120 may configure a second message related to the notification based on the attribute of the target electronic device. If the target electronic device is an electronic device capable of only display output, the processor may configure the summary of the notification (e.g., the type (e.g., call or message) of notification, a target notification reception user (e.g., a prefix (e.g., name or nickname) to call (or page) a user), schematic contents (e.g., the reception of a call or the reception of a message) of notification (or a target notification occurrence user (e.g., information (e.g., registered name or telephone number) on a user that has requested a call) in a message format (e.g., text), and may provide the second message. If the target electronic device is an electronic device capable of only sound output, the processor may configure the summary of notification in a sound format (e.g., voice) and provide the second message.

At operation 2917, the processor 120 may transmit the second message to the target electronic device so that the target electronic device outputs the second message. The processor 120 may transmit the second message related to the notification to the target electronic device through a communication interface connected to the target electronic device so that the target electronic device outputs information on the notification obtained by the electronic device 101 from the outside.

Figure 30:
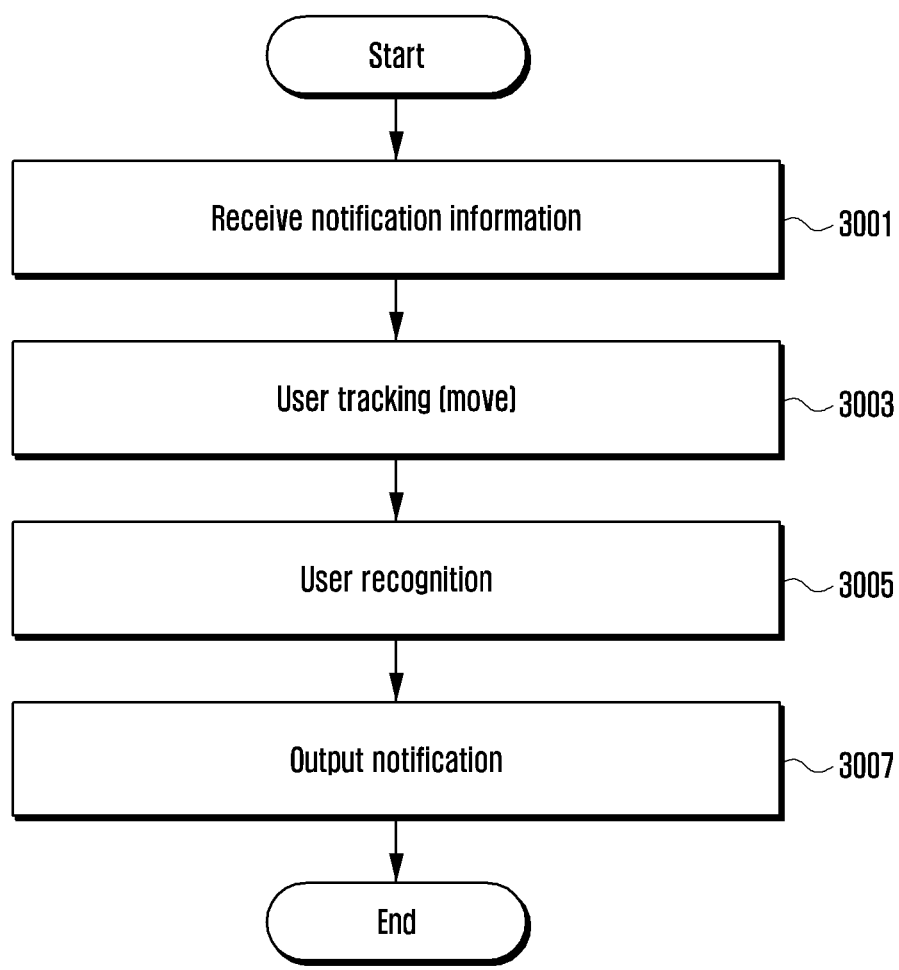
FIG. 30 is a flowchart showing an operating method of an electronic device according to an embodiment of the disclosure.

FIG. 30 is a flowchart showing an operating method of an electronic device according to an embodiment of the disclosure.

Referring to FIG. 30, an example is shown in which the electronic device 101 operates as a movable target electronic device (e.g., robotic vacuum cleaner) that receives notification detected from a source electronic device and that provides the notification to a user.

Referring to FIG. 30, at operation 3001, the processor 120 (e.g., at least one processor including processing circuitry or the function processing module 400 of FIG. 4) of the electronic device 101 may obtain notification information related to notification generated by a source electronic device. The electronic device 101 may directly obtain the notification information from the source electronic device or may indirectly obtain notification information related to the source electronic device through a server. The notification information may include at least one of a function related to the occurrence of notification, the attribute (or type) of notification, ID information of a source electronic device, information (e.g., location information or place information) on the space of a target electronic device, or a moving command to move to a space in which notification occurs and to identify the state (e.g., photo photographing), for example.

At operation 3003, the processor 120 may perform user tracking in accordance with the notification information (e.g., a moving command or place information). The processor 120 may identify a space, corresponding to place information, as a destination. According to an embodiment, the processor 120 may control the electronic device 101 to move to the corresponding space identified as the destination based on at least the notification information.

At operation 3005, when the electronic device 101 reaches the space of the destination, the processor 120 may include an operation of recognizing (or detecting) a user. The processor 120 may enable the electronic device 101 to detect a user by performing situation recognition (e.g., identify a user location based on sound collection) based on various sensors. As described in the part described with reference to FIG. 26, when the electronic device 101 reaches the space of the destination, the processor 120 may perform situation recognition (or photo capturing and/or sound collection) on a user (e.g., a child or a pet).

At operation 3007, the processor 120 may provide the notification, generated by the source electronic device, to the user by outputting the notification on behalf of the source electronic device. As described in the part described with reference to FIG. 26, the processor 120 may transmit result information (e.g., sound or captured image) based on the results of the execution of the situation recognition to the server 2650 or a target electronic device designated by the server 2650.

As described above, an operating method of the electronic device 101 according to various embodiments of the disclosure may include receiving a first message related to notification from an external device, identifying a target electronic device for notification output based on the location of a user and notification output performance of each of a plurality of electronic devices capable of communication with the electronic device, and transmitting a second message related to the notification to the target electronic device so that the identified target electronic device outputs the notification.

According to various embodiments of the disclosure, the operation of identifying a target electronic device may include identifying an electronic device, including notification output performance capable of outputting the notification and in proximity to the user, as the target electronic device for notification output.

According to various embodiments of the disclosure, the operation of identifying a target electronic device may include identifying first notification output performance related to the notification and second notification output performance of each of the plurality of electronic devices, identifying an electronic device belonging to the plurality of electronic devices and including second notification output performance corresponding the first notification output performance, and identifying an electronic device, belonging to the identified electronic devices and being in proximity to the user, as the target electronic device.

According to various embodiments of the disclosure, the operation of identifying a target electronic device may include identifying an electronic device, belonging to the plurality of electronic devices and being in proximity to the user, as the target electronic device if an electronic device including the second notification output performance corresponding to the first notification output performance is not present in the plurality of electronic devices, identifying an attribute of the target electronic device, and configuring a third message of a format corresponding to the attribute of the target electronic device and transmitting the third message to the target electronic device. The third message may include a summary of the notification.

According to various embodiments of the disclosure, the method may include identifying whether a candidate electronic device capable of notification output is in proximity to the user if the candidate electronic device is one based on the notification output performance, and identifying the candidate electronic device as the target electronic device and controlling a movement of the candidate electronic device to the location of the user if the candidate electronic device is not in proximity to the user and the candidate electronic device is a movable electronic device.

According to various embodiments of the disclosure, the method may include controlling the target electronic device to perform a function related to notification by hands-off if the target electronic device is capable of a hands-off function.

As described above, an operating method of the electronic device 101 according to various embodiments of the disclosure may include detecting notification related to at least one function, collecting situation information related to a user based on a plurality of electronic devices in response to the detection of the notification, identifying a target electronic device for outputting the notification in the plurality of electronic devices based on the situation information, and outputting the notification to the user by the target electronic device by providing notification information to the target electronic device.

According to various embodiments of the disclosure, the operation of detecting notification may include detecting notification generated based on the execution of a function of the electronic device or notification obtained from the outside based on at least a characteristic of the electronic device.

According to various embodiments of the disclosure, the operation of detecting notification includes identifying at least one of the type of notification or the sub-classification of the notification in response to the detection of the notification. The type of notification includes general notification having an attribute, which may be provided to the user in one direction, or feedback notification having an attribute, which requires the feedback of the user or an interaction with the user. The sub-classification may include personal notification, common notification, or emergency notification.

According to various embodiments of the disclosure, the operation of collecting situation information may include searching for an association electronic device that belongs to the plurality of electronic devices and that is associated with the notification, collecting the situation information based on the plurality of electronic devices if an association electronic device is not searched for, and collecting the situation information based on an association electronic device if the association electronic device is searched for.

According to various embodiments of the disclosure, the operation of outputting the notification may include identifying the target electronic device based on at least one piece of situation information including information related to the user in the situation information, identifying the space of the target electronic device, outputting the notification based on the electronic device if the space of the target electronic device is the same space as the space of the electronic device, and outputting the notification based on the target electronic device if the space of the target electronic device is different from the space of the electronic device.

According to various embodiments of the disclosure, the operation of identifying a target electronic device may include selecting the target electronic device for outputting the notification based on the attribute of the notification, identifying whether each of the plurality of electronic devices can output notification of a given attribute by identifying the attribute of each electronic device if the attribute of the notification is the notification of the given attribute that requires a given element, and identifying the target electronic device by prioritizing an electronic device supporting the notification of the given attribute.

According to various embodiments of the disclosure, the operation of outputting the notification may include moving a movable target electronic device to a space in which the user is present and outputting the notification.

According to various embodiments of the disclosure, the method may further include obtaining a command to perform a movement to the space of a destination related to situation notification and to perform situation recognition, moving to the space of the destination and performing the situation recognition on the user in response to the command, and transmitting result information according to the results of the execution of the situation recognition to the given target electronic device.

According to various embodiments of the disclosure, the method may further include transmitting a message to request the plurality of electronic devices to transmit situation information through a communication interface in response to the detection of the notification and collecting the situation information from the plurality of electronic devices as a response to the transmission of the message.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   a communication interface; and
   a processor configured to:
   obtain a first message related to notification from an external device,
   identify a target electronic device for notification output based on a location of a user and a notification output performance of each of a plurality of electronic devices capable of communication with the electronic device,
   identify a candidate electronic device capable of notification output based on the notification output performance and in proximity to the user,
   identify whether the candidate electronic device is in proximity to the user,
   identify the candidate electronic device as the target electronic device if the candidate electronic device is not in proximity to the user and the candidate electronic device is a movable electronic device, control the target electronic device to move to the location of the user, identify an attribute of the target electronic device, configure a second message related to the notification based on the attribute of the target electronic device, wherein if the target electronic device is an electronic device capable of display output, configure a summary of the notification in a message format, if the target electronic device is an electronic device capable of sound output, configure the summary of the notification in a sound format, and transmit the configured second message to the target electronic device so that the identified target electronic device outputs the notification.

2. The electronic device of claim 1, wherein the processor is further configured to:

identify a first notification output performance related to the notification and a second notification output performance of each of the plurality of electronic devices, identify an electronic device including a second notification output performance corresponding to the first notification output performance among the plurality of electronic devices, and identify an electronic device, belonging to the identified electronic devices and in proximity to the user, as the target electronic device.

3. The electronic device of claim 2, wherein the processor is further configured to:

identify the electronic device, belonging to the plurality of electronic devices and in proximity to the user, as the target electronic device if an electronic device including the second notification output performance corresponding to the first notification output performance is not present in the plurality of electronic devices.

4. The electronic device of claim 1, wherein the processor further is configured to:

control the target electronic device to perform a function related to the notification based on hands-free protocols if the target electronic device is capable of a hands-free function.

5. An electronic device, comprising:

at least one situation collection interface configured to collect situation information related to user detection;

a communication interface configured to communicate with at least one other electronic device;

an element capable of situation recognition; and a processor configured to:

detect a notification related to at least one function, collect situation information related to a user based on a plurality of electronic devices in response to the detection of the notification, the situation information including a location of the user, identify a target electronic device for outputting the notification among the plurality of electronic devices based on the situation information, identify a location of the target electronic device, provide notification information based on the electronic device if the location of the target electronic device is identical with a location of the electronic device, output the notification based on the target electronic device if the location of the target electronic device is different from the location of the electronic device, obtain a command to perform a movement to a space area of a destination related to a condition notification and to perform situation recognition, move to the space area of the destination and perform situation recognition on the user in accordance with the command, and transmit result information based on results of the performance of the situation recognition to the given target electronic device.

6. The electronic device of claim 5, wherein the processor is further configured to identify at least one of a type of the notification or sub-classification of the notification in response to the detection of the notification, wherein the type of the notification comprises:

general notification of an attribute capable of being provided to the user in one direction, or feedback notification of an attribute requiring:

a feedback of the user, or an interaction with the user, and wherein the sub-classification comprises personal notification, common notification, or emergency notification.

7. The electronic device of claim 5, wherein the processor is further configured to:

search the plurality of electronic devices for an associated electronic device associated with the notification, collect the situation information based on the plurality of electronic devices if the associated electronic device is not found, and collect the situation information based on the associated electronic device if the associated electronic device associated with the notification is found.

8. The electronic device of claim 5, wherein the processor is further configured to:

identify whether each of the plurality of electronic devices is capable of outputting a notification of a given attribute by identifying an attribute of each of the plurality of electronic devices if an attribute of the notification is a notification of the given attribute requiring a given element, and identify the target electronic device by prioritizing an electronic device supporting the notification of the given attribute.

9. An operating method of an electronic device, the method comprising:

receiving a first message related to a notification from an external device;

identifying a target electronic device for notification output based on a location of a user and notification output performance of each of a plurality of electronic devices capable of communication with the electronic device and in proximity to the user;

identifying a candidate electronic device capable of notification output based on the notification output performance;

identifying whether the candidate electronic device is in proximity to the user;

identifying the candidate electronic device as the target electronic device if the candidate electronic device is not in proximity to the user and the candidate electronic device is a movable electronic device;

controlling the target electronic device to move to the location of the user;

identifying an attribute of the target electronic device;

determining that the target electronic device is an electronic device capable of display output or sound output;

configuring a second message related to the notification based on the attribute of the target electronic device, wherein if the target electronic device is an electronic device capable of display output, configuring a summary of the notification in a message format, if the target electronic device is an electronic device capable of sound output, configuring the summary of the notification in a sound format; and transmitting the second message to the target electronic device so that the identified target electronic device outputs the notification.

10. The method of claim 9, wherein the identifying of the target electronic device further comprises:

identifying a first notification output performance related to the notification and a second notification output performance of each of the plurality of electronic devices;

identifying an electronic device including a second notification output performance corresponding to the first notification output performance among the plurality of electronic devices; and identifying an electronic device, belonging to the identified electronic devices and being in proximity to the user, as the target electronic device.

11. The method of claim 10, wherein the identifying of the target electronic device further comprises:

identifying an electronic device, belonging to the plurality of electronic devices and being in proximity to the user, as the target electronic device if an electronic device including the second notification output performance corresponding to the first notification output performance is not present in the plurality of electronic devices.

12. The method of claim 9, further comprising controlling the target electronic device to perform a function related to notification by a hands-free protocol if the target electronic device is capable of a hands-free function.

13. The method of claim 9, wherein the identifying of the target electronic device comprises:

collecting sound information from each of the plurality of electronic devices; and identifying the target electronic device based on the location of the user, the notification output performance of each of the plurality of electronic devices, and the sound information.

14. The method of claim 9, wherein the identifying of the target electronic device comprises:

determining a type of the notification; and identifying the target electronic device based on the location of the user, the notification output performance of each of the plurality of electronic devices, and the type of the notification.

* * * * *

UNITED STATES PATENT AND TRADEMARK OFFICE
CERTIFICATE OF CORRECTION

PATENT NO. : 11,223,497 B2  
APPLICATION NO. : 16/578753  
DATED : January 11, 2022  
INVENTOR(S) : Yeseul Hong et al.

Page 1 of 1

It is certified that error appears in the above-identified patent and that said Letters Patent is hereby corrected as shown below:

On the Title Page

Item [30], insert:  
--Sep. 21, 2018 (KR) ..................... 10-2018-0114106--

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*